June 1, 1937.  S. N. WIGHT  2,082,436
TRAIN DISPATCHING SYSTEM
Filed July 3, 1926  13 Sheets-Sheet 1
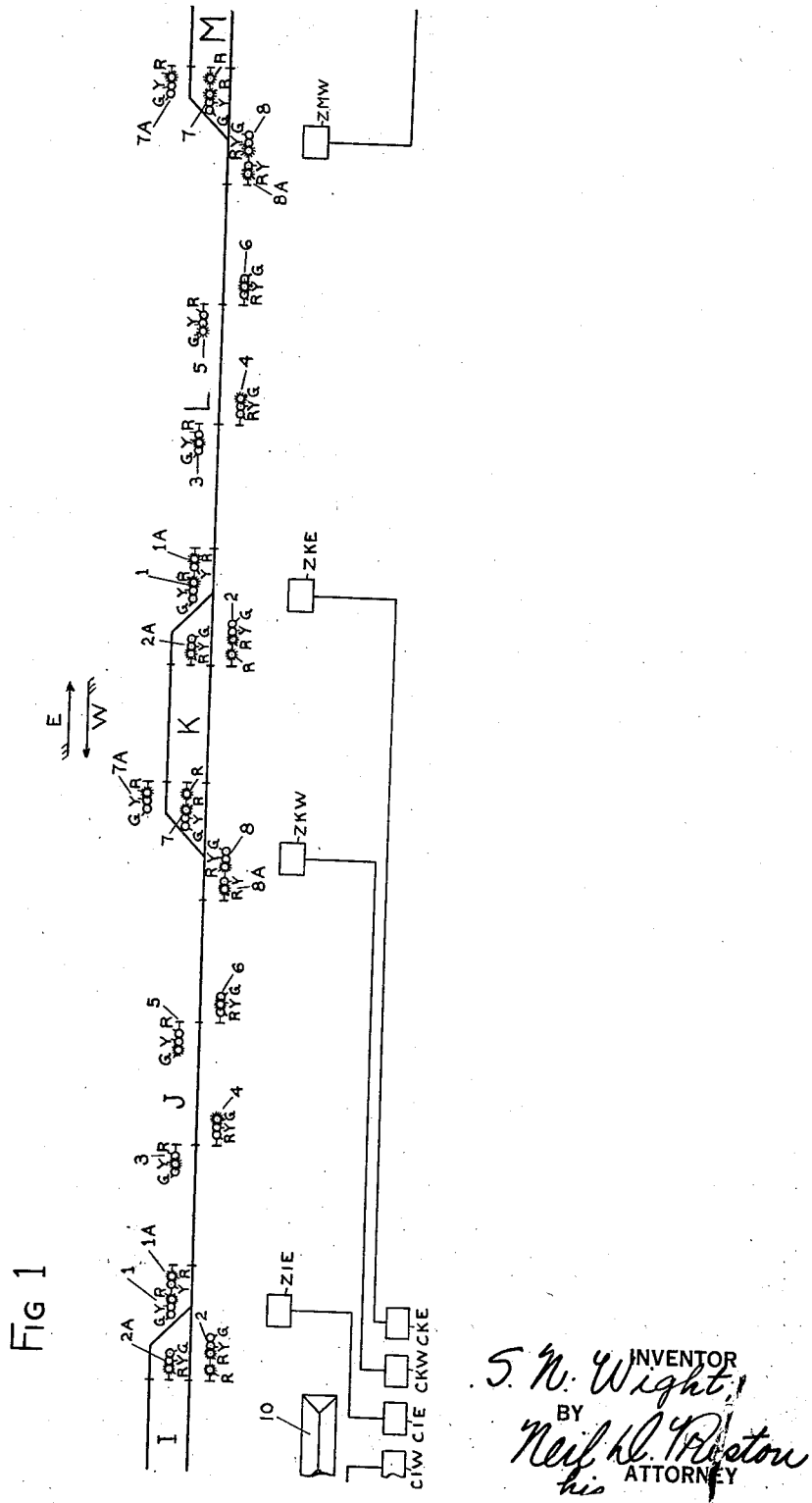

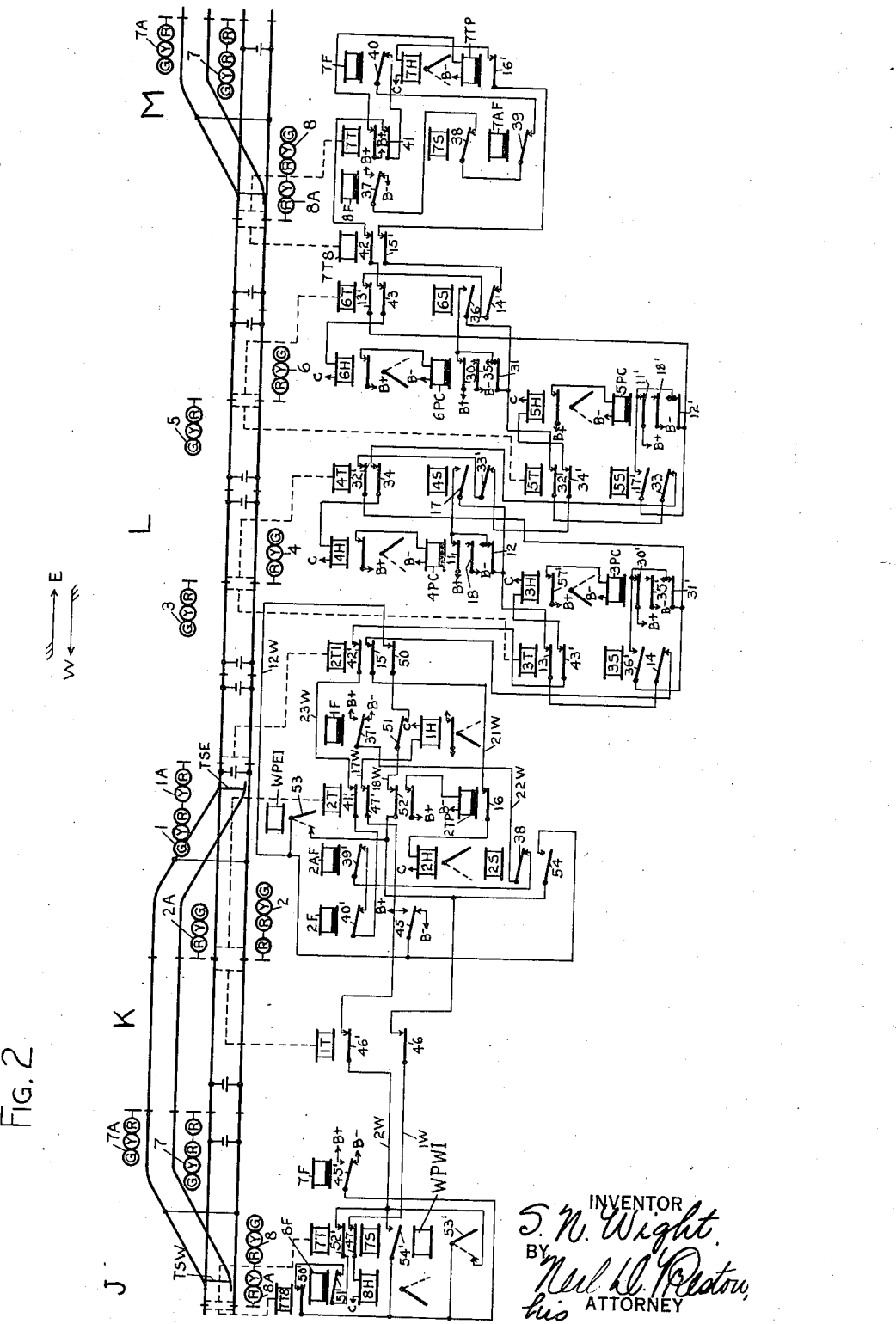

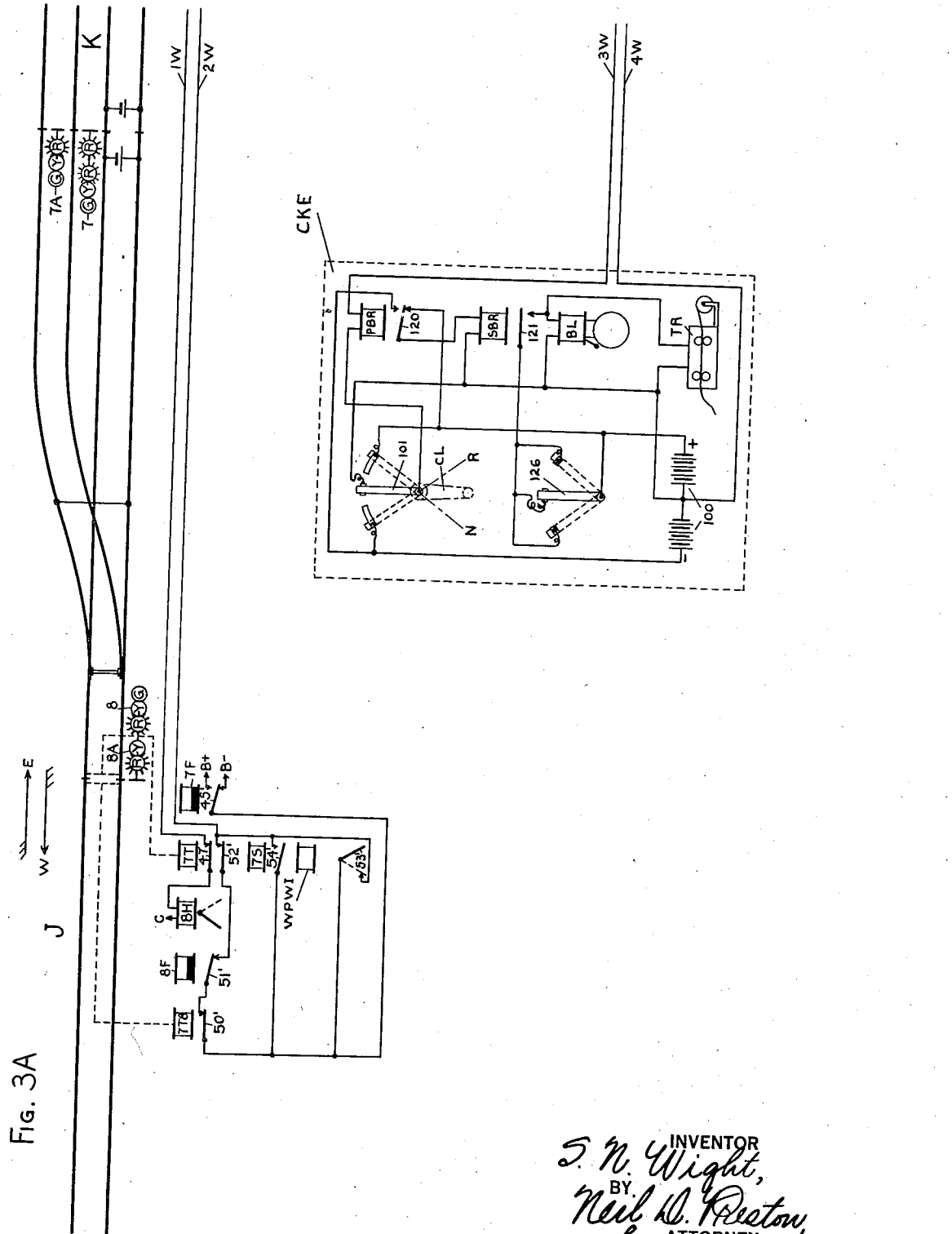

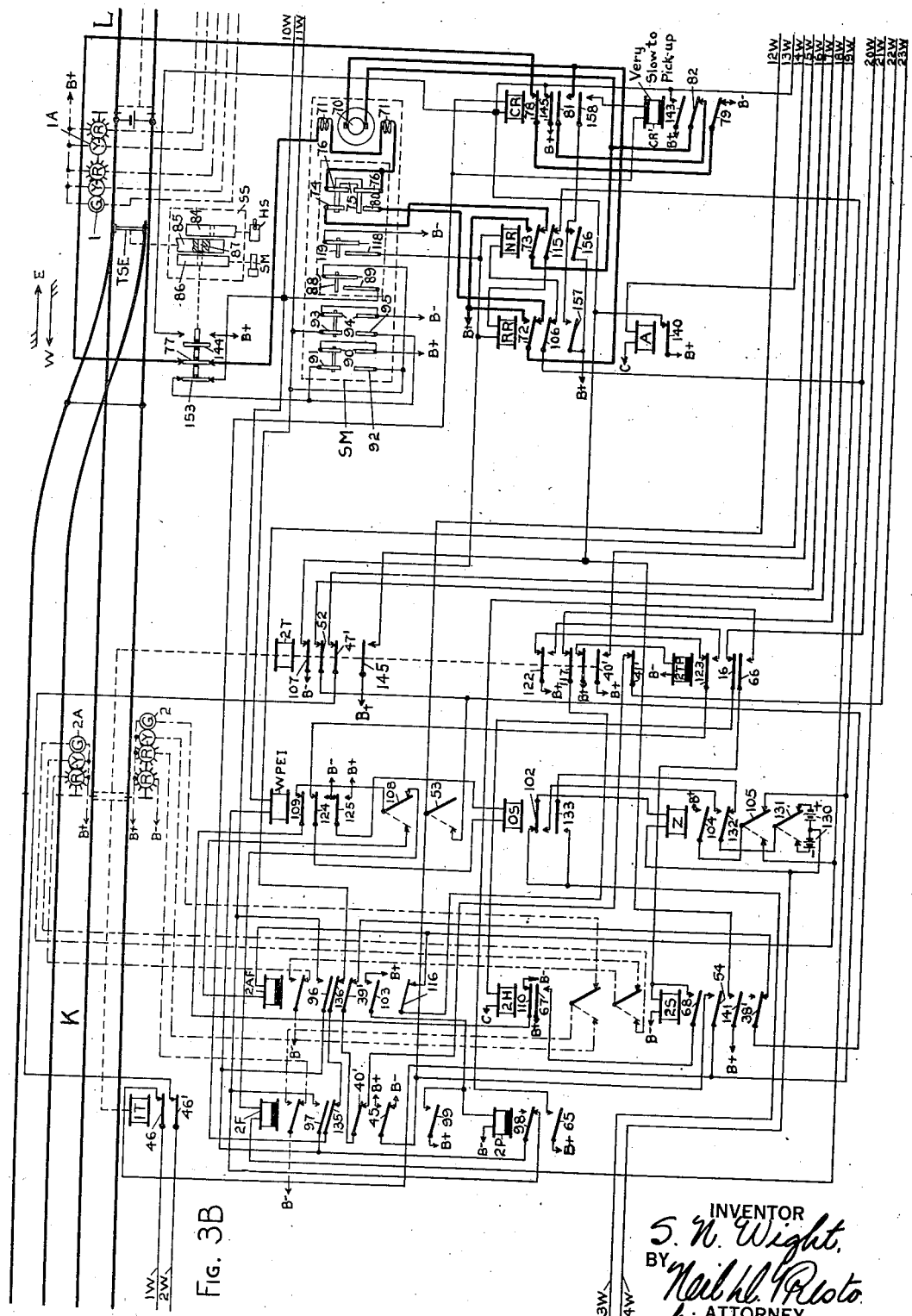

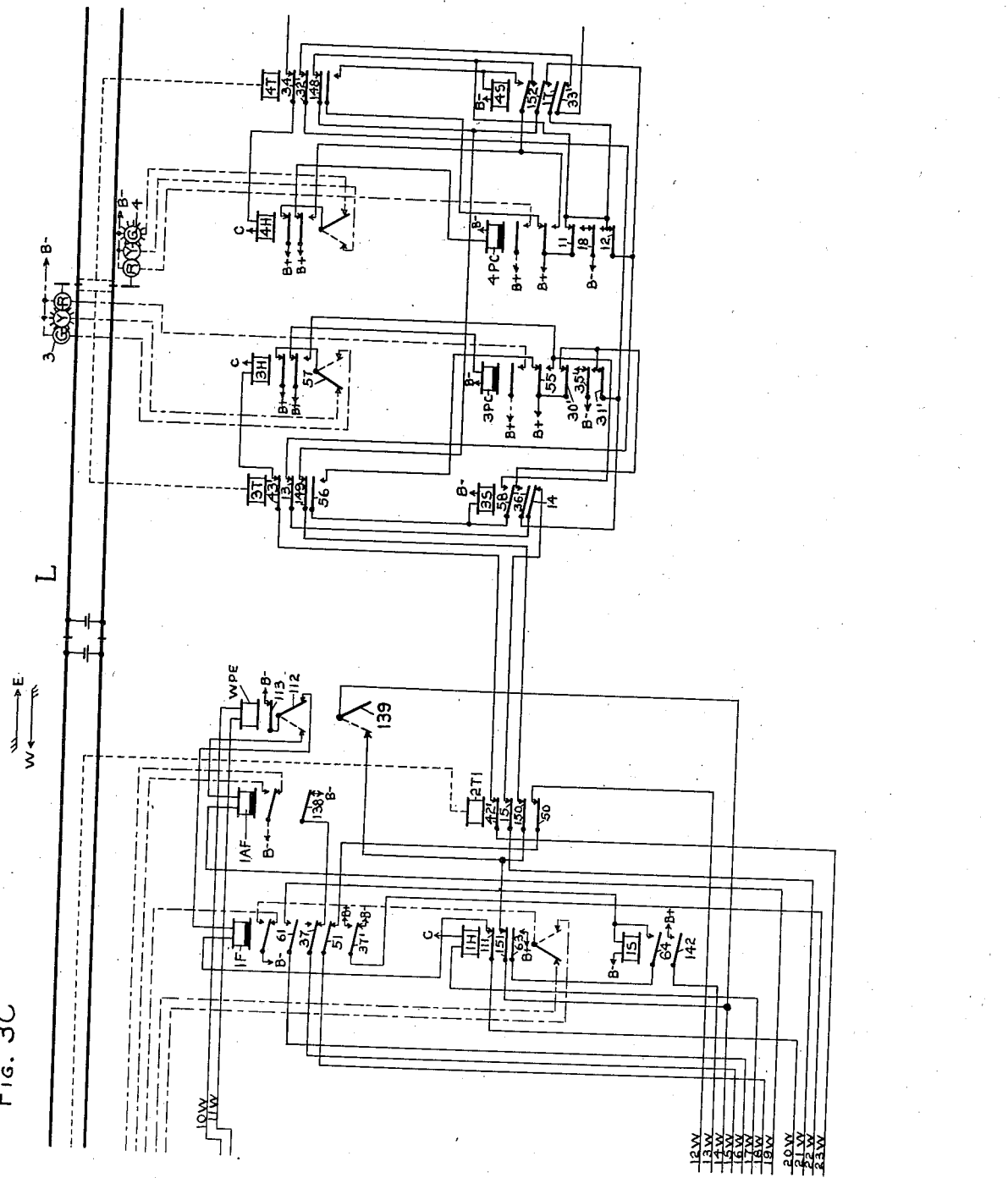

June 1, 1937.  S. N. WIGHT  2,082,436
TRAIN DISPATCHING SYSTEM
Filed July 3, 1926  13 Sheets-Sheet 6

June 1, 1937.   S. N. WIGHT   2,082,436
TRAIN DISPATCHING SYSTEM
Filed July 3, 1926   13 Sheets-Sheet 8

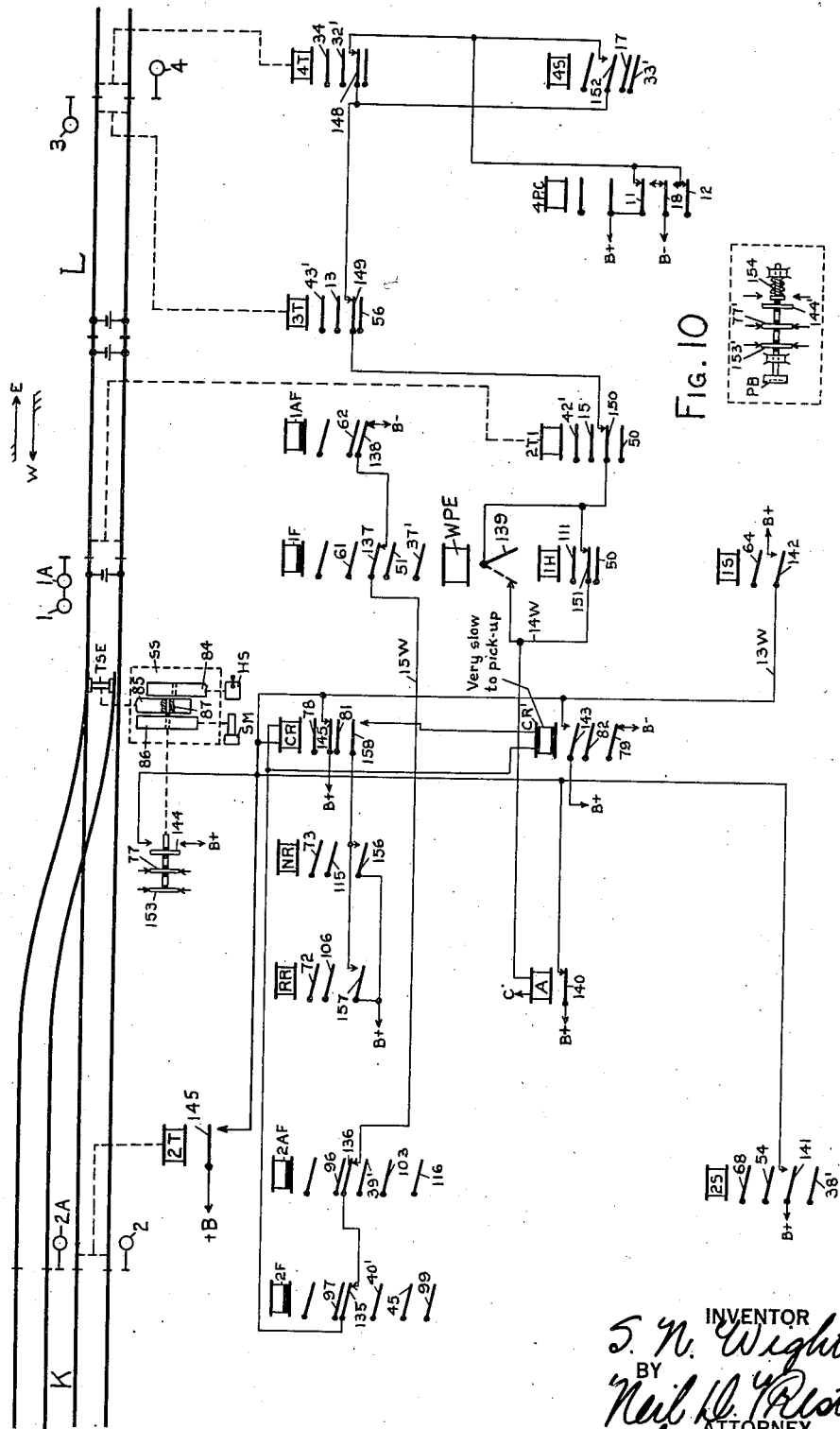

June 1, 1937.  S. N. WIGHT  2,082,436
TRAIN DISPATCHING SYSTEM
Filed July 3, 1926  13 Sheets-Sheet 10
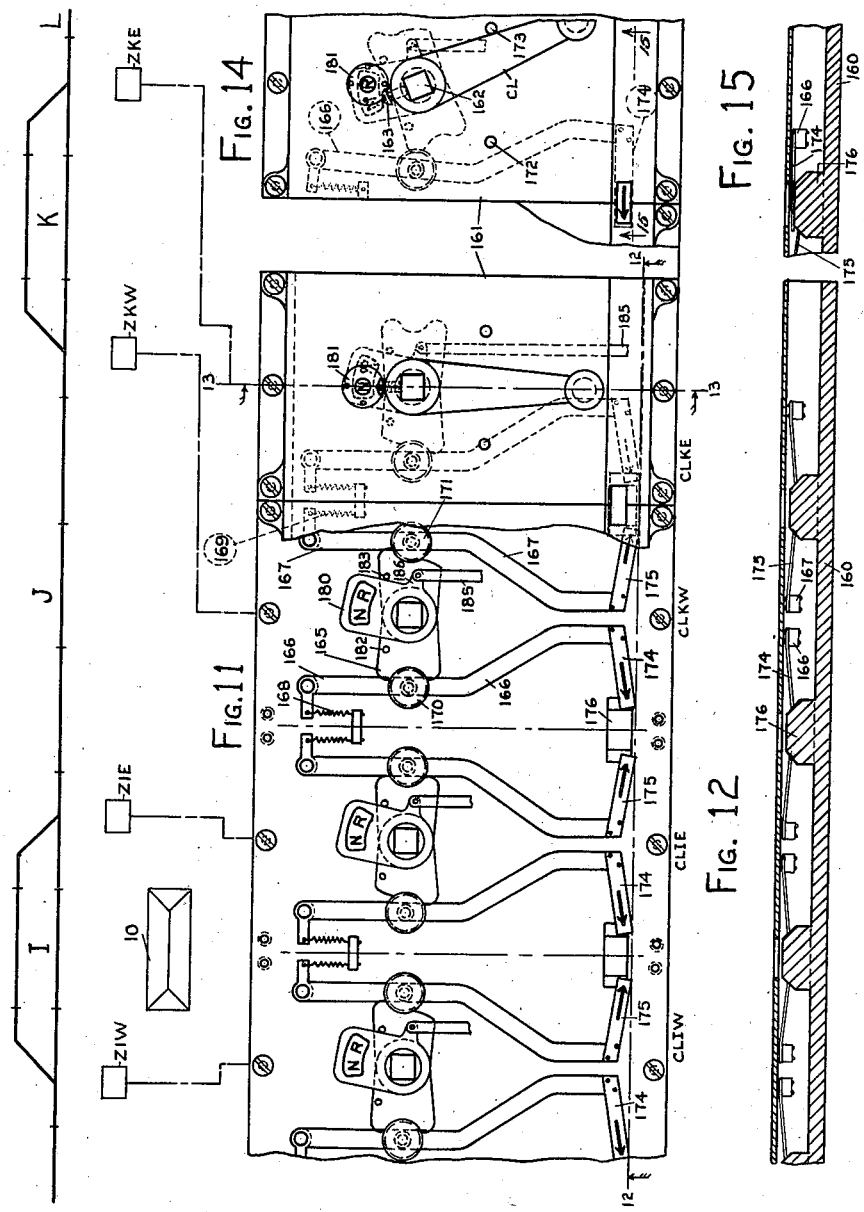
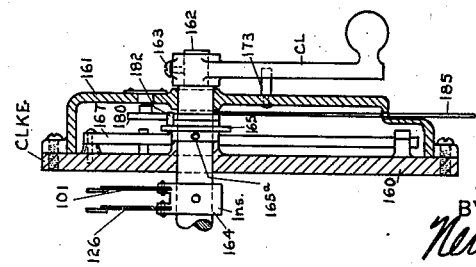
INVENTOR
S. N. Wight,
BY Neil D. Preston,
his ATTORNEY June 1, 1937.  S. N. WIGHT  2,082,436
TRAIN DISPATCHING SYSTEM
Filed July 3, 1926   13 Sheets-Sheet 11
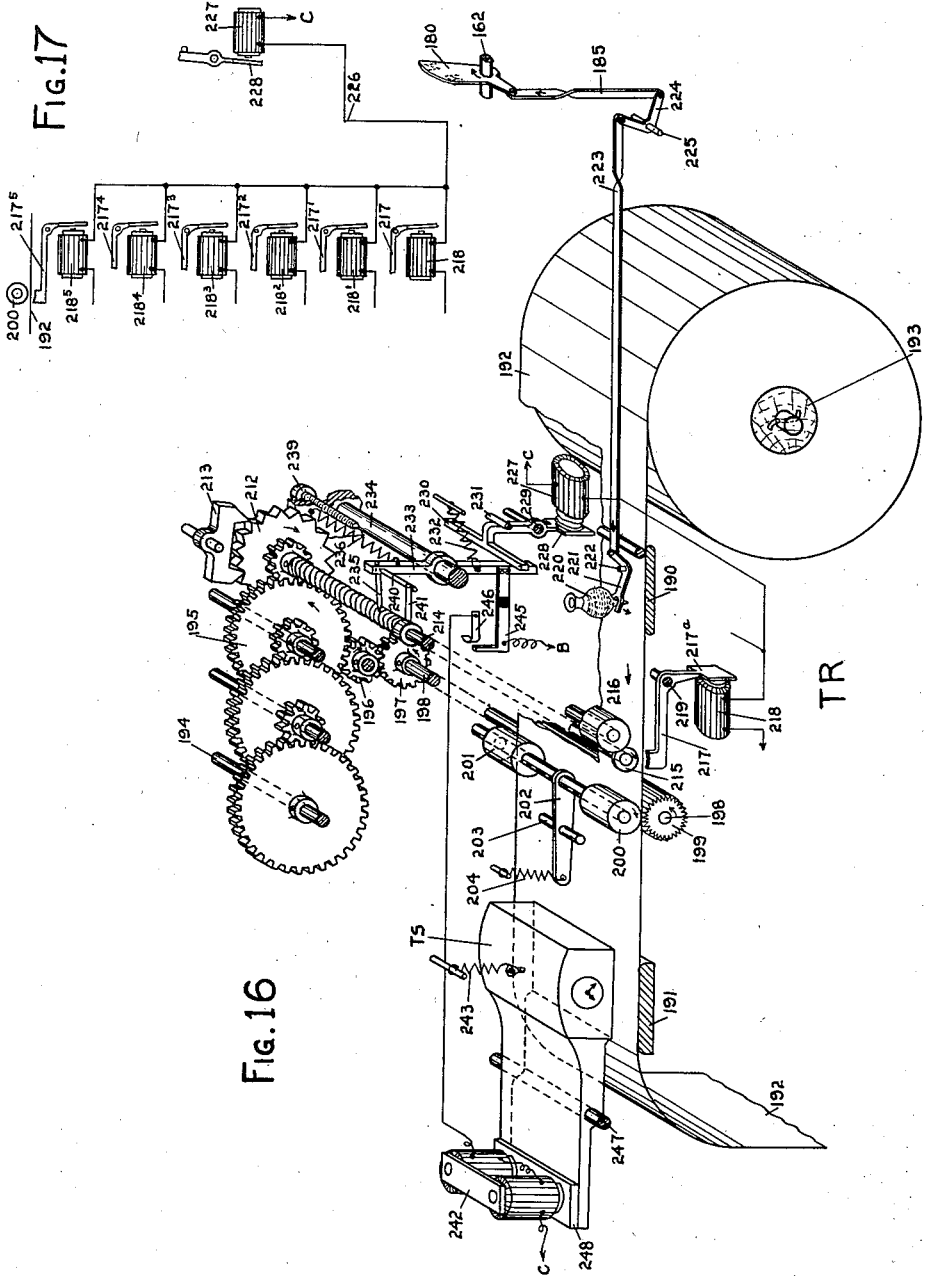

Fig. 18

June 1, 1937.   S. N. WIGHT   2,082,436
TRAIN DISPATCHING SYSTEM
Filed July 3, 1926   13 Sheets-Sheet 13
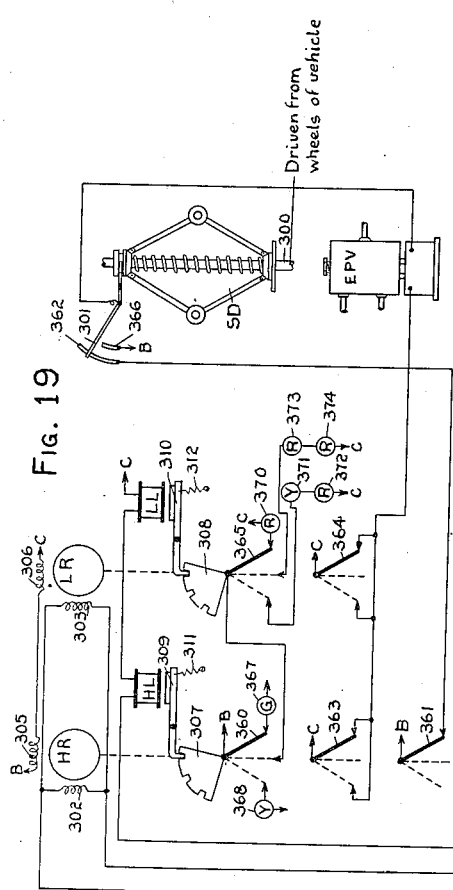
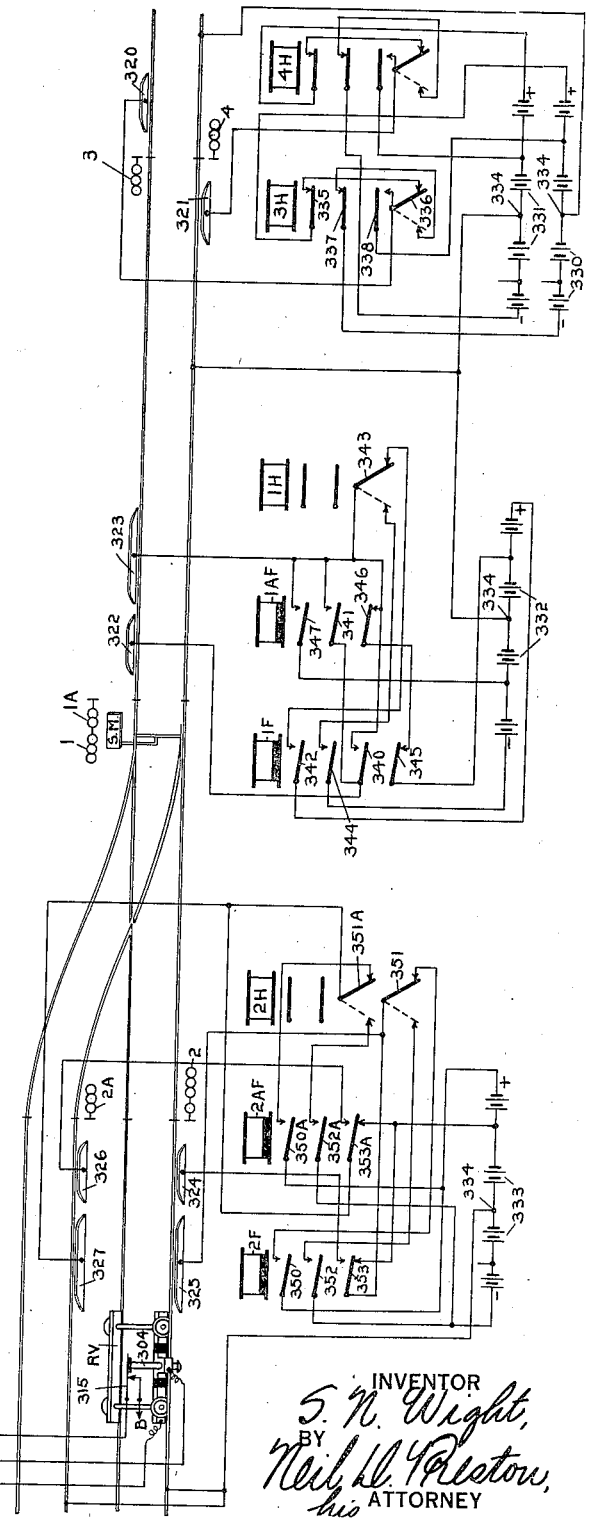
FIG. 19
INVENTOR
S. N. Wight,
BY
Neil W. Preston,
his ATTORNEY Patented June 1, 1937

2,082,436

UNITED STATES PATENT OFFICE 2,082,436

TRAIN DISPATCHING SYSTEM

Sedgwick N. Wight, Rochester, N. Y., assignor to General Railway Signal Company, Rochester, N. Y.

Application July 3, 1926, Serial No. 120,423

158 Claims. (Cl. 246—3)

This invention relates to traffic controlling systems for railroads, and more particularly to a system in which train operation over an extended division, or portion of the railroad, is under the immediate direction and supervision of one operator or dispatcher. The present invention is an improvement of the invention disclosed in my prior application Ser. No. 48,553 filed August 6, 1925.

Modern block signal systems, both for single track and double track roads, afford the desired degree of safety of train movement, but depend for facility upon the efficiency and economy of the arrangements for dispatching the trains. For reasons well recognized by those skilled in the art, it is desirable for an operator or dispatcher, in charge of train movement on a given portion of track, to be in direct contact and control, so to speak, of the various trains, knowing where each train is and its progress, and being able to direct any train to proceed, wait, taking siding, or the like, on short notice. In spite of the care taken in preparation of schedules and time tables, variations in traffic, unexpected delays, and other causes necessitate close supervision of train movements, speaking from the standpoint of facility, rather than safety.

Heretofore the instructions of the train dispatcher have ordinarily been communicated to the train crews by written train orders, through the cooperation of local operators at various points along the division, who are in telephone or telegraph communication with the train dispatcher. Although considerable economy and time has been effected by changes in the method of giving and handling train orders, since the introduction of automatic block signaling has made facility of train movement the principal object of train orders, rather than safety, there is nevertheless considerable delay involved in issuing and handling written orders, and the dispatcher is handicapped in his supervision of the train movement because he does not have direct and immediate control over the trains, nor provided with last minute information about the location of the trains. These limitations are commonly recognized; and it is believed unnecessary to comment further on the deficiencies of the train order system of train dispatching.

Train movement is also frequently delayed, because switches have to be thrown by hand. Likewise, there is the additional expense involved in stopping or slowing down trains, in order that the switch may be opened and closed by the trainmen.

With these considerations in mind, in accordance with the present invention, it is proposed to provide, in conjunction with a suitable system of automatic block signaling, a system by which a single operator or train dispatcher is given adequate information with respect to the location and progress of the trains on an extended portion of track under his supervision, and is able to communicate his orders to the trains by the indications of the block signals, or by cab signals, and may operate the switches at the various sidings, so that trains may proceed, slow down, or stop under the guidance of the signal indications with the minimum delay.

In attaining this general object or purpose, it is proposed to make the indications of the wayside or cab signals subordinate to manual control to the extent that the dispatcher may hold the trains, or indicate the movement they should make, while at all times permitting these indications to reflect traffic conditions and prevent collisions. In other words, the automatic cab signal or block signaling system provides the required safety, but the dispatcher may intervene to regulate the train movements that could be made with safety. Furthermore, the dispatcher is preferably given direct control over the operation of the switches, so that he can prepare the track for a desired train movement. An important characteristic of this invention resides in the selection and combination of simple and efficient devices in a way to permit this control of the signal indications and track switches, as well as the communication of train movements to the dispatcher, to be accomplished with a minimum amount of line wire, so that this control may be extended for many miles without prohibitive expense. In this connection, advantage is taken of the sequence in which the signals or switches are controlled by the dispatcher, so that the number of line wires to obtain the desired results may be reduced to a minimum. Advantage is also taken of the electrical interlocking between signals, and between track switches and signals, so that the system is efficiently as well as safely operated.

Although the present invention, in whole or in part, may be applied to any suitable type of automatic block signaling system, either for single track or double track, and although many features may be advantageously used in conjunction with a system of cab signaling or train control, in a manner hereinafter pointed out and also obvious, the invention has been shown applied to a type of block signaling for single track roads, generally known as the absolute-permissive-block system, or A. P. B. system. This application will make clear the nature of the invention and will also indicate how its various advantageous functions and features may be applied to the various systems in use and the various operating conditions encountered in practice.

An important characteristic of the system of the present invention resides in the expedients employed for communicating to the operator information about what is transpiring in the way of train movement, signal or switch operation, at various points along the track under his supervision. Generally speaking, it is proposed to provide audible indications in the tower for the operator, informing him of the direction of movement of trains by the various points, the operation of the signals and switches in response to his manipulation, in the form of sounds spaced and numbered in the form of a simple code. It is also proposed to provide a recording means, if desired, by which a permanent record is made of the train movements and the manipulation of the system.

The system also contemplates numerous other features, functions, and characteristics, in the construction and arrangement of the devices and circuits employed, in the expedients, such as approach locking, adopted in the interest of safety, and the provisions in the way of recorders and indicators for simplifying and facilitating the work of the operator. No attempt will be made to outline these various other objects and advantages of the invention.

Other objects, purposes and characteristic features of the invention will in part be described in the following specification and in part be obvious from the conventional showing of the system in the accompanying drawings.

In describing the invention in detail reference will be made to the accompanying drawings in which:—

Fig. 1 is a layout view of a part of a single track railway, signaled with an A. P. B. signaling system, illustrating two single track sections and adjoining passing sidings, together with control units controlled manually from a distant tower;

Fig. 2 shows the energizing circuits for the home relays of one complete single track section;

Figs. 3A, 3B and 3C illustrate the entire trackway apparatus for one end of a siding conventionally, and also its relation to the single track A. P. B. signal portion shown in Fig. 2;

Fig. 4 shows how the stick relays at an intermediate signal location of the A. P. B. signal system such as relays 3S, 4S, 5S and 6S, are picked up and stuck up;

Fig. 9 illustrates the approach locking circuits and apparatus, whereby the switch machine is prevented from operating except under prescribed conditions;

Fig. 10 shows a protected push button switch which may be used to unlock the approach locking apparatus shown in Fig. 9 when no switch selector is employed.

Fig. 11 shows the controllers for controlling the signals and switches at the ends of passing sidings I and K;

Fig. 12 is a partial section taken on the line 12—12 of Fig. 11, as viewed in the direction of arrow;

Fig. 13 is a sectional elevation of one of the controllers and is taken on the line 13—13 Fig. 11, as viewed in the direction of arrow;

Fig. 14 is a partial view of one of the controllers with the cover in position and its lever in one extreme position;

Fig. 15 is a partial section taken on the line 15—15 of Fig. 14, as viewed in the direction of arrow;

Fig. 16 is a fragmentary perspective view of a graphic recorder, whereby a record is made on a tape;

Fig. 17 shows the electrical connections of the magnet coils of the recorder shown in Fig. 16;

Fig. 18 shows a portion of the record tape 192 on which the graphic recorder shown in Fig. 16 has made a record; and Fig. 19 shows conventionally the car-carried and trackway equipment of the cab signaling and train control mechanism forming a part of the present invention.

Figure 4:
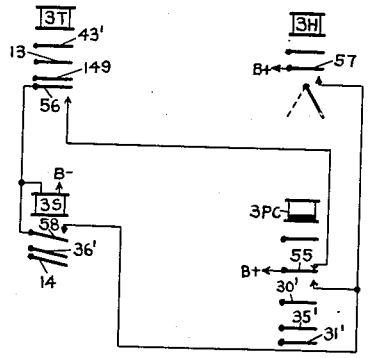

Although the present invention is of general and broad application and may be applied to double track railroads of which each track is signaled for one direction of traffic only, may also be applied to single track railroads signaled for both directions of traffic by signaling systems other than of the absolute-permissive-block type, and may be applied to systems including one ended instead of through sidings, the invention has been shown applied to a single track railway signaled with signals of the absolute-permissive-block type, because practically all the problems and difficulties encountered in any of these various systems are also present in the system to which the invention has been shown applied.

Fig. 1 illustrates diagrammatically the disposition or arrangement of signals for an application of the invention to a single track road equipped with an A. P. B. system. Two stretches of single track J and L are illustrated, and their adjoining passing sidings I, K and M. Disregarding special applications to lap sidings, single end sidings, and some other special track layouts some times encountered in practice, it may be assumed that the system applied to one end of a siding is duplicated; and for convenience the parts for the different sidings have been designated by the same reference characters.

In Fig. 1, the train movement from left to right (indicated by arrow E), is assumed to be an east bound movement; and movement from right to left (indicated by the arrow W) is assumed to be a west bound movement.

At each end of each siding are four signals governing traffic in both directions on the main track, and on to and off of the siding. Referring to the siding K in Fig. 1, the signal 2 governs east bound traffic from the main track of the siding into the stretch of single track L. This signal 2 is set back from the switch, so that a train may pull up to the signal and still be in the clear. The signal 2A, preferably a dwarf signal, governs east bound traffic from the siding onto the stretch of single track L, and is also located so that a train will be in clear when it pulls up to the signal. The signals 1 and 1A govern west bound traffic from the stretch of single track L onto the main track, and onto the passing siding, respectively. In other words, with the signal 1 indicating proceed, and the signal 1A stop, a train may proceed onto the main track; but with the signal 1 indicating stop and the signal 1A indicating proceed, the train may proceed onto the siding. In short, these signals 1 and 1A correspond with the upper and lower arms of an interlocked signal as commonly used.

The signals 7 and 7A govern west bound traffic from the main line and the siding into the stretch of single track J in the same way; and signals 8 and 8A govern east bound traffic onto the main track and siding respectively.

These signals may be of any desired construction, either semaphore, position light, or color light. In the form of invention disclosed, it is assumed that color lights signals will be used. It is also stated at this time, and more fully explained hereinafter, that means may be provided to utilize cab indications in addition to, or in lieu of, the indications of the wayside signals indicated.

In addition to the signals at the sidings, as above described, there may be several intermediate signals, arranged in pairs, or in staggered relation, in accordance with ordinary practice in A. P. B. systems. As illustrated, two pairs of opposite intermediate signals 3—4 and 5—6 have been illustrated.

The various electrical devices and circuits, constituting what may be assumed to be a unit control device for each end of each siding, are illustrated conventionally in Fig. 1 by rectangles. Each of these devices is controlled by, and transmits indications to, a suitable tower mechanism over one control circuit, made up in practice of a line wire and a common wire. The control devices of the sidings have been designated ZIE, ZKW, etc.; and the corresponding tower mechanisms CIE, CKW, etc. In these designations, IE refers to the east end of the siding I; KW to the west end of siding K; and KE to the east end of siding K. The control device ZMW at the west end of siding M is assumed to be controlled by another operator, a stretch of single track L representing the dividing zone of the divisions or sections of track under different operators.

The operator in the tower 10 has charge of three passing sidings in the particular arrangement indicated, two of these sidings I and K being shown; but this is merely illustrative, the only limit to the number of sidings under the control of one operator being the practical considerations of line wire cost, volume of traffic, and the like. It is contemplated that one block operator or dispatcher can easily control traffic through a portion of track consisting of eight single track sections and passing sidings. In handling the traffic on the particular portion of track under his supervision, the operator may be in telephonic or telegraphic communication with a head train dispatcher, and act under his general orders; or the operator in cooperation with adjacent operators, may act as the dispatcher for his particular portion of track. In either case, the operator is preferably in direct communication with the adjacent operators. Also, telephones are preferably located at a convenient point at each end of each siding, so that special instructions may be given to the train crews for special moves and in case of derangement of the system.

As briefly stated, the particular embodiment of the invention shown represents an application to an A. P. B. system, such as disclosed, for example, in my prior Patent No. 1,294,736 dated Feb. 18, 1919. In practicing this invention, however, some changes are made in the control circuits for the signals, although most of the features characteristic of the A. P. B. system have been retained. In the usual form of an A. P. B. system, the signals are normally clear; whereas in the system of this invention the signals are preferably normally at stop. The signals 2 and 7, with their associated dwarf signals 2A and 7A, commonly called starting signals, are automatically controlled in accordance with traffic conditions, according to this invention, and furthermore are subject to manual control by the operator. Also, the opposing starting signals at opposite ends of a single track block are interlocked; and other interlocks between signals are employed as hereinafter explained. It should be understood that the entering signals 1—1A and 8—8A, as well as the starting signals 2—2A and 7—7A, are stop-and-stay signals in the system of this invention, that is, are signals which must not be passed when indicating stop without special authority. The intermediate signals are the usual permissive stop signals. The stop-and-stay signals are made distinguishable from the permissive stop signals in any suitable way or in accordance with approved practice, by the shape of the blade if a semaphore signal, or by marker lights, or the like. For this reason, the starting signals 2 and 7 are indicated as provided with marker lights, so that if these signals indicate stop, there are two red lights directly over one another. Other expedients may of course be utilized to attain this end; and I desire to have it understood that the signaling system is susceptible of considerable variation.

*Signal control circuits*

In order to obtain special control functions by the sequence of operation of the control levers in the tower, and to obtain the requisite safety and protection under the special conditions characterizing this dispatching system, the signal circuits typical of an A. P. B. system are somewhat modified, and additional relays, circuits, and interlocking features are provided, so that it appears to be expedient to analyze in some detail the control circuits and devices for the signals. Fig. 2 shows the control circuits for the signal relays for a complete stretch of single track and one adjacent siding; and Figs. 3A, 3B and 3C illustrate more in detail these circuits.

In these figures, various conventions have been adopted to simplify the illustration; and an arbitrary use of symbols has been adopted. The track is divided by insulated joints into track circuited sections. The track relays for these sections are shown, with their connections to the track rails indicated by dotted lines. These track relays are designated T, the number to represent their relation to the signals. For example 4T designates the track relay directly in advance of the east bound signal 4.

The circuits shown have, for simplicity, been illustrated as terminating at points designated B+, B—, or C, indicating connections to the opposite terminals of a suitable battery, or other source of suitable current, the letter C designating the neutral point of such battery. In practice, various batteries of the proper voltage are preferably used for different groups of circuits. In some cases, the circuits are local, and in other cases are completed over a main or individual common wire. In describing the circuits, however, reference will be limited to tracing a path from one symbol B+ to another symbol B- (or C), without further discussion of the kind of battery or circuit connections that would be used in practice in conformity with recognized principles. Also, in the interest of clarity, many of the connecting wires have not been specifically assigned reference numerals, and the circuits will be traced from one controlling contact to the next.

Referring first to the intermediate signals 3, 4, 5 and 6, each has associated therewith a main control relay, designated H, a pole changing relay PC and a stick relay S. The pole changing relay PC is made slow releasing, in accordance with recognized practice, and this is indicated conventionally. The three circuits for determining the three indications of these intermediate signals are not shown in Fig. 2, but are indicated by dot-and-dash lines in Fig. 3C. It will be noted that the circuit for lighting the red lamp R includes a back contact of the pole changing relay PC, and that the circuits for the green and yellow lamps G and Y include polarized contacts and neutral contacts of the neutral polar relay H.

Referring now to the starting signals 2 and 2A at one end of the siding, these signals are controlled by a relay 2H, and two other relays 2F and 2AF, the latter two being slow releasing, as indicated. The control circuits for these signals are shown in dot-and-dash lines in Fig. 3B. In addition to these relays, and the track relays IT and 2T, a number of other relays 2TP, OS 2S, 2P, and the like are involved in the complete control of these signals, the switch machine, and the other signals I and IA. The functions of these relays are more readily explained as the construction and operation in the system are developed. The various important circuits for the relays, the interlocking arrangement between signals, the stick relays and their control, will now be separately explained.

*Circuit of 2H home relay.*—Referring to Fig. 2 the normal clear circuit for home relay 2H may be traced as follows:—beginning at the terminal B+ of a suitable source of direct current, contacts II and I2 of the pole changer relay 4PC, contact I3 of the track relay 3T, back contact I4 of the stick relay 3S, contact I5 of the track relay 2TI, wire 2IW, contact I6 of the track repeater relay 2TP, winding of the home relay 2H, to the common return wire C connected to a neutral point of said source of energy; and a caution circuit for causing this polar neutral home relay 2H to assume the reverse position is the same as the one just traced except it includes the front contact I7 of the stick relay 4S and the back contact I8 of the pole changer relay 4PC. In connection with this circuit it should be noted that the repeater track relay 2TP is directly controlled by the detector track relay 2T, and that the pole changer relay 4PC is directly controlled by the home relay 4H. The manner in which the stick relay 3S is controlled will be pointed out more particularly in connection with the description of Fig. 4 in which its pick-up and stick circuits are shown, and the stick relay 4S is controlled in the same manner as the stick relay 3S. It should be noted that the polar contact of the home relay 2H assumes the right hand position corresponding to clear indication; that is, it is energized positively and this clear circuit receives its energy from the terminal B+, it of course being apparent that if the relay 4PC assumes its deenergized position while the stick relay 4S is energized, this home relay 2H will be negatively energized and its pole changer contact will assume the left hand dotted position corresponding to a caution indication.

*Circuit of home relay 4H.*—The clear circuit for relay 4H may be traced as follows:—beginning at the terminal B+ of suitable source of energy such as a battery, contacts 30 and 31 of the pole changer relay 6PC, front contact 32 of the track relay 5T, back contact 33 of the stick relay 5S, front contact 34 of the track relay 4T, winding of the home relay 4H to common return wire C connected to an intermediate point of said battery, the current flow through which causes the relay 4H to assume its clear right hand position. The caution circuit for this relay 4H is substantially the same but includes the back contact 35 of the pole changer relay 6PC and the front contact 36 of the stick relay 6S, which circuit if complete causes the polar contact of the relay 4H to assume the left hand dotted position.

*Circuit of home relay 6H.*—This relay 6H normally assumes the left hand or caution position and its circuits is as follows:—Beginning at the terminal B- of a suitable battery, back contact 37 of the light signal relay 8F, back contact 38 of the stick relay 7S, back contact 39 of relay 7AF, back contact 40 of the relay 7F, front contact 41 of the track relay 7T, front contact 42 of track relay 7TS, front contact 43 of the track relay 6T, winding of the relay 6H to common return wire C connected to an intermediate point of said battery. The clear circuit for the home relay 6H is the same as the caution except that contact 37 is in its raised position and connects with the positive terminal of said battery thereby energizing the relay 6H to its clear position. The manner in which the light signal relays 8F, 8AF, 7F and 7AF, are controlled is more clearly indicated in Fig. 3 of the drawings and will be more fully discussed hereinafter. It may be pointed out that the stick relay 7S is controlled in exactly the same manner as is the stick relay 2S shown in Fig. 6 of the drawings and more clearly described hereinafter.

*Circuit of home relay 8H.*—The relay 8H controls the signal 8 by circuits not shown. The clear and caution circuits, depending upon whether the relay 2F is energized or deenergized, for this relay 8H may be traced as follows:—beginning at the terminal B+ or B- of a suitable battery depending upon whether the light signal relay 2F is energized or de-energized contact 45 of this relay, one of the following three branch circuits (1) I2W, front contact 50 of track relay 2TI, back contact 51 of light signal relay IF, wire I8W, front contact 52 of track relay 2T, (2) reversed contact 53 of relay WPEI, (3) front contact 54 of stick relay 2S, and then through the main circuit portion including contact 46 of track relay IT, wire IW, front contact 47 of track relay 7T, winding of home relay 8H to common return wire C connected to the middle point of the same battery. At the right end of single track section L is a similar relay for controlling the signal 8 at that location.

*Tumble down.*—It should be noted that the energizing circuits of the various relays 2H, 4H and 6H are such that if a train moves from right to left, that is, from east to west, the dropping of the track relay 7T due to such train, causes de-energization of the home relay 6H, which in turn drops the pole changer relay 6PC, and which in turn opens the energizing circuit of the home relay 4H; de-energization of the home relay 4H drops the relay 4PC, the dropping of which de-energizes the home relay 2H. This action of the dropping of one home relay dropping the next home relay in the rear thereof and so on, may be conveniently termed the "tumble-down" effect, and is a feature of an A. P. B. system that causes all the opposing signals to go to stop as soon as a train enters a given single track section. It may be pointed out at this time that this same tumble-down effect is also present in the home relay circuits of relays 3H, 5H and 7H, except that for these relay circuits the tumble-down starts when a train enters the west end of the single track section.

Figure 5:
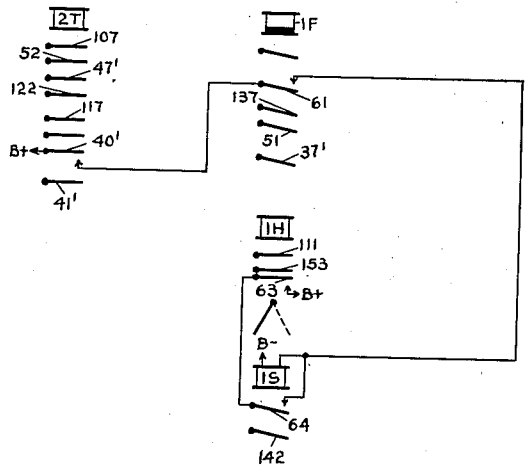
Fig. 5 shows how the stick relay of the entering signal, namely the last signal of a single track section, such as signal 1, is picked up and stuck up.
Figure 6:
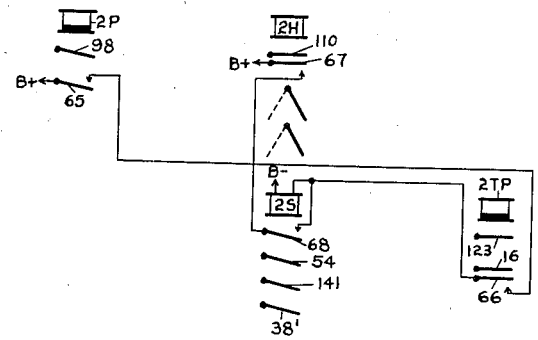
Fig. 6 shows how the stick relay of a starting signal, such as signal 2, is picked up and stuck up.

On account of this feature one train would not be permitted to follow another train through the block, because all of the signals in the rear of a passing train would assume and remain in the stop position, if it were not for supplemental means for again restoring the home relays to normal after the passage of a train; this supplemental means as already mentioned consists of stick relays which pick up only for the passage of a train in one direction, which will more clearly be described in connection with the description of Figs. 4, 5 and 6.

*Interlock between opposing starting signals.—*
At this point it is endeavored to point out that the tumble-down effect in the modified A. P. B. system of the present invention is somewhat different, because the tumble-down is also made effective by the manual clearing of one of the starting signals of a single track section, which is not true of the usual A. P. B. system such, for instance, as shown in my prior Patent, #1,294,736, granted Feb. 18, 1919. In this connection it may be pointed out that the signals 1, 2, 7 and 8, as well as their companion signals 1A etc., are normally held at stop as indicated by the illumination of red lamps of the signals in Fig. 1 of the drawings, and also as indicated by the de-energized condition of the light signal relays 1F, 1AF, 2F, 2AF, 7F, 7AF, 8F and 8AF (see Figs. 2 and 3B), and the light signal circuits shown in dot-and-dash lines in Fig. 3B. These signals are held at stop because the corresponding light signal relays are held de-energized by suitable manually operable means already mentioned and more particularly described hereinafter.

Coming now to the tumble-down effect again, let us assume that the operator wishes to set up the system for west bound traffic and in so doing permits the energization of light signal relays 7F or 7AF (see right hand end of Fig. 2) by means pointed out hereinafter, thereby causing the clearing of the signals 7 or 7A. With the light signal relay 7F or 7AF energized (see right hand end of Fig. 2) the energizing circuit for home relay 6H will be broken at the back contact 40 or 39 of the relay 7F or 7AF as the case may be. The clearing of one of these signals 7 or 7A causes the home relay 6H to be de-energized and its corresponding signal 6 to indicate danger, which de-energization of 6H in turn causes the home relays 4H and 2H to be de-energized through the tumble-down effect heretofore described, even though there are no trains around. In other words, in the modified A. P. B. system as employed in the present invention, the direction of traffic is selected manually, and the tumble-down effect is obtained manually before a train is permitted to enter a single track section. Of course, if a train enters into a single track section before the starting signal has been cleared, the tumble-down effect is obtained by the presence of the train as already explained heretofore. In other words, the tumble-down effect present in A. P. B. systems of the usual construction in combination with an interlock between the starting signal, such as signal 7 or 7A, through its relay 7F or 7AF with that of the home relay circuit of the second last signal for the opposite direction of traffic, such as a circuit for home relay 6H, causes the signal 7 or 7A to be interlocked, through the medium of the tumble-down circuits, with its opposing starting signals 2 and 2A; that is, the signals 2, 2A, 7 and 7A are so interlocked that only one of these signals can be cleared at one time.

*Interlock between entering signals.—*For reasons which more clearly appear hereinafter, the entering signals to the passing siding and its main track are interlocked similarly to the interlock between the starting signals of a single track section, as just explained. For instance, the signal 8, (see Figs. 2 and 3) cannot clear so long as the signal 1 adjacent the same siding is indicating caution or clear, because the circuit for the home relay 8H is broken at the back contact 51 of the relay 1F, this is of course on the assumption that the switch machine indicating relay WPEI is in its normal condition because the switch at the east end of passing siding is set for the main track, and that the relay 2S is down and no east bound train has just departed. In like manner the signal 1 cannot be cleared if the opposite main track entering signal, such as signal 8 is indicating clear or caution, this because the circuit for the home relay 1H is broken at the back contact 51¹ of the light signal relay 8F, this is of course on the assumption that the track switch at the west end of the passing siding is set for the main track, so as to maintain the switch machine indicating relay WPWI in its normal condition, and also on the assumption that a west bound train has not just passed and picked up the stick relay 7S. In this connection it is desired to point out that this interlock may be accomplished by contacts operated by the signal blade instead of relay contacts if semaphore signals are used instead of light signals.

The circuits for energizing the home relays 2H, 4H, 6H and 8H which govern east bound traffic and through which a tumble-down is effected in a westerly direction have now been described and discussed in detail, so that it is believed unnecessary to specifically discuss or describe the relays 1H, 3H, 5H and 7H or their energizing circuits, especially bearing in mind that these relays and their circuits are exactly the same as those described, except that they are arranged inversely as to directions, that is, the home relays having reference characters containing an even number govern east bound traffic, whereas, the home relays, having reference characters containing an odd number govern west bound traffic, and for this reason the contacts in the circuits for the home relays 1H, 3H, 5H and 7H have been given the same reference numbers with an exponent 1 as have like contacts of the circuits of relays 8H, 6H, 4H and 2H respectively.

*Stick relays.—*As already mentioned in connection with the description of the various home relay circuits and the tumble-down effect produced if certain of these home relays are de-energized, and as pointed out in the description of Fig. 2, stick relays are mainly provided for again picking up a home relay in the rear of a passing train, so as to permit another train to follow the same in accordance with proceed signal indications, but are incidentally used for other purposes. This picking up of a home relay for the purpose just mentioned will now be considered in connection with the home relay 5H. If a train is assumed to be moving westwardly in single track section L (see Fig. 2), the passage of this train by the signal 5 will drop the track relay 5T and in turn the home relay 5H by dropping contact 34[1]. As the train proceeds a little farther it will drop track relay 3T and in turn drop the pole changer relay 3PC, thus opening the circuit for the home relay 5H at still another point, namely, at the contact 31[1]. From this consideration, it would at first hand appear that the relay 5H can not again pick up until the pole changer relay 3PC picks up, which would necessitate the picking up of the home relay 3H, and this latter home relay of course can not pick up until the train has passed entirely out of the single track section L. The home relay 5H can, however, be energized even though the pole changer relay 3PC remains de-energized, and this independent energization of the relay 5H occurs when the stick relay 3S is in its energized position. The circuit for so energizing the relay 5H has already been heretofore considered and includes the contact 36[1] of the stick relay 3S. It is now desired to point out how and under what conditions the stick relay 3S assumes its energized position. The complete circuits for picking up and sticking up the stick relay 3S are shown in Fig. 3C, and these circuits are also shown in Fig. 4 of the drawings, wherein they can be more readily studied.

*Stick relay 3S.*—Referring to Figs. 2 and 4, it will be noted that the pole changer relay 3PC is slow-acting (conventional showing), and that this relay is directly controlled by the relay 3H, which in turn has its energization dependent on the energization of track relay 3T (see contact 43[1] of Fig. 2), so that a train passing the signal 3 in a westwardly direction drops the track relay 3T and for a time (the time required for the relays 3H and 3PC to assume the de-energized position) closes the pick-up circuit for the stick relay 3S (see Fig. 4) which may be traced as follows:— beginning at the terminal B+ of a suitable source of energy such as a battery, through front contact 55 of the relay 3PC, the back contact 56 of the track relay 3T, the winding of the stick relay 2S to the terminal B— of the same battery; thereby causing the stick relay 3S to be picked up. Since the home relay 3H is now in its de-energized condition, it being rather quick-acting, the following stick circuit is completed:—beginning at the terminal B+, back contact 57 of the home relay 3H, and front contact 58, which may be called the stick contact, of the relay 3S. After a short interval of time, the pole changer relay 3PC will have assumed its de-energized position and in so doing will have completed a shunt for the back contact 57 of the relay 3H so that another stick circuit is completed which includes the back contact 55 of the pole changer relay 3PC.

Referring again to Fig. 2 of the drawings, it will be noted that with the stick relay 3S energized and the relay 3PC de-energized, the home relay 5H will be energized to its reverse position, thereby permitting the signal 5 to assume a caution indicating condition. The home relay 3H may be energized in the same manner as just described, and the energization of this home relay 3H, whether it be energized to its normal or to its reverse position, will pick up the pole changer relay 3PC and in turn re-energize the home relay 5H to its clear position providing there is no train on any of the track circuits controlling this home relay circuit, so that one train may follow another train through a single track section with the same signaling facility that is afforded by signals in double track railway signaling.

*Stick relay 1S.*—For reasons already given in connection with the discussion of the stick relay 3S, the picking up of which is possible only when a train is moving from east to west, and for other reasons, it is desirable to pick up a stick relay when a westwardly moving train passes the signal 1, and for this reason the stick relay 1S (see Figs. 3C and 5) is employed. The pick-up circuit for this stick relay 1S may be traced as follows:—beginning at the terminal B+ of the battery, back contact 40[1] of the track relay 2T, front contact 61 of the light signal relay 1F, winding of the stick relay 1S to terminal B— of the same source of energy, or battery. It should be understood that the light signal relay 1F is necessarily energized to give a signal indication permitting a west bound train to pass the signal 1, and is either directly or indirectly controlled by the track relay 2T, so that the dropping of the track relay 2T will close a pick-up circuit for the stick relay 1S for the time the light signal relays 1F (which is slow releasing) holds its front contact closed after current is cut off from its winding. This time is sufficient to pick up the stick relay 1S; and as soon as the home relay 1H (which is quick releasing) is de-energized, said stick relay is stuck up through the following stick circuit;—beginning at the terminal B+ of the same battery, back contact 63 of the home relay 1H, front or stick contact 64 of the relay 1S, the winding of this relay to the terminal B— of the same battery. With this stick relay 1S once stuck up, it will remain in its energized condition until the home relay 1H is again picked up. The relay 1S is not picked up by a west bound train going into the siding, because the relay 1F is de-energized at that time.

It will be noted that the pick-up circuit for the relay 1S resembles that of the pick-up circuit for the relay 3S, the light signal relay 1F being slow-acting and being controlled by the home relay 1H in substantially the same manner as the pole changer relay 3PC is controlled by the home relay 3H. The stick circuit for the relay 1S is substantially the same as the stick circuit for the relay 3S. There is, however, only the back contact of a home relay 1H in the stick circuit for the relay 1S instead of two back contacts in multiple, as is the case in the stick circuit for relay 3S.

*Stick relay 2S.*—The pick-up circuit for the stick relay 2S (see Figs. 3 and 6) may be traced as follows:— beginning at the terminal B+ of a battery, front contact 65 of the repeater relay 2P, back contact 66 of the track repeater relay 2TP, winding of the stick relay 2S to the terminal B— of said battery. With this circuit completed, which happens when an east bound train passes the signal 2 or 2A as the case may be, under which condition the repeater relay 2P is up, on the assumption that one or the other of the signals 2 or 2A indicates proceed, and the track repeater relay 2TP is down, because the train has just entered the detector track circuit 2T. In this connection, it should be noted (see Fig. 3B) that the track repeater relay 2TP controls the relay 2H, the home relay 2H controls the light signal relays 2F or 2AF as the case may be, and that for this reason the pick-up circuit just traced is only closed for a short time, because dropping of the relay 2TP eventually drops the relay 2P. During the larger part of this interval of time, however, the relay 2H is down, so that the stick circuit, including the stick contact 68 of the relay 2S and the back contact 67 of the home relay 2H, is completed. The stick relay 2S is maintained up so long as the relay 2H is in its de-energized condition. In principle, the pick-up and stick circuits for the relay 2S are the same as those of the relays 1S and 3S.

It is believed expedient to point out at this time that the stick relays 4S, 5S and 6S are controlled by pick-up and stick circuits in exactly the same manner as is the stick relay 3S, that the pick-up and stick circuits for the relay 8S are exactly the same as those of the stick relay 1S, and that the pick-up and stick circuits for the relay 7S are identical to those of the stick relay 2S. From the study of these pick-up and stick circuits, it will appear that a stick relay is picked up whenever a signal is passed in the direction governed by such signal and remains energized so long as the home relay of such signal is in its de-energized condition.

*Power operated switch machine*

The switches at the ends of the sidings are preferably operated by power, either pneumatic or electric, under the control of the operator, through the agency of the main control relay Z. In the form of the invention illustrated, the switch machines are assumed to be operated electrically and of a construction similar to that shown in the patent to Howe, No. 1,466,903, dated September 4, 1923. This switch machine (see Fig. 3B) includes a motor, having an armature 70 and field winding 71 connected to the switch points through suitable reduction gearing. The switch machine also includes a number of contacts mechanically operated and positioned in accordance with the position and movement of the switch points. These contacts comprise stationary fingers and movable bars; and the bars move in a particular way and bridge the fingers at particular times, according to the function of the contacts. These contacts are shown diagrammatically and conventionally. A brief explanation of these contacts may facilitate understanding the operation. Contact bar 75 bridges contact fingers 74—76 in the normal position, and the fingers 76—80 in the reverse position. This bar shifts to its intermediate position during the preliminary unlocking movement, and in that position bridges both pairs of contacts. The contact bar 119 shifts to the intermediate position, bridging the fingers 118, upon preliminary unlocking movement, and remains in that position until the switch is fully thrown and locked. The same applies to the contact bar 88 and the fingers 89. The pairs of fingers 90—91 and 93—94 are bridged by the contact bars when the switch machine is in its full normal position, but during the preliminary unlocking movement, these bars move to the intermediate position, in which they do not bridge any of the pairs of contacts. Upon completion of the cycle of operation of the switch machine, the other pairs of contacts 90—92 and 94—95 are bridged. The switch machine is primarily controlled by two relays NR and RR, and also by an approach locking relay CR. The control of the relay CR is explained hereinafter, and for the present it should be assumed that it is energized.

Noting that the energizing circuits for the motor of the switch machine are traced in heavy lines in Fig. 3B, the circuit for operating the switch from the normal position shown to the reverse position, upon energization of the reverse relay RR, may be traced as follows (see Fig. 3B):—beginning at the terminal B+ of a suitable source of energy, such as a battery, front contact 72 of the reverse relay RR, armature 70 of the motor of the switch machine, back contact 73 of the normal relay NR, contacts 74, 75 and 76 of the switch machine SM, field winding 71 of said motor, contact 77 of the switch selector SS, front contact 78 of the control relay CR through back contact 79 of the supplemental control relay CR¹, to the terminal B— of the same battery. With this circuit completed, the switch machine is operated to its reverse or take-siding position and when it has almost completed its operating stroke, the contact 75 of the switch machine is shifted by suitable lost motion mechanism, so as to break the circuit just traced.

On the other hand, if the switch machine is in the reverse position and the normal relay NR and the control relay CR are energized, the following circuit is completed for returning the switch machine SM and the switch TSE to the normal position:—beginning at the terminal B+, front contact 73 of the normal relay NR through armature 70 of the motor in the opposite direction from what it flowed heretofore, back contact 72 of the relay RR, contacts 80, 75 and 76, field winding 71 of said motor, contact 77 of the switch selector SS, front contact 78 of the control relay CR, back contact 79 of the supplemental control relay CR¹ to the terminal B— of the same battery, thereby causing the motor to be operated in the opposite direction from what it did heretofore, and thereby returning the switch TSE to the main track position.

It will be observed that current may be supplied to the motor of the switch machine to operate it in either direction by alternately energizing the relays NR and RR; and since the normal and reverse operating circuits are both completed at the contacts 74—76 and 76—80 while the switch machine is operating, it may be reversed in mid-stroke, provided that the detector track circuit is not occupied and the approach locking relay CR is energized. This permits the operator to work the switch back and forth, if necessary, and frequently get the switch in its full normal or reverse position in spite of obstructions, when a single stroke would not do so.

Both the normal and the reverse operating circuits include the front contact 78 of the relay CR and back contact 79 of relay CR¹, so that power can be supplied to the switch machine only if relay CR is up and relay CR¹ is down. The way in which these relays CR and CR¹ are controlled, as fully explained hereafter, provides approach locking protection, with release features, similar to that commonly used in interlocking practice. To provide an additional check against improper operation of the switch machine when the relay CR is de-energized, the armature

70 of the switch operating motor is short-circuited through the back contacts 81 and 82 of the relay CR and the time element release relay CR¹ in series.

*Switch selector.*—For various reasons, it is considered expedient to permit operation of the switch manually from an ordinary switch stand, as well as by power. For instance, the switch machine may get out of order; and in this, and similar cases, it is believed to be preferable to disconnect the switch from the switch machine and operate the switch points from a typical switch stand construction, providing for holding the points in their shifted positions. While this is optional, it is contemplated for this dispatching system that a suitable switch stand, indicated as HS (see Fig. 3B) will be provided in addition to the switch machine, and a device, conveniently termed a switch selector, employed to connect the switch points to the switch machine or to the switch stand as desired. In a simplified form of switch selector diagrammatically shown, a bar 85 is connected to the switch points, a bar 86 to the switch machine, and a bar 84 to the switch stand; and a locking plunger or bolt 87, shiftable manually in some suitable way (not shown), acts to lock the switch bar 85 to either the bar 86 or 84, permitting the switch points to be operated from either the switch machine or the hand-thrown switch stand. The locking bolt 87 is such that the switch bar 85 can not be disconnected from both of the bars 84 and 86 so as to leave the switch points disconnected from both the switch machine and the switch stand. A circuit controller, indicated diagrammatically as a bar carrying insulated contacts, is operatively connected to the locking bolt 87; and the contact 77 of this circuit controller breaks both the normal and reverse operating circuits for the switch machine upon the initial movement of the locking bolt, so that no power can be supplied to the switch machine when said locking bolt has been moved far enough to engage the bar 84 connected to the switch stand, thereby preventing any damage that might occur if the switch machine should operate with the points connected to the switch stand. The purpose of the other contacts 144 and 153 of this circuit controller are more conveniently explained hereinafter.

It should be understood that the switch selector illustrated is a simplified form, and by itself is not my invention. For a more complete description of a detailed construction of a switch selector, and its advantages, reference may be made to the application of Charles W. Prescott, Ser. No. 110,394, filed May 20, 1926.

Figure 7:
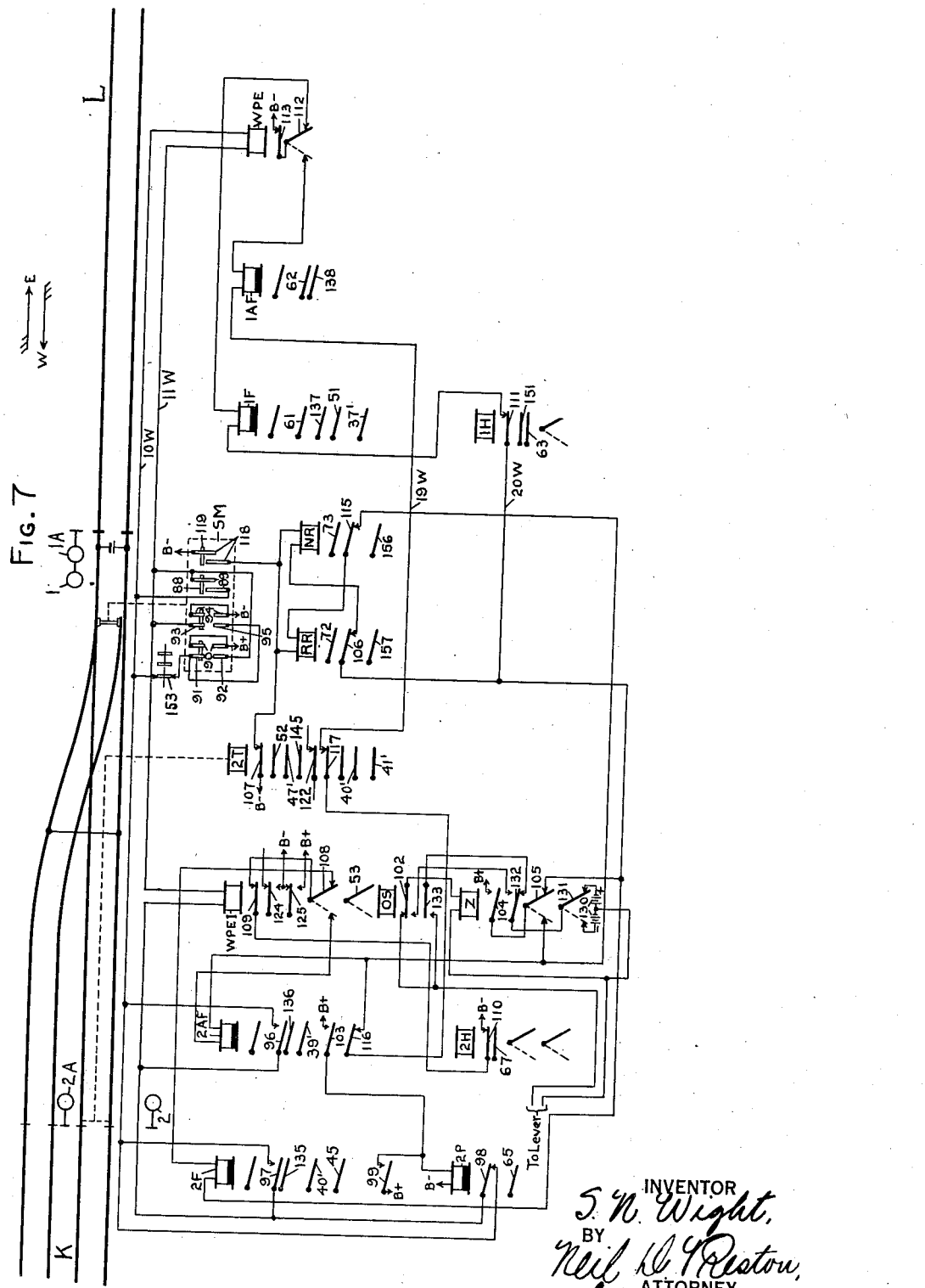
Fig. 7 shows the main circuits and apparatus whereby the switch machine and in turn the signals may be controlled.

*Switch repeater relays.*—To economize in wiring and to obtain certain functions, more fully explained hereinafter, two switch machine repeater relays are preferably employed to open and close circuits depending upon the position of the switch points. These switch repeater relays WPEI and WPE, and their control circuits, are shown in Figs. 3B and 3C in connection with the rest of the equipment; and Fig. 7 shows these same relays and circuits isolated to a large degree from the other circuits. These relays WPEI and WPE are polarized relays, either of the neutral polar type, or motor type; and these relays are controlled by the contacts 91—95 of the switch machine and by the shunting contacts 88—89.

Speaking of their general functions, the relay WPE (see Fig. 3C) is primarily a repeater relay to indicate locally the position of the switch points, but the other relay WPEI may be said to have the function, in cooperation with the signal control relays 2F and 2AF, to transmit code indications back to the tower concerning the position of the switch points and indications of the signals 2 and 2A.

Considering now the control circuits for these relays, and assuming that the switch is in the normal position as shown, the relays 2AF, 2F and 2P being de-energized, the energizing circuit for the relay WPEI may be traced as follows (see Fig. 3B and also Fig. 7):—starting at the terminal B+ at the switch machine contacts through the contacts 90, 91 of the switch machine, contact 153 of the switch selector to the wire 10W through the back contact 98 of relay 2P, relay WPEI to wire 11W, contacts 93—94 of the switch machine to the other terminal B—. The relay WPE is connected directly across the wires 10W and 11W (see Fig. 7).

Thus, with the switch machine in the normal position and the signals 2 and 2A in the normal condition indicating stop, the relays WPEI and WPE are energized with a polarity of current, which may be assumed to be positive, and the armatures of these relays assume the corresponding normal position.

With respect to the circuit for the relay WPEI, it will be observed that this circuit is interrupted at the back contact 98 of relay 2P when that relay is energized, this happening if either of the relays 2F or 2AF are energized. It should also be noted that this back contact 98 is shunted by the contacts 96 and 97 of the relays 2F and 2AF if the latter are respectively energized. This particular control has to do with the giving of the code indications, more fully explained hereinafter; and the explanation of the significance of these connections will not be given here.

When the switch machine is in the reverse position, its contacts 90—95 perform a pole changing function so as to energize the wires 10W and 11W with opposite polarity. This will be evident from the circuit connections.

While the switch machine is operating, the contacts 90—95 are all open, cutting off current from the relays WPEI and WPE. Also, while the switch machine is in mid-stroke, its contacts 88—89 are closed and establish a direct shunt or short-circuit across the wires 10W and 11W, so that said relays are shunted as well as de-energized.

The contact 153 of the switch selector is included in the connection between the pole changing contacts of the switch machine and the wire 10W, so that if the switch selector is moved to disconnect the switch machine, the switch repeater relays WPEI and WPE are both de-energized, this in turn causing the signals 2, 2A, 1 and 1A all to give a stop indication. In other words, if the switch is coupled up for hand operation, the signals are all held at stop, and train movement over the switch must be made under hand signals and with the responsibility for the position and locked condition of the switch points imposed on the trainman.

*Super-imposed manual control*

As already briefly outlined, the operator in the tower 10 may control the indications of the starting signals 2 and 2A at each end of each siding and govern the operation of the switch machine to either position, thereby indirectly determining the indications of entering signals 1 and 1A. Considering now the way in which this is accomplished, the control device at each end of each siding includes a three-position electro-responsive device, specifically a neutral polar relay Z, which is connected by two wires 3W and 4W (see Fig. 8) to the control lever CL and associated apparatus in the tower, it being understood that one of these wires in practice is a common wire extending throughout the territory under the control of one operator. The construction of the control lever is considered more in detail later. It is provided with two contact arms 101 and 126 movable together to any one of three different positions and making contact with stationary contacts as indicated. Most of the time the control lever is in the upright position shown; but for convenience, one extreme position will be termed the normal position, and the other extreme position R the reverse position.

Confining our attention to the energization of the relay Z, and the results, this relay is energized with one polarity of current with the control lever CL normal and with the opposite polarity of said lever reversed, and is de-energized with said lever in its intermediate or vertical position. When the control lever CL is in the intermediate or vertical position, and the relay Z is de-energized, the position of the switch machine remains unchanged from that set up by the last movement of the lever to the normal or the reverse position, as the case may be; and the starting signals 2 and 2A and the entering signals 1 and 1A are held in the stop position independently of traffic conditions. In other words, this is the inactive position of the particular control lever CL, with traffic over the corresponding switch blocked for both directions. On account of the interlock between signals, already explained, the sequence of operation of the controlling levers for adjacent sidings determines what signals may clear, depending of course on traffic conditions. Bearing this in mind, attention may now be directed to the results of moving a control lever CL to the normal and to the reverse positions, with the resultant energization of the corresponding relay Z by different polarities.

*Control lever moved normal*

If the control lever CL is moved to the normal position, the energizing circuit for the control relay Z may be traced as follows:—beginning at the + (plus) terminal of the battery 100, contact 101 of the control lever CL, winding of primary bell relay PBR, wire 3W, front contact 102 of the relay OS, winding of the relay Z, wire 4W back to the neutral point of battery 100.

With the circuit just traced completed, the relay Z is energized to its normal right-hand position which corresponds to main track traffic condition; that is, this position of the relay Z is used for clearing one or the other of the main track signals 1 or 2, and completes the necessary circuits for operating the switch machine SM to the main track position if it is not already in that position.

Referring now to Fig. 7 (also shown in Figs. 3B and 3C), let us see what effect is produced when the relay Z is energized to its normal position. Under this condition, a circuit for the normal switch machine relay NR is completed which may be traced as follows:—beginning at the terminal B+ (B plus) of a suitable source of energy, front contact 104 of the relay Z, polar contact 105 of the relay Z, back contact 106 of the reverse relay RR, winding of the relay NR, front contact 107 of the detector track relay 2T to the terminal B—. Had the switch machine SM not already assumed the normal position, it would be operated to its normal position for reasons heretofore given, but since this switch machine already assumes the normal position as shown in Fig. 7, nothing further need be considered.

There is, however, still another circuit completed which may be traced as follows:—beginning at the terminal B+, neutral contact 104 and polar contact 105 of the relay Z, winding of the light signal relay 2F, polar contact 108 of the switch machine repeater and indicating relay WPEI, neutral contact 109 of this same relay, and front contact 110 of the home relay 2H back to the terminal B— of the same battery. With this circuit completed, the signal 2 will assume its clear position providing, of course, that the home relay 2H is energized positively. If this home relay 2H is energized to its dotted position, the signal 2 will assume its caution condition, that is, the yellow lamp Y will be energized instead of the green lamp G, as clearly shown by the circuits shown in dot-and-dash lines in Fig. 3B.

There is still another circuit completed when the relay Z assumes its positively energized position, which may be traced as follows:—beginning at the terminal B+, contacts 104 and 105 of the relay Z, wire 20W, front contact 111 of the relay 1H, winding of the light signal relay 1F, polar contact 112 of the switch machine repeater relay WPE, neutral contact 113 of this same relay back to the terminal B— of the same battery. The completion of this circuit will cause the signal 1 to assume either the clear or caution position, that is, have its green lamp G or its yellow lamp Y illuminated, depending upon whether the home relay 1H is energized normal or reverse, respectively (see dot-and-dash signal circuits in Fig. 3B). It is thus seen that the signals 1 or 2 can not assume a proceed condition unless the relay Z controlled from the tower assumes a position corresponding to that of the switch machine SM, because the energizing circuits for the light signal relays 2F and 1F include polar contacts of the switch machine repeater relays and the relay Z, and if these relays are not in correspondence, such energizing circuit is not completed.

If now the operator in the tower moves his control lever CL to the reverse position (indicated by R) the following circuit for the relay Z is completed (see Fig. 8):—beginning at the — (minus) terminal of battery 100, contact 101 of the control lever CL, winding of the primary bell relay PBR, wire 3W, front contact 102 of the relay OS, winding of the relay Z, wire 4W, back to the neutral point of battery 100; and since this current is of reverse polarity, the relay Z will assume its left-hand dotted position. With the relay Z in its reversed left-hand dotted position (see Fig. 7), the following circuit for the reverse relay RR is completed:—beginning at the terminal B+, neutral contact 104 of the relay Z, polar contact 105 of this same relay in its left-hand dotted position, back contact 115 of the normal relay NR, winding of the reverse relay RR, front contact 107 of the detector track circuit relay 2T to the terminal B— (B minus) of the same battery. With this circuit completed, the switch machine SM is operated to its reverse position, in a manner as already described, so that the switch machine indicating relays WPE and WPEI are reversed and their polar contacts assume the dotted position.

Referring to Fig. 3B, it can be seen that it may be necessary to clear either the signal 2A or the signal 1A with the switch reversed, to allow a train to move from the siding or onto the siding; as the case may be.

Referring first to the control of the signal 2A, and assuming a set-up for east bound traffic and the single track block L clear of opposing west bound trains and clear of east bound trains as far as the next east bound signal 4, then the line relay 2H is energized. Under these conditions, with the relay Z energized to the reverse dotted position, and the switch machine repeater relays also energized to the reverse dotted position, the following circuit is completed for energizing the light signal relay 2AF:—beginning at the terminal B+, contacts 104 and 105, of the relay Z, winding of the relay 2AF, polar contact 108 of the relay WPEI when in its dotted position, neutral contact 109 of this same relay, front contact 110 of the relay 2H, to B— (minus), so that the light signal 2AF is energized and causes the dwarf signal 2A to indicate clear or caution, that is, have its green lamp G or its yellow lamp Y energized, depending on whether the home relay 2H is energized to its normal or its reverse position, (see dot-and-dash signal circuits in Fig. 3B)

Referring now to the entering signal 1A, and assuming a set-up for west bound traffic, the relay 2H is de-energized by the action of the tumble-down arrangement and interlocking between signals previously explained; and then, with the relay Z energized to the reverse position and the switch machine assuming its reverse position, the following circuit for the light signal relay 1AF is completed:—beginning at the terminal B+, front contact 104 of the relay Z, contact 105 of this same relay, assuming the dotted position, back contact 116 of the relay 2AF, (which is deenergized because relay 2H is de-energized), front contact 117 of the track relay 2T, wire 19W, winding of the light signal relay 1AF, polar contact 112 of the relay WPE when in its dotted position, neutral contact 113 of the same relay to the terminal B— of the same battery; so that the lower arm siding signal 1A assumes the proceed condition, that is, has its yellow lamp energized if the relay Z and the relay WPE both assume the reverse position and providing the detector track circuit is not occupied and the track relay 2T is energized (see dot-and-dash signal circuit in Fig. 3B).

It should be noted (see Fig. 7), that if the relay Z is energized to a position opposite from that of the switch machine for the purpose of operating the same, neither the normal relay NR nor the reverse relay RR can assume the energized position unless the detector track relay 2T is energized; that is, the detector track circuit, or fouling track circuit, must be unoccupied; but that after the switch machine has once started operation, the contacts 118 and 119 of the switch machine SM are closed and shunt the contact 107 of the detector track relay 2T, so that after the switch machine has once started operating and the detector track circuit is then occupied, the switch machine will remain in operation until it has completed its stroke. This arrangement prevents the switch machine being stopped at an intermediate point in its stroke due to the entrance of a train upon the detector track circuit.

*Reporting train, switch and signal operation to the operator*

For reasons already indicated, and otherwise apparent to those skilled in train dispatching, it is highly important that the operator should be kept advised of the location and direction of movement of the trains, the operation of the switch machine and the signals. In accordance with this invention, special means is provided for transmitting to the tower, over the same control line circuit, suitable code impulses which serve to tell the operator by audible signals what is taking place, or may be used, if desired, to operate a graphic recorder and make a permanent record.

Figure 8:
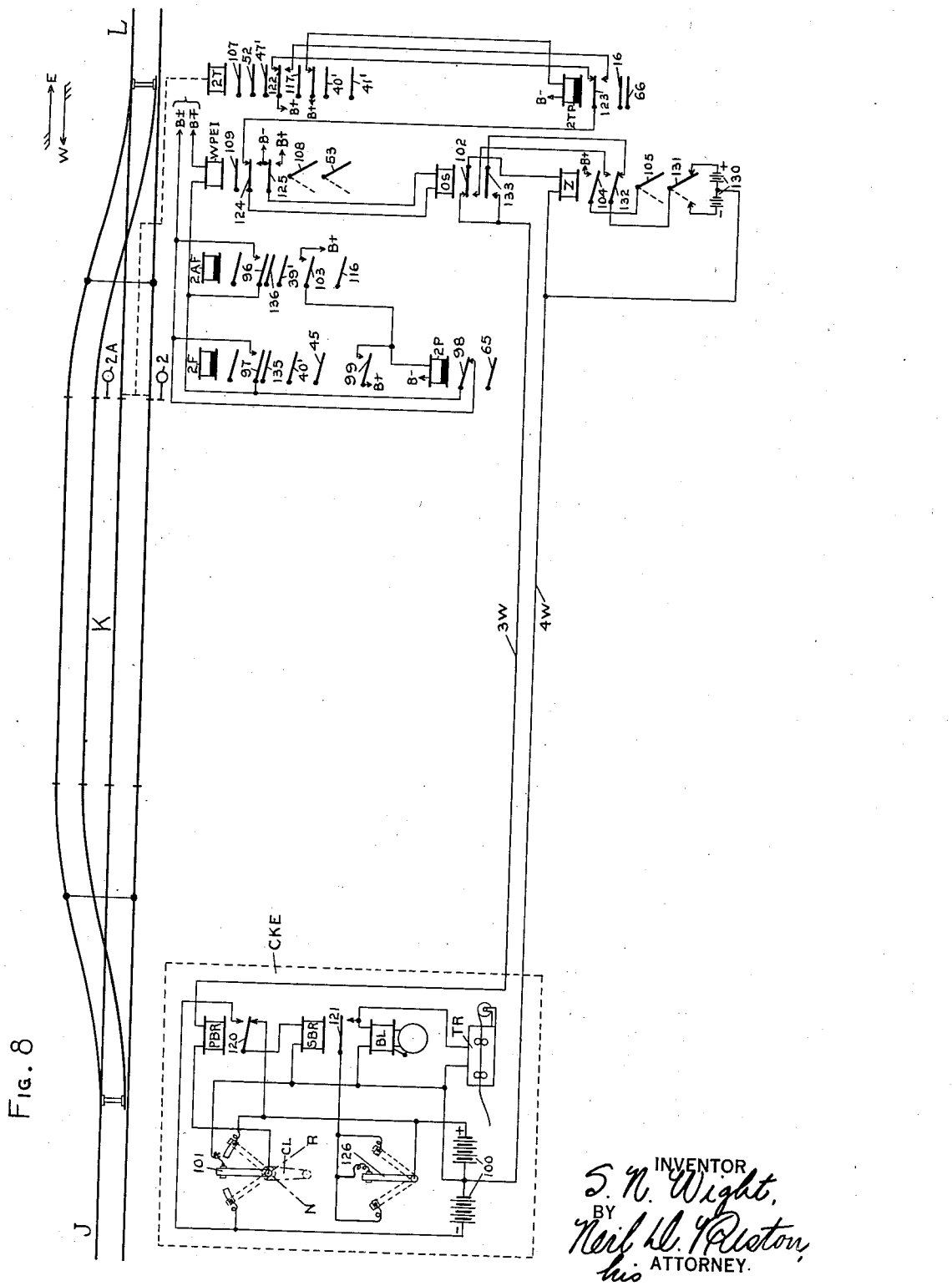
Fig. 8 shows the circuits and apparatus whereby the information as to train, switch and signal movements is indicated and recorded at the tower.

Referring to Fig. 8, which indicates diagrammatically the devices and circuit connections in the tower, provisions are illustrated for giving audible signals by operation of a bell BL, or an equivalent whistle, or the like, and for actuating a tape recorder TR. The preferable type of tape recorder used is discussed hereinafter, and for the present it is sufficient to note that energization of this recorder produces a single dash on the tape. The bell BL may be of any suitable type giving single taps or short rings. This bell and the tape recorder TR are connected in multiple, and are energized from the right hand battery 100 whenever the armature 121 of the secondary bell relay SBR closes its back contact, providing the control lever CL is in its neutral or middle position, or in its extreme normal or reverse positions, so as to complete the circuit through the contact arm 126.

So that the bell taps and the marks on the tape may be of uniform duration, regardless of the length of time the main control circuit remains open or closed, a peculiar characteristic of the ordinary tractive type direct current relay is utilized. It is well known that when the direction of flow of current through the windings of a direct current tractive type relay is reversed, the armature of that relay momentarily drops, because the flux in the magnetic circuit of the relay must necessarily go through zero before it can be reversed. Consequently, a reversal of polarity of current supplied to the relay SBR will result in a momentary closure of its back contact 121. One terminal of the relay SBR is connected to the common terminal of the two batteries 100, and the other terminal is connected to the armature 120 of the primary bell relay PBR, which is included in series in the control circuit through the lever and the relay Z. The front and back contacts of the armature 120 of the relay PBR are connected to the terminals of opposite polarity of the batteries 100. Consequently, whenever the relay PBR is energized, or de-energized, the flow of current through the relay SBR is reversed, and its armature momentarily dropped.

For reasons that will be more fully appreciated as the description progresses, it is proposed to give a code indication when the relay PBR is energized, due to operation occurring at the siding, but not when it is energized by movement of the control lever CL. It is for this reason that the circuit for the bell BL and tape recorder TR includes contacts closed by movement of the lever to its extreme normal or reverse position. Also, the normal and reverse contacts cooperating with the contact arm 101, by which current from the battery in the tower is supplied to the line circuit and the relay PBR, are made long, as indicated, so as to be closed with the lever part way between its middle and extreme positions. By reason of this arrangement, when the lever CL is shifted from its neutral position toward its normal or reverse position, the contact 101 makes and energizes the relay PBR before the contact 126 makes, so that the resultant momentary de-energization of the relay SBR does not cause sounding of the bell BL or operation of the recorder TR. The operator may be depended upon to introduce the necessary time delay between the making of the contacts 101 and 126; or, if desired, a special latch construction may be used in connection with the lever, such as disclosed for instance in the application of Locke, Ser. No. 15,839 filed March 16, 1925, so as to compel the operator to pause at an intermediate point in the movement from the neutral to the normal or reverse position. On the other hand, when the lever CL is shifted from the normal or reverse position toward the neutral position, the pausing of the lever in an intermediate position between an extreme and the neutral position does not have the effect of preventing a tap on the bell and a dash on the recorder, because the contact 126 is closed almost at the same instant the relay PBR is de-energized by such movement of the lever.

With the limitation just pointed out, it should be borne in mind in considering the following explanation of the code indications transmitted from the siding to the tower, that either energization or de-energization of the line circuit, no matter what duration, will result in a single tap of the bell BL, or a single mark on the tape of the recorder.

Referring to Fig. 8, it will be noted that the current changes in the line circuit result from the energization and de-energization of a relay OS. If the relay Z is de-energized, as shown, the de-energization of the relay OS results in connecting one or the other of the batteries 130 across the wires 3W and 4W of the control circuit, through the back contact of armature 133 of the relay OS and back contact of armature 132 of relay Z, through the polar contact 131 of relay Z, normal or reverse, as the case may be. When the control relay Z is de-energized, as just assumed, the lever CL is in its middle position and connects the primary bell relay PBR directly to the common wire 4W, so that the current supplied to said relay PBR comes from the battery 130. The energization of this primary bell relay PBR reverses the polarity of the current to the secondary bell relay SBR and gives one tap of the bell and one mark on the tape of the recorder TR. When the relay OS is again energized, the batteries 130 at the siding are disconnected from the line circuit and the relay PBR is de-energized, again reversing polarity of the energizing circuit for the relay SBR and giving another bell tap and another mark on the recorder tape.

If the control lever is in either its normal or its reverse position and the control relay Z is consequently energized either normal or reverse, the de-energization of the relay OS acts to break the line circuit and interrupt the flow of current through the primary bell relay PBR by disconnecting the wires 3W and 4W of the line circuit at the siding. Referring to Fig. 8, it will be observed that, with the relay Z energized, upon de-energization of the relay OS, the wire 3W is dead-ended, so to speak, the front contact 102 of the relay OS being open, and the back contact 133 of said relay OS being connected to the open back contact 132 of the relay Z. Consequently, current ceases to flow through the relay PBR, and for the same reasons already pointed out, one single code impulse is received. The control relay Z is maintained energized from the local batteries 130 during the transmission of this code impulse, so that no change is made in the devices at the siding. While the relay OS is down, the relay Z if energized as just assumed, is maintained energized by current from one or the other of the batteries 130 over a stick circuit which may be traced as follows:—from the common terminal of the batteries 130, relay Z, back contact 102 of relay OS, front contact 132 of relay Z, polar contact 131 of relay Z to one of the batteries 130 depending on the position of said polar contact. The batteries 130 and the position of the polar contact 131 are selected so that this stick circuit provides current through the windings of the relay Z in the same direction as when energized from the tower battery.

From this explanation, it can be seen that whenever the relay OS is either de-energized or energized, and regardless of whether the control relay Z is then energized or de-energized, one code impulse is transmitted, comprising one bell tap and one dash or mark on the recorder tape. Also, if the relay Z is energized at the time, it is maintained energized by a local stick circuit, so that no change takes place in the signals or switch machine at the siding while the code indication is being transmitted. The various code indications corresponding to different train movements, and switch and signal operations, are the result of the energization and de-energization of the relay OS; and the control of this relay may now be considered.

It is first pointed out that the relay OS is caused to release its armature, thereby opening its front contact and closing its back contacts, in two different ways, first by breaking its energizing circuit for some time, and second by momentarily reversing the polarity of current through its windings, such reversal causing its armature to drop for a moment for the reason already pointed out in connection with the relay SBR.

Referring particularly to Fig. 8, the relay OS is controlled directly by the switch machine repeater relay WPEI, the detector track relay 2T, and the slow releasing detector track repeater relay 2TP. Several alternative circuits are involved. First, assuming the relays WPEI, 2T and 2TP energized as shown in Fig. 8, the energizing circuit for the relay OS may be traced as follows:—commencing at B+, front contact 122 of relay 2T, front contact 123 of relay 2TP, front contact 124 of relay WPEI, relay OS and front contact 125 of relay WPEI to the terminal B—. When the relay WPEI drops its armature, its contact fingers 124 and 125 reverse the polarity of current through the relay OS, as will be evident from the circuit connections. This reversal of polarity of current for energizing the relay OS causes its armature to momentarily drop and then pick up, giving two bell taps and two dashes on the recorder.

When the relay WPEI is again energized, the same reversal of polarity occurs, and the same two bell taps. These bell taps are relatively close together, being spaced apart by the relatively small time required for the relay OS to drop and pick up its armature upon reversal of polarity of the current through its windings. Thus, each energization, or de-energization of the relay WPEI gives two closely spaced bell taps.

The repeater relay 2TP is directly controlled by the detector track relay 2T, as will be evident from the circuits, so that whenever said track relay 2T is de-energized, the relay 2TP is in turn de-energized and will drop its armature 123 after a short time, the said relay 2TP being slow-releasing, as conventionally illustrated. Consequently, when the track relay 2T drops its armature, current is for the moment cut off from the relay OS, and this condition exists during the time it takes for the armature 2TP to close its back contact 123, whereupon current is again supplied to the relay OS through the back contacts 122 and 123 of the relays 2T and 2TP in series. The de-energization of the relay OS gives one bell tap, and its subsequent re-energization gives another bell tap, these being spaced apart according to the time of releasing of the relay 2TP. Thus each time the detector track relay 2T is de-energized by the entrance of a train into the detector track circuit, two well spaced bell taps are received.

When the detector track relay 2T picks up, the relay OS is likewise de-energized for the short interval required for the relay 2TP to pick up its armature and close its front contact 123, whereupon the OS relay is again energized. As ordinarily constructed, the relay 2TP will pick up its armature quicker than it releases its armature, so that the two bell taps resulting from energization of the track relay 2T are spaced closer together than those resulting from a de-energization of said relay 2T. The parts are preferably proportioned so that both of these bell taps are spaced farther apart than those resulting from the reversal of polarity of the relay OS, so that all three of these double bell taps are distinguishable by the time interval between them. In other words, there is provided two closely spaced bell taps for each energization or de-energization of the relay WPEI; two bell taps spaced further apart for each energization of the relay 2T; and two bell taps still further spaced for each de-energization of the relay 2T.

The control for the switch repeater relay WPEI has already been explained; and bearing this in mind the code indications for different train movements and signal and switch operations can be made clear.

*Indications of train movement.*—Whenever a train enters the detector track circuit and drops the track relay 2T, two widely spaced code indications are received. If the train comes onto the detector track circuit from the single track block or stretch of single track, that is, is a west bound train in Fig. 8, these two widely spaced code indications are all that are received; but if the train enters this detector track circuit from the siding, or the main track opposite the siding, these two code indications are followed by other code indications, so that the operator can easily tell the direction of movement of the train entering the detector track circuit. Referring to Fig. 8, in order for an east bound train to enter the detector track circuit and drop the relay 2T, either the signal 2 or 2A must be clear; and this means that either the relay 2F or 2AF, is energized and likewise the relay 2P (which is directly controlled by the relays 2F and 2AF). At this time, then, the circuit for energizing the relay WPEI is completed at the front contacts 96 or 97 of the relays 2AF or 2F, as the case may be, and is broken at the back contact 98 of the slow-releasing relay 2P. Now, when the east bound train in question enters the detector track circuit and drops the relays 2T and 2TP, it breaks the energizing circuit for the relay 2H (see Fig. 2 and also Fig. 3B), which relay 2H in turn breaks the energizing circuits for the relays 2F and 2AF (see Fig. 7 and also Fig. 3B). When the armature of the relay 2AF or 2F, as the case may be, drops, it opens the front contact 96 or 97 at the same time as its front contacts 99 or 103 de-energize the relay 2P; and it will be evident that current is cut off from the relay WPEI during the time required for the relay 2P to close its back contact 98. Therefore, the relay WPEI is de-energized, reversing polarity of the current for the relay OS and giving two closely spaced bell taps, and after a moment, said relay WPEI is again energized, again reversing polarity, and giving two bell taps.

From this explanation, it can be seen that, whenever the train passes a starting signal, that is, leaves the siding, two widely spaced bell taps resulting from the dropping of the detector track relay 2T are followed by two pairs of closely spaced bell taps, caused by the starting signal assuming its stop position. In short, six taps are given on the bell or six marks on the tape recorder, grouped or spaced according to the time constants of the relays 2TP, 2A, 2AF and 2T. While this grouping may, of course, take various forms, it is contemplated that these bell taps will come in the sequence and with the spacing graphically indicated at 255 in Fig. 18.

When the train leaves the detector track circuit and is in the clear, a code indication is received due to the energization of the detector track relay 2T. When the track relay 2T picks up, the relay OS is successively de-energized and energized to give two closely spaced code indications, as previously explained. This indication is the same whether the train leaves the detector track circuit by moving into the single track block between the sidings, or has moved into the clear on either the siding or the main track opposite the siding. The operator knows, however, from the indication received when the train enters the detector track circuit whether the train is traveling toward or away from the siding, as already explained; and hence the operator can tell whether the train has gone into the clear at the siding or is on its way to the next siding. For instance, referring to Fig. 8 and the east end of the siding K, the operator can tell whether it was an east bound or a west bound train which entered the detector track circuit, and thus can interpret the significance of the two closely spaced bell taps given when that train leaves the detector track circuit. The operator can tell whether the train has gone into the clear on the siding or on the main track by the position of the switch, which he can conveniently determine from the indicator, hereinafter described, which is associated with the corresponding control lever CL.

Summarizing these code indications of train movements, and for simplicity referring to the east end of the siding K in Fig. 8, when a west bound train moves from the single track block L by the entering signal 1 or 1A into the detector track circuit, two widely spaced bell taps or marks on the tape are received; and when this train advances into the clear entirely out of the detector track circuit, two other bell taps the marks on the tape are received, but are distinguishable by being spaced closer together. The operator tells from the position of the switch whether the train has gone into the siding or is on the main track opposite the siding. When an east bound train passes the starting signals 2 or 2A, as the case may be, and enters the detector track circuit, two widely spaced indications are received, and these are immediately followed by two pairs of closely spaced indications as the relay 2F or 2AF is automatically de-energized; and when this train leaves the detector track circuit, two closely spaced indications are received. The operator knows from the position of the switch whether this train in question advanced from the siding or from the main track opposite the siding.

*Indications of signal operation.*—In the specific arrangement disclosed, no code indications are received when the control lever CL is moved to the normal or reverse position to energize the relay Z and cause the starting signals 2 or 2A, or the entering signals 1 or 1A, to clear. As previously pointed out, there is no indication received when the lever CL is moved to energize the line circuit, due to the long wipe contacts for the arm 101 of the lever and the arm 126 and its contacts in the bell and recorder circuit. The relay WPEI is not de-energized when the relay 2F or 2AF picks up, because their front contacts 96 and 97 close before the back contact 98 of the repeater relay 2P opens. Although, for lack of such a code indication, the operator is not directly advised whether or not the starting or entering signals have actually cleared in response to his manipulation of the control lever, with or without previous operation of the switch, it is believed that this is not necessary, because no question of safety is involved, and also because the operator can, if he wishes, check the response of a starting signal, as about to be explained, by putting it to stop by manual control.

It has already been explained what indications are received when the starting or entering signals are automatically put to stop by trains. An indication is given when the starting signals 2 or 2A are put to stop by manipulation of the control lever CL. If the control lever is in the normal or reverse position, energizing the corresponding relay Z normal or reverse, and this lever has been operated in such a sequence with other levers that the starting signal 2 or 2A, as the case may be, is clear, the relay 2F or 2AF is energized (see Figs. 7 or 8). If the operator now restores the control lever to the middle position, the relay PBR is de-energized, and assuming that the operator moves his control lever quick enough, the circuit for the bell BL and the recorder TR is closed at the lever contact 126 at the time the relay SBR responds, so that one bell tap and one mark on the tape is received. The control relay Z is of course de-energized, and this de-energizes the relay 2F or 2AF, as the case may be. As previously pointed out, this results in a successive de-energization and energization of the relay WPEI, thereby causing four bell taps or marks on the tape, the same as if a train had put the signals 2 or 2A to stop. Thus, an indication of one bell tap or mark on the recorder tape, followed by four taps and marks, is received when the starting signals are put to stop by movement of the lever. In the particular arrangement disclosed, no indication is received when the entering signals 1 or 1A are put to stop by the lever; but here again the operator is able to obtain a certain kind of check upon the signal indications existing at a given end of a siding by taking into consideration sequence of operation of levers, and the reception or non-reception of an indication when his lever is put to the middle position. In this connection, it is thought to be sufficient to point out that, dependent upon the sequence of operation of adjacent control levers, when a given lever is put, for instance, in the normal position, either the starting signal 2 or the entering signal 1 will clear. If this lever is put in the middle position, a code indication shows that the starting signal 2 has cleared, and the lack of indication that the entering signal 1 has probably cleared.

Mention is conveniently made at this point of a train movement from an intermediate siding into the stretch of single track. In practice, there are frequently industrial sidings and the like at intermediate points between main passing sidings. It is contemplated that a telephone will be located at each of these intermediate sidings, and that the train crew will call up the operator before opening the switch to come out. If the starting signal at one or the other end of the stretch of single track happens to be clear at the time the switch is opened, this signal is automatically put to stop by the switch box contacts and the tumble-down arrangement in the same way as in ordinary signaling; and a code indication would be given in the tower, showing that a starting signal has been put to stop, this code indication being distinguishable from that received when the starting signal is put to stop by the lever, or by a train. The same thing would happen in the rare instance where there is accidental shunting of an intermediate track circuit by a crow bar or the like, it being noted that such accidental shunting, when removed, may reverse the direction of traffic previously set up by the operator, because the relays controlling the opposing starting signals will race to clear their signals, and the outcome of the race may be different from that determined by the sequence of operation of the levers. Of course, if this should happen, the operator merely has to restore his levers to the middle position and set up the direction of traffic over again.

*Indications of switch machine operation.*—Referring to Figs. 7 and 8, when the switch machine starts operating, the energizing circuit for the switch repeater relay WPEI is broken at the contacts 90—95, and said relay is also shunted by the contacts 88—89. This dropping of the relay WPEI reverses polarity of current to the relay OS and results in two very closely spaced bell taps or marks on the recorder tape. When the switch machine completes its cycle of operation and locks up, the relay WPEI is again energized, though with reversed polarity; and such energization gives two more very closely spaced indications. In short, an indication, in the form of two very closely spaced bell taps, is received when the switch machine starts, and two others when it completes its operation. The time interval between these two pairs of bell taps depends upon the time of operation of the switch machine; and in practice this is sufficiently different from the time of operation of the relay 2P that the code indication of switch operation is distinguishable from that of starting signals assuming the stop indication. The giving of an indication when the switch machine starts to operate, and also when it completes its operation, enables the operator to determine whether or not the switch machine has properly responded, and makes it possible for him to work the switch points back and forth, if necessary to clear out obstructions. The failure to receive the two bell taps when the lever is thrown to cause operation of the switch machine does not necessarily indicate that Switch selector operation.—Referring to Figs. 3B and 7, it will be observed that the contact 153 associated with the switch selector opens and deenergizes the relay WPEI, whenever the switch selector is manipulated to couple the switch for hand operation. This gives two bell taps. The same code indication is received when the switch selector is restored to set up for power operation. These indications are helpful to the operator in keeping track of the manipulation of the switch selector in response to his orders over the telephone.

The various code indications heretofore explained, and their sequence in grouping, enables the operator to be adequately advised of what is occurring at the different sidings throughout the territory under his control, so that he is able to handle the traffic through this territory without reports from other operators, or from the train crews, and with no delay in train movements, other than that necessitated in making meets or passes. It is desired to emphasize that the code indications are obtained by simple devices of established dependability, and derive their significance as much from the sequence in which relatively simple codes are received, as well as from the number of code impulses and their spacing. While the particular means of providing code indications herein disclosed is preferred, it should be understood that other expedients may be employed for this purpose without detracting from the other advantageous characteristics of the complete system. Likewise, additional code indications may be provided by additional mechanism, if desired, although it is believed that the information furnished the operator is sufficient to enable him to handle traffic efficiently.

Approach locking

As already explained, the primary controlling means for the switch machine is the relay Z which may be energized normal or reverse by the operator at the distant tower to condition the switch machine for operation to a corresponding position. The relay Z controls the normal and reverse switch operating relays NR and RR; but neither of these relays can be energized unless the detector track circuit is clear and the track relay 2T is energized to close its front contact 107 (see Fig. 3B). Hence, the switch machine when at rest can not be operated under any conditions if the detector track circuit adjacent to the switch points is occupied.

In addition to these devices determining operation of the switch machine, unless the approach locking or control relay CR is energized and relay CR¹ is deenergized, current can not be supplied to the switch machine motor, even though one of the relays NR or RR is picked up, it being evident from Fig. 3B and what has already been explained that, with the relay CR de-energized, the connection from the field of the motor to the negative battery is broken at the front contact 78, and the armature is shunted by the back contact 81 if relay CR¹ is deenergized. The purpose of the relay CR, and its controlling means about to be described, is to prevent operation of the switch machine under the conditions of train movement which might make operation dangerous. Generally speaking, the switch machine can not operate if a train within a limited distance of the switch is approaching it from either direction under favorable signal indications, so that if the switch should be thrown, the train might not be stopped.

Referring now to the controlling circuits and devices for the approach locking relay CR, shown in Figs. 3B and 3C, and to better advantage in Fig. 9, it is first noted that the relay CR is a stick relay, and when once energized in some one of the ways presently pointed out, it will be maintained energized by a stick circuit which may be traced as follows:— starting at the positive terminal of the battery, front contact 145 of relay CR through the relay CR, back contact 135 of the relay 2F controlling signal 2, back contact 136 of relay 2AF controlling signal 2A, back contact 137 of relay 1F controlling signal 1, and back contact 138 of relay 1AF controlling signal 1A to negative battery. Hence, if the relay CR has been energized in any one of the ways hereinafter pointed out, so long as the operator leaves his lever in the neutral position and holds all of the signals 1, 1A, 2 and 2A at stop, he has complete control over the switch machine, and may operate it to either position, or move it back and forth as much as he pleases. It should be understood that this is a safe condition, because the signals being at stop block traffic over the switch in both directions, and any approaching trains receive a caution indication and a stop indication, and will come to a stop before reaching the switch.

Whenever any one of the signals 1, 1A, 2 or 2A is cleared, the relay CR is de-energized, and will remain de-energized so long as a signal is clear. Consequently, if signals have been cleared to permit traffic to pass over the switch, the operator is powerless to operate the switch.

After a little consideration, it will be evident that it is not necessarily safe to permit operation of the switch machine as soon as the signals 1 and 1A, 2 and 2A, governing traffic over the switch, are put to stop, because a train may have accepted a previously existing favorable signal indication and be approaching at such high speed that it could not be stopped in time. For this reason, provisions are made so that any train approaching the switch and within a limited distance thereof at the time the signals are clear will prevent the energization of the relay CR even though the signals 1, 1A, 2 and 2A are put to stop. Referring to Fig. 9, the relay CR has several pick-up circuits. If the relay A is energized, a pick-up circuit for the relay CR is established as follows:—commencing with the positive terminal of the battery, front contact 140 of relay through relay CR and through the back contacts 135, 136, 137 and 138 respectively of the signal control relays 2F, 2AF, 1F and 1AF to negative battery.

The relay A is energized if there is no train within a limited distance of the switch approach within it from either direction. The energizing circuit for the relay A may be traced as follows:— beginning at the positive or negative battery through the front contact 11 or back contact 18 of the relay 4PC at signal 4 through the front contact 148 of track relay 4T, front contact 149 of track relay 3T, front contact 150 of track relay 2T1, front contact 151 of relay 1H through winding of relay A to the common.

Considering first the portion of track to the east of the switch (Fig. 9), including the track sections for the track relays 2T1, 3T and 4T, it will be observed that a train present on any one of these track sections tends to de-energize the relay A. This approach locking limit extends one track circuit in the rear of the signal 3, so that the approach locking is effective if a train is so close to the switch that it will not be sure to receive a caution indication at the signal 3, if the signal 1 or 1A, formerly at clear, is put to stop by the operator with the intention of changing the switch. This approach locking within these limits is effective only for west bound traffic toward the switch. An east bound train passing the signal 4 picks up the stick relay 4S, and its front contact 152 and connecting wires shunt the front contact 148 of the track relay 4T, so that the presence of such an east bound train on this track section does not interrupt the energizing circuit for the relay A. As for the track sections between the signals 1 and 3, an east bound train passing the signal 2 picks up the stick relay 2S and holds it up until this east bound train has passed the signal 4; and the relay 2S when energized provides in effect through its front contact 141 a shunt for the front contact 140 of the relay A, so that although said relay A may be de-energized by the presence of an east bound train on the track sections for the relays 2T1 and 3T, a pick-up circuit for energizing the relay CR is established.

Considering now the approach locking limits to the west of the switch, the relay A is de-energized whenever the relay 1H is de-energized; and referring to Fig. 2, it will be noted that the line circuit for the relay 1H includes front contact 47¹ of the track relay 1T, front contact 46¹ of the track relay 1T, front contact 52¹ of the track relay 7T and front contact 50¹ of the track relay 7T3, so that the approach locking limits extend one track section in the rear of the signals 8 and 8A governing traffic toward the switch. The approach locking is effective for these limits only for east bound traffic toward the switch, because a west bound train passing the signal 1 and continuing on the main track will pick up the stick relay 1S, thereby providing a pick-up circuit for the relay CR through its front contact 142, and will stick up this relay until said west bound train has passed the signal 7. When the west bound train under consideration passes the signal 7 it picks up the stick relay 7S, thereby providing a shunt for the front contacts 52¹ and 50¹ respectively of the track relay 7T and 7T3, thereby energizing the relay 1H and permitting energization of the relay A, if conditions otherwise permit.

As already noted, the stick relay 1S picks up if the signal 1 is clear and the train continues on the main track, but does not pick up if the signal 1A is clear, and the signal 1 at stop, and the train passes onto the siding. When the switch shown in Fig. 9, therefore, is set for the siding, it is necessary to provide means, other than the stick relay 1S, for permitting energization of the approach locking relay CR when a west bound train has passed over the switch and onto the siding. This condition is taken care of by back contact 145 of the detector track relay 2T which provides, with its connecting wires, another energizing circuit for the relay CR, independent of the relays A, 2S and 1S. Consequently, when the switch is set for the siding, and the signal 1A cleared for west bound traffic, the relay CR is energized when the train enters the detector track circuit, the back contact 145 of the relay 2T being closed, and the back contacts of all of the signal control relays 2F, 2AF, 1F and 1AF being also closed due to the presence of the train; and if the operator at this time puts his lever in the neutral position so that signal 1A will not clear up when the train going onto the siding leaves the detector track circuit, he is able to maintain the relay CR energized and thereby render the approach locking ineffective for a following westbound train. This release is proper and safe, because the opposing signal 2 is necessarily at stop, due to the direction of traffic set up and the position of the switch; and the signals 1A and 3 governing west bound traffic toward the switch necessarily give restricted indications to any following train sufficient to assure it coming to a stop before reaching the switch. For instance, if there happened to be west bound trains closely following one another in the case under consideration, the following train could never receive an indication at the signal 3 more favorable than a caution indication, and consequently would be under control and would stop at the signal 1A, if the operator had prevented said signal 1A clearing, as just explained. By virtue of this feature of the approach locking scheme, the operator is able to throw the switch with safety and put two closely following trains on the siding and on the main track, by moving his lever to the neutral position at the right time although the following train would ordinarily render the approach locking effective. It is contemplated that the operator, knowing that two trains are following each other closely, will be prepared to move his lever to the neutral position while the first train is on the detector track circuit. In fact, the operator would have to act promptly when the first train reports in, otherwise the following train would be directed by the signals to follow into the siding, or take the main track, directly behind the first train.

Frequently, in making a meet between an east bound train to hold the main track and a west bound train to take the siding, referring to the east end of the siding K in Fig. 9, the east bound train will arrive first and pull up to the signal 2, deenergizing the line relay 1H in so doing. When the west bound train to take the siding arrives and is on the detector track circuit, the locking relay CR is picked up through the back contact 145 of the detector track relay 2T, as just described; and the operator, by putting his lever to neutral at that time, may maintain the relay CR energized, although the east bound train is keeping the relay 1H de-energized. In the case of such a meet, however, it is considered that the operator may not necessarily, for some reason, be alert and put his lever in the neutral position at the right time; and in order to relieve the operator of this responsibility, where close attention is not otherwise required, as in the case previously considered, the switch repeater relay WPE is preferably provided with a contact 139 which is closed if the switch is reversed and set for the siding, and which with its connecting wires provides a shunt for the front contact 151 of the line relay 1H. Thus, if the switch is reversed, the relay A may be energized to pick up the locking relay CR, as soon as the signals 1A or 2A are put to stop, in spite of the fact that the line relay 1H may be de-energized due to the presence of an east bound train approaching the switch on the main track opposite the siding. Under these conditions, as soon as the operator moves his lever to operate the switch machine, the signal control relay 1AF or 2AF is de-energized, then the relay CR picks up, the switch operates, and then the other signal control relays 2F or IF may be energized. It is safe and proper to permit operation of the switch machine under the conditions just explained, because the signal 2 is held at stop, the switch being reversed, and any approaching east bound train will receive caution and stop indications to bring it to a stop before reaching the switch. A west bound train within the approach locking limits, that is, on the track section for the track relays 2T1, 3T and 4T, will prevent energization of the locking relay CR in spite of the contact 139 on the switch repeater relay WPE.

There is another special case in which the approach locking for one direction is not effective. Referring to Fig. 2, and the approach locking for the switch at the east end of the siding K, the relay 1H may be energized, eliminating the approach locking for east bound traffic on the track sections for the track relays 7T8 and 7T, if the west bound switch TSW is reversed and set for the siding, because in that event contact 53¹ of the switch repeater relay WPW1 is in the reverse or dotted line position and provides a shunt for the front contacts of said track relays 7T8 and 7T. It will be evident that this is a safe condition, since an east bound train can not approach the switch TSE at the east end of the siding K if the switch TSW at the west end of the siding K is reversed and set for the siding.

The approach locking is preferably provided in the manner just explained in order to obtain a high degree of facility of operation of the switches, with the requisite safety; but it is of course evident that some of the special features of approach locking provided may be omitted or modified in certain particulars at the sacrifice of requiring manipulation of the system in a predetermined way in order to be able to operate the switch at once without delay to trains.

While the approach locking arrangement is capable of permitting operation of the switches with safety under ordinary train movements, special conditions may exist where the operator is prevented from operating a switch by the approach locking control; and in such cases it is desirable to provide a special release means, safeguarded in such a way that the switch can not be thrown in front of an approaching train. Several ways of providing this emergency release are contemplated.

*Approach locking release waiting time.*—This scheme of emergency release, generally speaking, is predicated on the theory that, after the lapse of the relatively long interval of time following the putting of the signals to stop, any approaching train accepting a favorable signal indication will either have reached and passed the switch or will have been brought to a stop. This time interval, of course, will vary with the distance between signals, the running time of trains, and other factors; and it is contemplated that the time selected will be great enough to take care of the most unfavorable conditions.

Referring to Fig. 9, the relay CR may be energized, independently of any of the pick-up circuits heretofore considered, and provided all of the signal control relays 2F, 2AF, IF and IAF are de-energized, when a time element relay CR¹ has been energized long enough to close its front contact 143. This time element relay CR¹ is energized when the relay CR is down to close its back contact 158, and when either the switch control relay RR or NR is energized to close its front contact 157 or 156, and the signals are at stop with contacts 135, 136, 137 and 138 of relays 2F, 2AF, IF and IAF closed. Consequently, when the operator throws his lever and energizes either the relay RR or NR, if the approach locking is effective, so that the relay CR is de-energized even though the contacts 135, 136, 137 and 138 are closed, energy is applied to the time element relay CR¹; and after the lapse of the predetermined time interval (say one to four minutes), said relay CR¹ closes its front contact, and energizes the relay CR, which then sticks up. When the relay CR picks up, the time element relay CR¹ is de-energized. After a further time interval, corresponding to the drop away time of relay CR¹, the back contact 79 of relay CR¹ is closed; and then the normal or reverse energizing circuit for the motor of the switch machine, previously described, is closed through a back contact 79 of relay CR¹ and front contact 78 of relay CR.

By virtue of this arrangement, the operator may operate the switch machine, notwithstanding the approach locking, after a limited time; and the time element means (relay CR¹) is automatically set into operation whenever the operator tries to operate the switch and the approach locking is effective.

*Operation of switch by hand to avoid waiting of time.*—If the train crew reaches the switch and all of the signals are at stop, possibly because the automatic apparatus is delayed on account of the time which must elapse before the relay CR¹ can pick up, or possibly because no time relay (relay CR¹) has been provided in the system, this train crew may shift the switch selector over so that the track switch is mechanically connected to the switch stand HS, and by this means may operate the switch by hand. In this connection it is desired to state that railroad rules usually require the train crew to call the operator or dispatcher if they find signals blocking their movement apparently for no reason, and it is assumed that there is a telephone available and the train crew will act in accordance with instructions from the operator or dispatcher in case they find all signals against them and such instruction can be transmitted. It should be noted that while the switch selector is connected for switch stand operation, that the contact 77 in the circuit of the motor for the switch machine SM is open and that the switch machine can not be operated by power. Also, it should be noted that the contact 153 of this switch selector SS is open, and that for this reason the switch machine repeater relays WPE and WPEI are de-energized and neither of the four signals adjacent the switch in question can be cleared. Also, the opening of contact 153 and dropping of the relay WPEI causes the bell at the tower to sound two taps either by momentarily completion of the feed-back circuit or by momentarily dropping of the contact 102 and breaking of the circuit for the relay PBR for reasons already given. Further, it should be noted that no indications are transmitted to the tower so long as relay WPEI remains de-energized, this because current for the relay OS remains energized and undisturbed regardless of the operation of relays 2F, 2P, 2AF, 2T, and 2TP, (see Fig. 8) under the conditions assumed. The advantage of this feature of the invention is that if the track switch has been connected up for hand operation and switching is going on to rearrange the order of the cars, or the like, no indications of the repeated dropping and picking up of the track relay 2T will be transmitted to the tower.

The provision of the switch selector SS whereby the track switch may be operated manually directly by the switch stand HS has the advantage of permitting the track switch to be thrown very quickly, this is not true when a switch machine is cranked by hand, this being an important consideration where car switching or shifting is being done. If, after the switch has been manually operated, the switch selector is changed back so that the track switch is connected for switch machine operation, certain of the signals may be cleared providing the tower operator has energized the relay Z in the proper direction, also two single taps on the bell BL are given to inform the operator that the switch may now again be operated by the switch machine. From this it appears that the supplemental control relay $CR^1$ may be entirely omitted, if desired, in which event the switch may be operated by hand by the train crew in the usual way when it finds all four signals at stop.

*Approach locking release by operating the switch selector SS to hand switch operation and back again.*—Another expedient in lieu of waiting the time necessary for the supplemental control relay $CR^1$ to pick up and drop, resides in the use of the switch selector SS as a means for picking up the control relay CR. For instance, the switch selector SS may be shifted so that the track switch TSE is connected for hand operation by the switch stand HS, and in so doing the contact 144 of the switch selector SS closes the pick-up circuit for the control relay CR, assuming of course that the relay 2F, 2AF, IF and IAF are all de-energized. As soon as the control relay CR has been picked up, and is then stuck up through its stick contact 145, the switch selector SS may be changed back to the condition for switch machine operation of track switch TSE, and in so doing the contacts 77 of the switch selector SS closes the only break (assuming relay NR or RR energized) in the motor circuit of the switch machine and the switch machine may operate. In other words, the supplemental slow-acting control relay $CR^1$ may be omitted from the system, and the contacts of the switch selector SS used in lieu of this supplemental control relay. In this connection, it is desired to point out that it is considered safe to have the train crew itself release the approach locking mechanism on the assumption that there must be a train present, which for some time has blocked all signals, within dangerous limits of the track switch in question.

*Approach locking release by a protected push button.*—As another alternative form of means for releasing the approach locking mechanism in lieu of the supplemental control relay $CR^1$, it is proposed to provide a push button PB (see Fig. 10) which is contained in a suitable locked box, so that it can be operated by authorized persons only. This push button PB may contain contacts similar to those contained on the switch selector SS, which contacts may be used in lieu of the switch selector contacts and for this reason have been given like reference characters having distinctive exponents I. In other words, if desired, the system may be used without a switch selector and without the supplemental slow-acting control relay $CR^1$ in which event the push button (see Fig. 10) is substituted for the contacts of the switch selector SS, and in which event the train crew of a train which has entered the approach locking zone before the operator in the tower has started operation of the switch machine, either because he was prevented from doing so or on account of negligence, may actuate this push button (Fig. 10) to pick up the control relay CR and then allow the push button PB to return to its normal position by the action of springs 154, after which actuation the switch machine may be operated by the operator in the tower in the usual manner. In this case as in the preceding case the presence of the train and the judgment of the employee operating the push button is relied on to safeguard other trains. It should be noted that the switch machine can not be operated by power while the push button PB (Fig. 10) is held in its depressed position. This arrangement of contacts and circuits is employed to protect the system in the event that the push button were maliciously or accidentally left in their depressed position.

*Apparatus in tower*

In the foregoing description as a lever or controller an indication device has been mentioned as forming a part of the tower apparatus for one end of a passing siding, which tower apparatuses, however, are located in the tower 10 and have heretofore been designated CIW, CIE, CKW, CKE, etc. It is deemed expedient to now more fully describe this apparatus.

*Controller.*—Referring to Figs. 11, 12, 13, 14, and 15, wherein the controllers of the tower apparatuses CIW, CIE, CKW, and CKE have been shown. The relation of these apparatuses to the system as a whole is best understood by comparing Figs. 1 and 11. In view of the fact that these controllers are substantially the same, it is considered necessary to describe only one of them, namely, the controller CLKW. This controller CLKW comprises a base plate 160 (see Fig. 13) to which a hollow cover 161 is screw-fastened so as to form a casing. In this casing is pivotally mounted a shaft 162, having a lever CL fastened thereto in any suitable manner, such as by the screw 163. On this shaft 162 are contained two contact fingers or switch arms 101 and 126 carried by an insulating collar 164, although other suitable circuit controlling means may be used, if desired. In the casing there is contained a cam member 165 which is carried by the shaft 162, and fastened thereto in a suitable way as by a cross pin 165ª (see Fig. 13). The base plate 160 has forwardly projecting bosses on which are pivotally mounted indicating arms 166 and 167 which are urged toward each other by coil springs 168 and 169 respectively. These indicating arms 166 and 167 have rollers 170 and 171 pivoted therein, which rollers are engaged by cam surfaces of the cam member 165. From this it readily apears that if the lever CL is moved toward the left or normal position until it engages the stop-pin 172, both of the indicating arms 166 and 167 will be moved away from the shaft 162, and in turn the indicating plates 174 and 175 riveted to these arms will be moved in front of openings in the front wall of the casings, so that the arrows contained on these indicating plates 174 and 175 are clearly visible through these openings, as more clearly indicated in Fig. 14, of the drawings. It may be pointed out at this time, that the openings referred to partly overlap with the next adjacent casing on each side of the casing in question. In this connection it may further be pointed out that when one of these indicating plates has been moved in front of the window or opening (see Fig. 15), that this indicating plate extends beyond the edge of the tapered block 176, and that by reason of the backward pressure of these bent back signal plates, the signal plate of the next adjoining levers will be forced underneath the signal plates in question, if the signal plates in question were moved to the indicating position first. In other words, the signal plates 174 and 175 of the various adjacent controllers are so constructed that the signal plate which is moved to the indicating position first conceals the signal plate which is thereafter moved in front of the same opening or window; and by this arrangement an indication is given which indicates by the direction in which the arrow thereon points, the sequence in which adjacent levers have been moved from their middle neutral position, providing that more than one of two adjacent levers have been moved from their neutral position, except under certain conditions more fully pointed out hereinafter.

From the foregoing description of the switch machine SM and the manner in which it is operated, it is apparent that the switch machine will not be operated if the lever CL is moved from one of its operating positions to the neutral position, and that for this reason it is impossible to ascertain from the position of the lever itself what the position of a switch machine is, if the control lever CL for controlling the same has been returned to the neutral position, in which the apparatus has been shown. In order to leave a permanent indication in the tower, as to the position of the switch machine when its corresponding control lever is in the neutral position, an indicator 180 is loosely mounted on the shaft 162 in the back of an opening covered by a disc 181 of transparent material, which indicator 180 has the letters or indicia N and R painted or suitably engraved thereon. Projecting from the front of the cam member 165 are two pins 182 and 183, which are adapted to engage the indicator 180, and are so related thereto that the indicator is moved so to display the letter N when the lever CL assumes the N-position (see Figs. 3A and 8), and displays the letter R when the lever CL is moved to the reverse or R-position, but so that the indicator is not moved when the lever is moved from either its normal or its reversed position to the neutral position, there being sufficient lost motion between the pins 182 and 183 and the indicator plate 180, so that no movement of the indicator plate is effected when moving the lever from one extreme position to the other extreme position until this lever CL has passed the neutral position. From the operating characteristics heretofore pointed out, it readily appears that the letter N of the indicator 180 will be displayed if the switch machine SM is in the normal position, and the letter R will be displayed when the switch machine is in the reverse or take-siding position. As more clearly pointed out hereinafter the position of the various indicators 180 at any particular time will be recorded on the tape of the graphic recorder TR, through the medium of the rod 185 which is pivoted to an ear 186 projecting from the indicator 180.

In view of the description of the controller CLKW, just given, it is believed unnecessary to describe the controllers CLIW, CLIE, and CLKE, since these controllers are very much the same. It may however be pointed out that the indicator arm 167 and its indicating plate 175 has been omitted from the controller CLKE. This indicator arm 167 has been left out of controller CLKE, because this controller is the last in the bank of controllers contained in tower 10 and therefore needs no provision for indicating sequence of operation with respect to a controller on the right side thereto since there is none such. Also, it should be noted that the various cam members 165 are not exactly the same, for instance, if the lever CL of the controller CLKW is moved toward the right, or R position, the indicating arm 167 will not be moved, this also being true of the arm 166 of controller CLKE when moved toward the right; is true of the arm 166 of controller CLIE when its lever CL is moved to the right, and is also true of the indicating arm 167 of controller CLIW when its lever CL is moved toward the right. In other words, the various indicator plates 174 and 175 do not indicate sequence of operation of adjacent levers in each instance except when these levers are moved to the left or normal position. The reason for this construction of the apparatus will more clearly appear when the operation of the system is taken up hereinafter; it may however be pointed out at this time that the arrows on indication plates 174 and 175 indicate the direction of traffic which has been set up on the main track of the passing siding or in the single track section located between the control points controlled by adjacent controllers. The window between controllers CLIW and CLIE by the display of an arrow visible therethrough indicates the directions of traffic set up on the main track of passing siding I, the window between controllers CLIE and CLKW by the display of an arrow therethrough indicates the direction of traffic set up on the single track section J, and the opening between controller CLKW and CLKE indicates the direction of traffic which has been set up on the main track of passing siding K, so that the operator has an indication before him which tells him what direction of traffic has been set up on the single track railway system to which the present invention has been shown applied.

*Graphic recorder.*—For reasons heretofore given it is desirous to leave a permanent record of train movements, signal changes and the operation and positions of the various switch machines as audibly manifested by the sounding of the bell BL as indicated by the arrows on the indicator plates 166 and 167, and the indication of normal and reverse (N and R) as indicated by the indicators 180. Although each of the bells BL and control levers CL may have a graphic recorder individually associated therewith, it is believed more expedient to use a single graphic recorder having tape wide enough and the necessary recording pens to accommodate the record of all of the various bells and control levers, this in order to have the whole record on a single tape, so that the sequence of operation of levers and the movement of a train from a section controlled by a certain lever into a section controlled by another lever may be recorded on the same tape. In view of the complication of the system disclosed in the present application it is believed unnecessary to specifically illustrate devices to make both single and multiple records, and for this reason only one recorder has been shown which is constructed to make a record of the operation of six different bells BL and the position of the indicators of six different control levers, CL, which may be obviously extended to a larger number if desired.

Referring to Fig. 16, there has been shown conventionally and in a schematic way a graphic recorder TR, of which the main frame includes bars 190 and 191 over which the tape 192 is adapted to move as it moves through the recorder, this tape being contained on a spool 193 supported in any suitable manner. This graphic recorder also includes clock work mechanism comprising a spring driven shaft 194 which through a chain of gears drives the gear 195 which in turn through idler 196 drives pinion 197 contained on shaft 198, which shaft 198 contains a driving roller 199 which is ridged or knurled so as to firmly grip the paper or tape 192 against the spring pressed rollers 200 and 201, supported by arm 202 pivoted at 203 and urged against the paper by spring 204, so that rotation of the driving roller 199 pulls the paper or tape through the recorder when a record is being made.

The gear 195 also drives the escapement wheel 212 the rotation of which is retarded by the pallet 213, this escapement wheel 212 being mounted on a shaft 214 which turns with this wheel, on which in the particular arrangement shown are contained six discs of which the disc 215 only has been illustrated each of these discs corresponding to one of the bells BL the operation of which is to be recorded. These discs 215 constantly engage an inking roller 216, which is made of suitable absorbent material and which carries the ink and keeps the discs 215 freshly inked. Directly below each of these discs 215 but below the tape 192 are located suitable anvils 217 of which only two anvils 217 and 217⁵ have been shown (see Figs. 16 and 17), each of these anvils includes an angle lever the lower end of which constitutes an armature 217ᵃ of an electromagnet including a coil 218, this angle lever being pivotally supported at 219. From this construction it readily appears that if the magnet winding 218 is energized the anvil is moved up and presses the paper or tape against the inking disc 215, and that if the tape or paper is moved at this time a dash will be recorded on such tape or paper.

It has just been pointed out in connection with the control lever CL that the indicator 180 of such lever displays a letter corresponding to the last extreme position in which the lever CL of such controller has assumed, and for reasons heretofore given it is considered advantageous to record on the tape the positions the indicators 180 of the various control levers assume at any particular time. In order to record the positions of the various indicators 180 a separate pen 220 is provided for each of the control levers, of which only one has been illustrated. This pen 220 is adapted to be moved at right angles to the direction of movement of the tape in the graphic recorder. Although this may be accomplished in any one of a large number of ways and either electrically or mechanically, only one arrangement has been shown, which consists of a forked angle lever 221 in which the pen 220 is supported, this pen 220 preferably contains ink of a different color than that contained in the ink roller 216. This angle lever 221 of the particular construction shown is pivoted about a vertical pivot 222 and is operated by a link 223 pivotally connected to one arm of an angle lever 224. This angle lever 224 is pivoted about a horizontal pivot at 225 and has its other arm connected to the vertical rod 185 extending from the indicator 180, of the particular control lever the last position of which is to be recorded.

The tape 192 could of course be moved through the graphic recorder at a uniform rate continuously, so that by such chronological movement of the tape the time at which a certain record was made could be ascertained by the hour and minute printed in a suitable column directly indicating time. An arrangement of this kind however, requires an immense amount of paper and in order to avoid such waste of paper and the difficulty in comparing the graphic records thereon, it is deemed preferable to have the tape in motion only while a record is being made and for a short time thereafter, and to print the time at which such record is made directly upon the tape just before the operation of the graphic recorder has completed its cycle of operation. In order to avoid an undue protracted specification this latter arrangement has only been disclosed in Fig. 16 of the drawings.

Let us now see how the graphic recorder is started each time one of the bells BL and one of the coils 218¹, 218², 218³, 218⁴, and 218⁵ is energized (see Fig. 17), each of these magnets being connected in series with its corresponding indicating bell BL, and the common return wire 226 to which all of these magnet windings are connected is in turn connected to the winding 227 of the clock starting mechanism, so that this magnet 227 is energized each time that one of the magnets 218 etc. is energized.

Energization of the magnet 227 attracts the armature 228 which is pivoted at 229, thereby moving the T-headed lever 230 away from its stop pin 231 against which it is held by the tension of the spring 232, and in so doing moves the slide member 233, which is pivoted on the pin 234, in a clockwise direction about its pivot. This causes the needle 235 to disengage the threads on the shaft 214, thereby permitting the spring 236 to move the slide member 233 along the pin 234, on which it is slidably supported, until it strikes the adjustable stop screw 239. The slide member 233 also has a pin 240 projecting therefrom which normally is engaged by the pin 241 projecting from the shaft 214, so that the clockwork mechanism is prevented from operating so long as the slide member 233 assumes its normal blocking position. As soon as the magnet 227 is energized and the slide member 233 is swung about the pin 234 the clockwork mechanism is released and begins its operating cycle. When the magnet 227 is de-energized the needle 235 again engages the thread on shaft 214, so that operation of the clockwork mechanism causes the slide member to be screwed back, so to speak, toward its normal position until eventually the pin 240 is struck by the rotating pin 241 and causes the clockwork mechanism to be stopped. From this it readily appears that the clockwork mechanism is permitted to operate for a definite period of time after each initiation the length of which depends on the adjustment of the adjustable stop 239. If now, several taps are given on the bell BL and several dashes are to be recorded on the tape 192, the clockwork mechanism feeds tape through the tape recorder for a definite period of time after the last energization of magnet 218 depending on the adjusted condition of the adjustable stop 239.

As heretofore mentioned it is desired to stamp the time at which a record is made on the tape directly on this tape by a suitable time recording mechanism. Although this time stamping mechanism or device may be of any desired construction, and although the act of stamping may be accomplished either electrically or mechanically, for convenience an electrically operated time stamping mechanism only has been illustrated. Referring to Fig. 16 of the drawings the time stamp TS, comprises a suitable electrically operated device which prints on the tape the time of day by, hour and minute a. m. and p. m., and if desired also the day of the month and the month of the year, whenever such time record is desired. This time stamping device in the particular construction shown contains a tail piece which is pivoted at 247, as shown. On the free end of this tail piece is contained an armature 248, which is adapted to be attracted by the electromagnet 242, this time stamping device being normally held away from the tape 192 by a spring 243.

In order to automatically stamp the time on the tape each time the tape is operated, and in order to avoid the tape being clogged up in the recorder during such stamping operation, it is deemed expedient to have the time stamped upon the tape just when the graphic recorder has completed its operating cycle, and for this reason the electromagnet 242 is energized only for a very short period of time and just before the tape recorder has completed its cycle of operation. This is accomplished by the contact 245 connected to but insulated from the sliding member 233, which contact 245 is adapted to cooperate with the stationary contact 246 when the sliding member moves along the pin 234 and just before it reaches its extreme normal position providing the magnet 227 is not energized at this time. In other words, when the magnet 227 is energized and the spring 236 moves the sliding member 233 along the pin 234 the contacts 245 and 246 do not get into contacting relation because the contact 245 has been moved toward the left, but when the sliding member 233 is again returned to its normal position through the medium of the threads on shaft 214, which engage the needle 235, the contact 245 moves in a plane so that it engages the stationary contact 246, so that the electromagnet 242 is energized just before the clockwork mechanism has completed its operated cycle, and by such energization attracts the armature 241 and causes the time as indicated by type wheels driven by clock mechanism contained in the body of the time stamp mechanism TS to be printed on the tape.

Operation

In order to illustrate how the present system facilitates the movement of traffic, a few illustrations of train movement in which the train dispatching is accomplished by the indication of way-side signals, upon which manual control is superimposed, will be given. It is not considered necessary to give each and every possible combination of circumstances which may occur in practice, and for this reason only two important traffic movements will be considered, namely, (1) a case where two trains running in opposite directions are caused to make a meet at a certain siding in response to signal indications which respond to manual control, and (2) where one train which is presumably a higher speed train is permitted to overtake another train moving in the same direction at a passing siding in response to signal indications manually set up.

*Trains making meet.*—Referring to Fig. 1 of the drawings let us assume that there is a west bound train on the main track of passing siding M, and that there is an east bound train west of the passing siding I, and that the operator, or train dispatcher, deems it expedient to have these trains meet at the passing siding K; and further that he prefers to have the west bound train take the siding of passing siding K and have the east bound train take the main track of this passing siding. In order to set up the signals to make a meet of the kind mentioned the train dispatcher himself, or by instruction to an operator, will clear the signal 7 of passing siding M and in so doing will set up west bound traffic in single track section L by the tumble-down function heretofore described. The operator at tower 10 will then move his lever CL of controller CLKE (see Fig. 11) toward the right, and in so doing will display the letter R of indicator 180 and will cause the pen 220 to draw the horizontal line 250 (see Fig. 18) in column CKE and will also effect energization of the relay Z (see Figs. 3B and 7), thereby causing operation of the switch machine SM at the east end of passing siding K toward its reversed position, this starting of the switch machine will cause two taps to be sounded on the bell BL (see Fig. 3A) and will energize the magnets 218 and 227 of the graphic recorder TR (see Fig. 16) thereby recording two dashes on the tape as indicated at 251 on Fig. 18 of the drawings for reasons heretofore given. After the switch machine SM has completed its operating stroke two more taps will be sounded on the bell and two more dashes, as indicated at 252 of Fig. 18, will be recorded, for reasons heretofore given. After the switch machine SM at the east end of siding K has completed its operating stroke and with the relay Z energized to its reversed position, the take-siding or diverging route signal IA will have its lamp Y energized, so as to give a take-siding indication, this clearing of the signal IA will, however, not effect a record on the tape. It should be noted, that operation of the lever, as just mentioned, caused the pen 220 (see Fig. 16) to be moved to the right and mark a horizontal line as shown at 250 of the tape shown in Fig. 18 of the drawings, thereby shifting the vertical line to the other side of columns CKE and leaving a continuous record and indicating that the switch machine is assuming the reverse position, the time at which the switch machine was started and stopped respectively being recorded as 11:55 P. M.

The operator will then clear the successive stop-and-stay signals from left to right in front of the east bound train and in so doing will clear the signal 8 of passing siding I by operating the lever of controller CLIW (see Fig. 11) to the left; will then clear the signal 2 of passing siding I by moving the lever CL of the controller CLIE to its left hand position, thereby moving the indication blade 174 (see Fig. 11) of controller CLIE underneath the signal blade 175 of controller CLIW, so that the arrow on this signal blade 175, which arrow points to the right, only will be displayed. Also, this movement of the lever of controller CLIE moves the other signal blade 175 in position in front of the window thereby displaying another arrow which points to the right, this movement of the lever obviously clearing the signal 2 of passing siding I, for reasons heretofore given. This clearing of the signal 2 causes the tumble-down of home relays of single track section J to take place, thereby dropping the home relay 7H of single track section J so that neither the signal 7 or 7A of passing siding K can be cleared. The operator will then move the lever CL of controller CLKW to the left thereby causing the indicating blades 174 and 175 to be moved to their indicating positions, but the indicating blade 174 of this controller CLKW will be obscured by the indication blade 175 of controller CLIE, this because this latter blade assumed the position in front of the window before the indicating blade 174 was shifted from its normal position. Also, since the lever CL of controller CLKE was moved to the right and its indicating arm 166 did not respond to such movement, an arrow pointing to the right is visible in each of the three windows of Fig. 11, thus indicating that east bound traffic has been given the right of way on the main track of section J and passing siding K. From these considerations it will appear by referring to Fig. 1 that signal 2 of passing siding I is clear, that the signal 8 of passing siding K is the caution, because signal 2 of passing siding K is held at stop; that signal 7 at the west end of passing siding M is clear and signal 1A at the east end of passing siding K is clear, but that signal 7A at the west end of passing siding K is held at stop. In other words, both trains may proceed until they have entered passing siding K. Let us now note what kind of audible information is given to the operator as to the movement of trains and how this information is graphically recorded on the tape.

Figure 18:
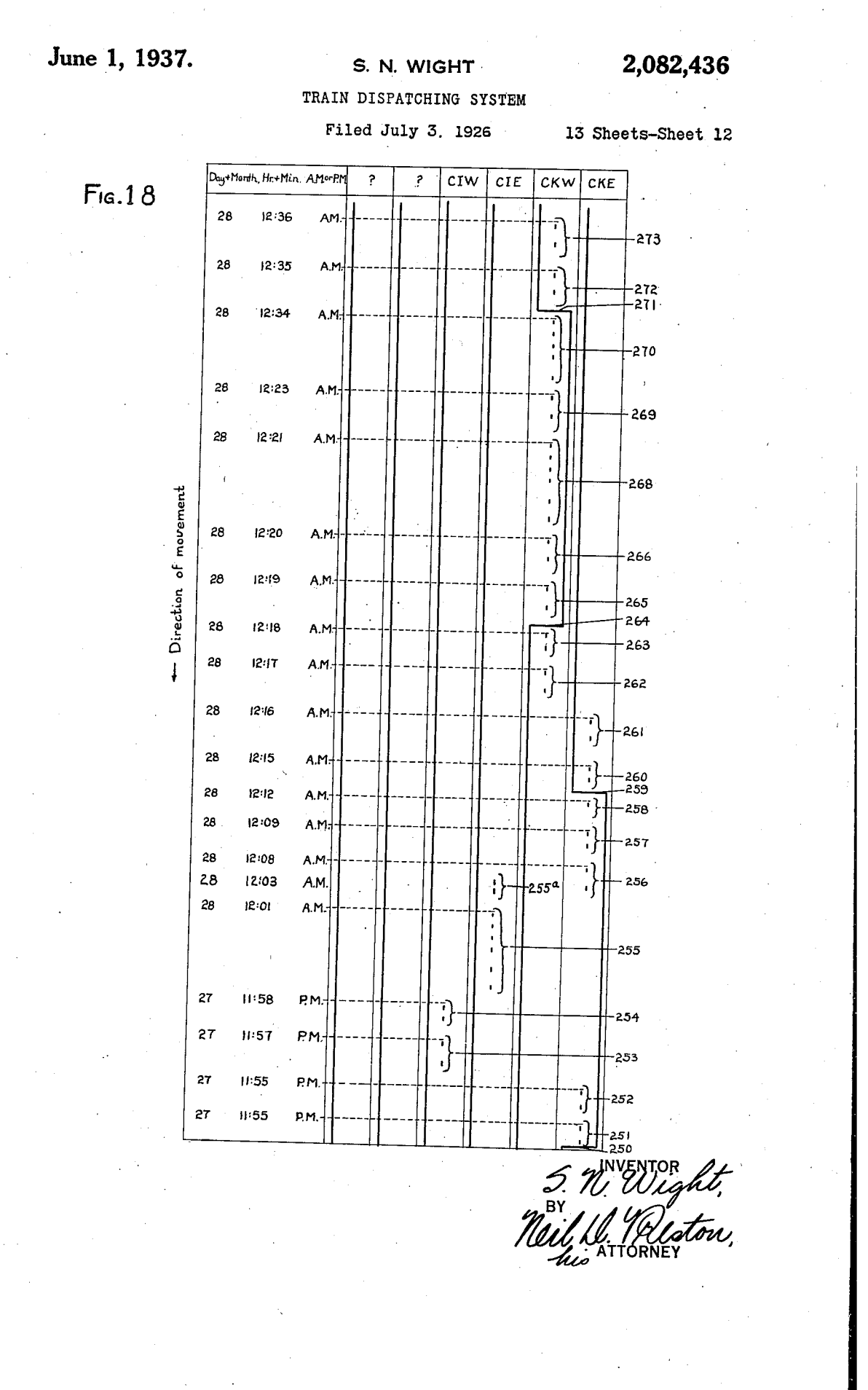

As the east bound train enters the west end of passing siding I the detector track relay 7T at the west end of this siding I is de-energized, thereby effecting the sounding of two taps on the bell and thereby registering two dashes in the column CIW, as indicated at 253 on the tape (see Fig. 18) by the graphic recorder TR. As the graphic recorder completes the cycle of operation after the second dash has been registered, the needle 235 engaging the thread on shaft 214 moves the slidable member 233 towards its normal position, and in so doing wipes the contact 245 against the stationary contact 246 (see Fig. 16) and thereby energizes the electro-magnet 242 and causes the time to be stamped on the tape, as indicated in Fig. 18, this time being the 27th day of the month at 11:57 p. m. As the train proceeds a little farther and the detector track relay 7T at the west end of siding is again permitted to assume its energized condition, two more dashes are registered on the tape of Fig. 18 as indicated at 254, but these dashes are closer together than are those indicated at 253, this for reasons heretofore given.

As the train proceeds in an easterly direction and passes out of passing siding I the detector track relay 2T at the east end of this siding I is de-energized thereby sounding two taps on the bell and registering two dashes in the column CIE of the tape shown in Fig. 18, as indicated at 255. The dropping of this track relay 2T, however, also causes the signal 2 to assume the stop condition and in so doing causes four closely spaced dashes to be registered on the tape by the graphic recorder TR as indicated at 255, for reasons heretofore given (see Fig. 8), and when the graphic recorder completes its operating cycle the time is again stamped on the side of the tape, which as indicated in Fig. 18 was the 28th day of the month at 12:01 a. m. When the detector track relay 2T picks up, two more closely spaced dashes are recorded as indicated at 255ᵃ in Fig. 18.

As the east bound train passes through single track section J we may assume that the west bound train is passing through single track section L but that the west bound train reaches passing siding K first. As this west bound train approaches the passing siding K, the engineer will observe the display of the diverging route signal 1A, and will be informed thereby that his train is to enter the siding and in doing so he will find the dwarf starting signal 7A at stop, so that he will be obliged to stop his train on the siding. As the west bound train entered the passing siding K it de-energized the detector track relay 2T thereby causing the graphic recorder to register two dashes in the column CKE of the tape, as shown at 256 (see Fig. 18), and when the graphic recorder has completed its cycle it stamps the time 28th day of the month 12:08 a. m. on the tape. When the rear end of this west bound train has completely entered the siding of passing siding K, the track relay 2T will again assume its energized condition and in so doing will register two more closely spaced dashes on the tape as indicated at 257, the time which is stamped on the tape being 28th day of month, 12:09 a. m.

Since the west bound train is now on the siding K, the operator having been informed of this fact may set up east bound traffic for the single track section L, first putting the signal 7 at the siding M to stop, if he has not previously done so, and then operating the switch machine at the east end of the siding K and clearing the signal 2 of passing siding K, so that the east bound train will not be delayed as it passes the passing siding K. Let us now assume that to clear signal 2 of passing siding K the operator moves the lever of control unit CKE to its neutral position, thereby dropping the relay Z (see Fig. 3B) and in turn dropping the light signal relay 2F thereby putting the signal 1 to stop. This movement of the lever CL of control unit CKE to the neutral position causes the bell to sound a single tap and causes a single dash to be recorded on the tape by the graphic recorder as indicated at 258 of Fig. 18, the time at which the lever was moved to the neutral position being recorded as, 28th day of month, 12:12 a. m. The operator will then move this same lever toward the left, thereby causing a horizontal mark to be made on the tape as indicated at 259, this by reason of the movement of the indicator 180 (see Fig. 11) of the controller CLKE, and since the switch machine is now assuming the reverse position causes this switch machine to be operated toward its normal straight track position. As the switch machine begins to operate, the switch machine repeater relay WPEI (see Fig. 8) is de-energized thereby sounding two closely spaced taps on the bell and registering two closely spaced dashes on the tape (see Fig. 18) as indicated at 260, the graphic recorder when completing its cycle of operation registering the time 28th day of month, 12:15 a. m. When the switch machine has completed its movement of the track switch back to the normal straight track position the relay WPEI is again picked up and two closely spaced taps are sounded on the bell BL and two closely spaced dashes are recorded by this graphical recorder as indicated at 261 of Fig. 18, the time at which the switch machine completed its stroke being recorded as 28th day of month, 12:16 a. m. As soon as the switch machine at the east end of siding K completed movement of the switch, the signal 2 of passing siding K was cleared.

Let us now consider movement of the east bound train which is still moving in single track section J. As this east bound train enters the main track of passing siding K it shunts the detector track relay 7T, thereby causing two taps to be sounded on the bell associated with the mechanism CKW and causes the registration of two dashes in the column CKW on the tape, as indicated at 262, the time at which this happened being 28th day of month, 12:17 a. m. as indicated on the tape. When the rear end of this east bound train has entirely entered the main track of passing siding K the detector track relay 7T again assumes its energized position, and in so doing causes two taps to be sounded on the bell associated with mechanism CKW and causes two closely spaced dashes to be recorded on the tape, as indicated at 263 in column CKW of Fig. 18, the time at which this track relay picked up being recorded as 28th day of month, 12:18 a. m.

The operator at the tower now being informed that the east bound train has passed entirely out of single track section J will first move the levers of controllers CLIW and CLIE to the neutral position and will then move the lever CL of controller CLKW to the right hand or reverse position and in so doing will cause a horizontal mark to be registered in column CKW on the tape as indicated at 264, and as the switch machine at the west end of siding K is operated in response to this movement of the lever two taps are sounded on the bell associated with mechanism CKW, and two dashes are recorded by the graphic recorder, as indicated at 265 in Fig. 18, the time being 28th day of month 12:19 a. m.

When the switch machine at the west end of passing siding K has completed its stroke and has opened the switch at the west end of this siding, two more dashes are recorded on the tape as indicated at 266, thereby informing the operator that the switch machine has completed its stroke. As soon as the switch machine has completed its stroke, the dwarf starting signal 7A will assume its clear or proceed condition, thereby informing the engineer of the west bound train which is standing on the siding of passing siding K that he may now proceed into the single track section J. As this west bound train leaves the siding of passing siding K it de-energizes the detector track relay 7T and in so doing sounds two taps of the bell associated with the mechanism CKW and records two dashes in the column CKW of the tape, as indicated at 268. This dropping of the detector track relay 7T also causes the dwarf starting signal 7A to assume its stop condition and in so doing sounds four closely spaced taps on the same bell and causes the graphic recorder to register four closely spaced dashes in column CKW, as also indicated at 268, the time at which the signal 7A assumed the stop condition being recorded as 28th day of month, 12:21 a. m. When the rear end of the west bound train has passed entirely out of passing siding K, two more taps will be sounded on the bell with mechanism CKW and two dashes will be recorded in the column CKW of the tape as indicated at 269, this alarm and record being made in response to the picking up of the track relay 7T at the west end of passing siding K, and as indicated occurred at 12:23 a. m.

Since the operator at tower 10 is now aware of the fact that the west bound train has passed entirely out of the siding of passing siding K, he will move the lever CL of the controller CLKW to the neutral position and in so doing will cause the dwarf signal 7A to assume the stop condition, assuming of course that it has cleared in the meantime. This movement of the lever to the neutral position de-energizes the primary bell relay PBR (see Fig. 3A) thereby effecting a single tap on the bell BL and recording a single dash in the column CKW as indicated at 270, this movement of the lever into the neutral position, also de-energizing the starting light signal relay 7AF (assuming that it has been cleared in the meantime) and thereby effecting four closely spaced taps on the bell BL of the mechanism CKW and recording four closely spaced dashes in the column CKW of the tape shown in Fig. 18, as also indicated at 270. In other words, when a signal is placed in its stop condition by manual movement of the lever, a dash followed by four closely spaced dashes is recorded.

As the operator moves the lever CL of the controller CLKW to the extreme left hand or normal position a horizontal line is recorded on the tape, as indicated at 271. This movement of the lever CL of controller CLKW causes the switch machine at the west end of passing siding K to be returned to its normal condition. When the switch machine starts to operate two dashes are recorded in column CKW of the tape (see Fig. 18) as indicated at 272, the time at which the switch machine is started being recorded as 28th day of month, 12:35 a. m. When the switch machine has completed its operating stroke and has returned the switch at the west end of passing siding K to its normal straight track position, two more dashes are recorded in the column CKW of the tape, as indicated at 273, the time at which this record is made being 28th day of month, 12:36 a. m. The two trains have now made a meet and the track switches which were operated have been returned to their normal main track position, and the operator is informed from time to time as the trains enter and leave other passing sidings, as to their location and at what time they arrive and leave these various locations, a complete record being left as to the movement of trains; and when two trains are about to meet the operator may decide at which siding these trains shall make such meet.

*One train passing another from the rear.*—Let us assume that there are two west bound trains moving in single track section L, and let us assume that the first train is a freight train and the second train is a passenger train, and that the movement of traffic will be much facilitated if the passenger train is permitted to pass the freight train. In this connection it should be remembered that the passenger train may follow closely behind the freight train when passing through the single track section L by reason of the absolute-permissive-block signal equipment of the single track railway system, that is, the same signaling facility is provided for a train when following another train in a single track section as is provided in double track signaling.

Let us assume that the operator wishes the freight train to take the siding of passing siding K, and in order to do so moves the lever CL of the controller CLKE to the right hand or reverse position, and in so doing causes the switch machine SM located at the east end of passing siding K to operate the track switch to the reverse position. This movement of the lever and the switch machine causes the diverging route signal 1A to be displayed, thereby informing the engineer of the freight train that he is to enter the siding K, the operator of course being informed as to the operation of the switch machine in response to movement of his lever. With the switch at the west end of passing siding K in its normal position the dwarf signal 7A is of course at stop which will hold the freight train on the siding.

On account of the approach locking features, hereinbefore discussed, the operator should, in the case under consideration, put his lever CLKE to the neutral position while the freight train is on the detector track circuit, so that the signal IA will not clear and drop the approach locking relay CR. If the operator fails to do this, and the following passenger train has already accepted the signal 3, the approach locking is effective, because the relay CR can not be energized by putting the lever CLKE to normal at this time. If the operator fails to take this action at the right time, the switch machine can not be operated, if the following train has accepted the signal 3, except after the lapse of the time of operation of the time element relay $CR^1$, by operating the switch selector SS, or the push button in Fig. 10, on obtaining the emergency release in any one of the ways previously discussed. It may be fairly assumed, however, that the operator in the case under consideration will be alert and prepared to operate his lever to the neutral position as soon as the first train reports in.

It should be noted that the movement of the lever of controller CLKE to its left hand or straight track position has displayed an arrow which points to the left, and thereby indicates that westerly direction has been set up on the main track of passing siding K. In order to permit this passenger train to proceed westwardly the operator will successively move the levers of controllers CLKW, CLIE and CLIW to their left hand main track positions, and in so doing (see Fig. 11) will cause the indicating blade 175 of controller CLKW to move underneath the indicating blade 174 of the controller CLKW, and will cause the indicating blade 175 of controller CLIW to move underneath the indicating blade 174 of controller CLIE; or in other words, each of the three windows shown in Fig. 11 of the drawings will have a west bound indicating arrow visible therethrough, indicating that west bound traffic has been set up on the main tracks of passing sidings K and I, and that west bound traffic has been set up in the single track section J. The passenger train may thus proceed into the single track section J and continue its west bound movement, and as soon as the rear end of this passenger train has passed out of the siding of passing siding K its passage by the dwarf starting signal 7A will cause the stick relay 7S (see Fig. 3A) to assume its energized position thereby releasing the approach locking mechanism associated with the west end of passing siding K, and thereby permitting the operator to operate the switch machine located at the west end of passing siding K back to its normal position.

*Cab signaling and automatic train control*

The train dispatching system embodying the present invention as thus far described, brings out how train dispatching may be accomplished through the medium of wayside signals, which signals are controlled automatically through the usual track circuits but have manual control superimposed thereon. The invention is, however, not restricted to wayside signal indications for dispatching such train movements, since the same information may be transmitted to the engineer through the medium of signals located in the locomotive cab if the necessary provision is made for transmitting and giving such information; and another form of the train dispatching system embodies the use of cab signals to obtain the desired result. Also, with adequate signal information in the cab it is considered expedient to control the speed of the train or its progress automatically in the event that the engineer does not properly control the train, and the present invention contemplates the use of automatic train control apparatus in connection with the train dispatching system hereinbefore disclosed.

Although the automatic train control apparatus and cab signal devices usable in connection with the novel train dispatching system may take many different forms, and although train control apparatus may be employed with train dispatching signal information given either by wayside signals alone, by signals partly in the locomotive cab and partly along the track, or by signals located wholly within the locomotive cab; further, although train dispatching information may be given either by wayside signals alone, by cab signals alone or by signals partly in the cab and partly along the track without the employment of train control apparatus; and although in the employment of train control apparatus this apparatus may be permissive train control apparatus, wherein the automatic control of the train may be entirely forestalled by proper manifestation of the vigilance of the engineer, or may be a stop system in which the train is automatically stopped regardless of its speed when entering a danger zone; it is deemed sufficient as a disclosure of the present invention to illustrate how a complete train control and cab signal system may be superimposed on the train dispatching system such as shown in Fig. 3, on the assumption that those portions of the system, such as, a part or all of the wayside signals or cab signal mechanism, or a portion of such train control system may be omitted when so desired. That is, that in the consideration of a train dispatching system employing train control, either a portion or all of the wayside signals or a portion or all of the cab signals may be considered omitted. Further, although the train control and cab signaling system used in carrying out the present invention for dispatching train movements may have the information and control transmitted to the cab either by an intermittent inductive or a continuous inductive influence communicating means, or by a ramp and shoe; a simple form of influence communicating means, is preferably resorted to in disclosing the present invention in order to simplify the disclosure in the present patent application.

*Car carried equipment.*—Referring to Fig. 19 in which has been shown conventionally one form of car-carried and trackway apparatus of an automatic train control and cab signaling system embodying the present invention, and usable in connection with the wayside apparatus shown in Fig. 3, also forming a part of such invention, constitutes a complete system of train control and train dispatching, although a portion of the wayside apparatus has been omitted from Fig. 19 and is shown in Fig. 3, shows a railway vehicle RV. On this railway vehicle RV is shown a speed responsive device SD of the usual constuction of which the shaft 300 is driven from the wheels of the vehicle in any suitable manner, and thereby causes the speed arm 301 to assume a position depending on the speed of the train.

On this vehicle RV are mounted two control relays HR and LR, both of which are of the three position type, and of which the relay LR responds to both a high or a low voltage, but the relay HR responds only if high voltage is applied thereto, these relays having control windings 302 and 303 connected in multiple between the shoe 304 and the frame of the vehicle, and having their local windings 305 and 306 connected in series across a suitable source of direct current carried by the car having terminals B and C, respectively. The relay HR has a lock sector 307 associated with its movable element, and the relay LR has a lock sector 308 associated with its movable element, these lock sectors being normally locked by the armatures 309 and 310 of lock magnets HL and LL, respectively. Along the track are provided ramps which are adapted to be engaged by the shoe 304 carried by the vehicle RV, these ramps being energized by a direct current potential with respect to the mid-point 334 of the battery 333, (1) high voltage plus, (2) high voltage minus, (3) low voltage plus, (4) low voltage minus, and (5) with the ramp de-energized when a train engages the same, respectively upon entering (1) clear, (2) caution, (3) permissive stop, (4) a diverging route, or (5) absolute stop territory.

The lock magnets HL and LL are connected in series and are normally energized by a circuit including the shoe contact 315. It will thus appear that if the railway vehicle passes a ramp and the shoe rides upon such ramp and thereby opens the contact 315 and de-energizes both of the lock magnets HL and LL, it will cause the locks 309 and 310 to disengage the lock sector 307 and 308, and thereby allow the high and low voltage relays HR and LR to assume their neutral de-energized condition. If now the shoe 304 is in engagement with a ramp, and the ramp is energized, or connected to high voltage plus or minus, both of the relays HR and LR will assume the normal or reverse position, respectively. As the shoe moves off of the ramp the contact 315 again closes before the shoe actually leaves the ramp, and for this reason the lock magnets HL and LL will hold the relays HR and LR in the position in which they were placed by the current which was received from the ramp when the shoe passed thereover; in other words, the relays HR and LR will be moved to a position depending on the character of energy applied to the ramp which the vehicle passes, and these relays HR and LR will thereafter be held in such position by the lock magnets HL and LL until the shoe 304 again engages a ramp and opens the contact 315.

*Trackway equipment.*—Referring to Fig. 19, just in the rear of wayside signals 3 and 4 are placed ramps 320 and 321, respectively, directly back of signals 1 and 1A are located ramps 322 and 323, directly in the rear of the signal 2 are located ramps 324 and 325, and directly back of dwarf signal 2A are located ramps 326 and 327. As heretofore explained the signals 2 and 2A are stop-and-stay signals, and indicate to the engineer that he must not pass them when in their stop condition; also, for reasons heretofore given, if both the signals 1 and 1A are at stop a stop-and-stay indication is displayed which signifies to the engineer that he must not pass either of such signals. For reasons more clearly pointed out hereinafter, the train is automatically stopped regardless of its speed by train control apparatus when it reaches a stop-and-stay signal, and in order to give the engineer advance information of such an absolute stop ramp such as 322, 324, or 326 the advance ramps 323, 325, and 327, respectively, have been provided.

At each signal location there is located a battery, such as one of the batteries 330, 331, 332 and 333 shown in Fig. 19, which have their middle or neutral point 334 connected to the rail of the particular track section along which the ramp which is energized by such battery is located, as shown. In view of the description and illustrations heretofore given of the various relays shown along the trackway in Fig. 19, it readily appears that the ramp 320 is connected to the high voltage positive side of the battery 330 through the contacts 335, and 336 of the home relay 3H, when the signal 3 indicates clear, that this ramp 320 is connected to the high voltage negative side of the battery 330 through contacts 337 and 336 of the home relay 3H, when this home relay 3H is energized to its reversed position and the signal 3 indicates caution, and that this ramp 320 is energized by low voltage positive current through the back contact 338, when the home relay 3H is de-energized and the signal 3 indicates danger. The ramp 321 is energized by home relay 4H from the battery 331 in substantially the same manner as is the ramp 320 energized by contacts of home relay 3H, and for this reason the energizing circuits for ramp 321, are not considered in detail.

Referring to the ramps 322 and 323 controlled by relays 1F, 1AF and 1H it should be noted that the circuit for energizing ramp 322 includes the contacts 340 of relay 1F and 341 of relay 1AF in multiple. In other words, the ramp 322 has the same energy applied thereto as has the ramp 323 for all conditions of the relays 1F, 1AF and 1H, except when both of the relays 1F and 1AF are de-energized, in which event the ramp 322 is not connected to any source of energy. In view of these facts it is necessary to explain only how the ramp 322 is energized. For reasons heretofore mentioned it will be remembered (see Figs. 3B and 3C) that relay 1F is energized whenever traffic conditions are clear and manual control does not interfere with the clearing of the signal, and that the relays 1F and 1AF can not be both energized at the same time. If now the relay 1F is energized and signal 1 indicates clear, the ramp 323 is energized from the high voltage positive side of the battery 322 through contact 342 of relay 1F and polar contact 343 of home relay 1H, this home relay assuming its normal position. It will also be noted that the ramp 323 is connected to the high voltage negative terminal of battery 322 through contact 344 of relay 1F and through contact 343 of the home relay 1H, when this home relay is in the reverse position and the signal 1 indicates caution. If the relay 1F is de-energized, possibly because the home relay 1H is de-energized or possibly because the relay Z (see Fig. 3B) is energized to the reverse position or is deenergized, the ramp 323 is connected to the low voltage positive side of the battery 332 through the back contacts 345 and 346 of relays 1F and 1AF, respectively; and that under this condition of the relays 1F and 1AF the ramp 322 is disconnected from the ramp 323 and ramp 322 and has no energy applied thereto, so that an absolute stop signal will be displayed in the cab and the brakes of the train will be applied regardless of speed when the shoe 304 engages the ramp 322 under the assumed condition, for reasons more clearly pointed out hereinafter. Also, if the relay 1AF is energized because the train dispatcher wishes a west bound train to take the siding shown, and clears the diverging route signal 1A, the ramps 322 and 323 are both energized by low voltage negative current derived from battery 332 through front contact 347 of the relay 1AF.

Referring now to the ramps associated with the starting signals 2 and 2A, let us first assume that the relay 2H is energized to its normal right hand position and that the relay 2F is energized (see Fig. 7) because the dispatcher or operator wishes an east bound train on the main track to proceed but wishes to hold any east bound train that may be on the siding at the time. Under this condition, the ramp 325 is energized by high voltage positive current derived through front contact 350 of relay 2F and the polar contact 351 of the relay 2H, with this relay 2H energized to its right hand position. Also, it should be noted that with the relay 2H energized to its reversed position, thus causing the signal to indicate caution, the ramp 325 is energized by high voltage negative current derived through front contact 352 of relay 2F and the polar contact 351 of relay 2H; that the ramp 325 is energized with low voltage positive current through back contact 353 when the relay 2F is de-energized; and that the ramp 324 is energized by exactly the same potential as is ramp 325, except that when the relay 2F is de-energized the ramp 324 is entirely de-energized and causes the display of a stop-and-stay signal on the train, and effects an automatic brake application on the train regardless of speed, when a train engages such ramp 324.

The ramps 326 and 327 are controlled by relays 2AF and 2H in exactly the same way as are the ramps 324 and 325 controlled by the relays 2F and 2H, and for this reason the corresponding contacts have been given the same reference numbers, except that those associated with the siding have the letter "A" appended thereto.

*Operation.*—Under the conditions of the car-carried apparatus shown, namely the clear or proceed condition, it appears that the lamp 367 contained in the locomotive cab is energized through a circuit including the contact 360 of the high voltage relay HR, and that the electro-pneumatic valve EPV is energized through a circuit beginning at the terminal B of a battery and including the contact 361 of the high voltage relay HR, the 60 mile per hour contact 362 of the speed responsive device SD, the speed arm 301 of this device winding of the brake applying device EPV and the normal and reverse contacts 363 and 364 of the relays HR and LR connected in multiple, and ending at the terminal C. If now the railway vehicle RV should have its shoe 304 engage the ramp 325 while the home relay 2H is in its reversed condition, and the high voltage negative current is applied to the ramp 325, raising of the shoe 304 opens the contact 315 and causes both of the lock magnets HL and LL to be de-energized, so that their springs 311 and 312 cause the locks to be disengaged and the relays HR and LR to be moved to the extreme reverse position, this because high voltage negative current is applied to both of these relays. The reversal of the low voltage relay LR will not produce any effect on the system because the contact 365 is not connected to any source of energy so long as the relay HR is energized either positively or negatively; the reversal of the high voltage relay HR, however, causes the yellow lamp 368 to be illuminated and the green lamp 367 to be extinguished, also this reversal of the relay HR causes opening of the contact 361 thereby opening the circuit for the brake applying device EPV unless the speed of the train is low enough to cause the speed arm 301 to engage the low speed contact 366. The device EPV is constructed to apply the usual air brakes of the train when de-energized. In other words, when the train engages a ramp under caution traffic conditions of such ramp the yellow lamp 368 in the cab is illuminated, and the speed of the train is restricted to a suitable low speed limit, such as 15 miles per hour.

If the train causes its shoe 304 to engage a ramp under permissive stop conditions of such ramp, that is, with the ramp energized by low voltage positive current, the opening of shoe contact 315 causes both of the lock magnets HL and LL to be de-energized, and since low voltage positive potential is insufficient to cause the high voltage relay HR to respond, this relay HR will remain in its neutral position, the relay LR, however, will respond to low voltage positive potential and will assume the normal right hand position, in which it has been shown. As the shoe rides off of such ramp the shoe contact 315 is again closed and the high voltage relay HR is locked in its neutral position and the low voltage relay LR is locked in its normal position. Under this, the permissive stop condition of relays HR and LR, the red lamp 370 is illuminated through the energization of a circuit including the contacts 360 and 365 readily traced in the drawings, and the train may proceed at its low continuing speed limit of 15 miles per hour. If now the train proceeds and engages a ramp, such as ramp 322 or 323, when such ramp is in its diverging route condition, that is, is energized with low voltage negative current, the relay HR will not be changed, that is, will remain in its de-energized condition, but the relay LR will assume its extreme left hand position, for obvious reasons. Under this condition of the relays HR and LR, the diverging route signal consisting of the illuminated yellow lamp 371 disposed over the illuminated red lamp 372 will be energized through a circuit obvious from Fig. 19 of the drawings. Under this condition, the continuing low speed limit of 15 miles per hour will be enforced for obvious reasons. If now, the train engages a de-energized ramp, such as the ramp 326, 324 or 322, the lifting of the shoe 324 causes the lock magnets HL and LL to be de-energized thereby allowing the relays HR and LR to assume their neutral de-energized condition, in which condition they will be locked as soon as the shoe passes off of the ramp and permits the shoe contact 315 to reclose. Under this, the stop-and-stay, condition of the relays HR and LR the stop-and-stay signal, consisting of the illuminated red lamp 373 disposed over the illuminated red lamp 374, is displayed for obvious reasons. Also, with both of the contacts 363 and 364 in the neutral position the brake control device EPV is de-energized and the brakes of the train are applied regardless of the speed of the train. In this connection it should be noted that when a train approaches a stop-and-stay signal location, a permissive stop signal is displayed in the cab in response to a control influence received from the advance ramp, and due to the engineer's knowledge of his approach to a stop-and-stay location by information obtainable by observing the trackway or by a wayside marker either illuminated or not illuminated, he will interpret this signal as advance notice of an absolute stop indication. It should be understood that the invention is not limited to the arrangement wherein the speed limit is abruptly reduced from a high to a low speed limit when a change from clear to caution takes place, but that contact 361 of Fig. 19 may control a cam starter magnet such as the magnet 13 of a speed control system such as shown in the patent to Simmen, No. 1,150,309 of August 17, 1915.

General discussion of the system

It may be helpful in obtaining a clear understanding of this dispatching system to summarize the general features, hereinbefore explained in detail, and explained in a general way how and why the operator is able to handle the traffic easily with relatively simple manipulation, notwithstanding the apparent complexity of the controlling devices and circuits.

In the first place, it should be borne in mind that the apparatus affecting the safety of train movement is entirely automatic. Under no conditions can the operator produce a set-up that would permit trains to run without adequate signal protection. Each train is protected against following trains by stop and caution indications with adequate overlapping control. For the single track block between sidings, the signal protection is obtained in the same way characteristic of the well known A. P. B. system. At the siding the opposing entering signals 1 and 8, governing traffic on the main track, are electrically interlocked (see Fig. 2), so that only one can be clear at a given time. For example, if the entering signal 8 is cleared for east bound traffic, the entering signal 1 is held at stop; and a west bound train will receive a caution indication at the signal 3 and a stop indication at the signal 1. Also, referring to Fig. 2, if the signals for the single track block L have been set for west bound traffic, the starting signals 2 and 2A are held at stop so that the east bound train, for which the signal 8 may have been cleared, will receive a caution indication at the signal 8 and will be brought to a stop at the signal 2. The opposing signals 1A and 2A, and also 8A and 7A, governing traffic onto the siding are interlocked, so that conflicting indications can not be given. It should be understood that train movement onto and through the siding are slow speed movements, with the train under control and prepared to stop within vision.

Generally speaking, with reference to what the operator can do at each end of the siding, it will be observed that, by de-energizing the relay Z, he can hold all the signals, as 1, 1A, 2 and 2A at that end of the siding at stop, blocking train movements in either direction.

By moving his control lever to the normal straight track position, and energizing the relay Z to normal, as shown, (see Figs. 7 and 3B), the operator is able to set the switch normal for the main track and clear the signals 1 or 2, depending upon what other levers have been previously operated to determine the direction of traffic, and provided of course that these signals are not automatically held at stop by the presence of a train. By reference to Fig. 7, it will be noted that both of the relays 2F and 1F, controlling the signals 2 and 1, would apparently clear with the switch normal and the relay Z energized normal; but it should be remembered that the sequence of operation of adjacent levers to set up a direction of traffic determines the energization of the relays 2H and 1H, so that in the regular manipulation of the system either the signal 1 or the signal 2, but not both, will clear up when the switch is set for the main line.

By moving the control lever to the reverse position, and energizing the relay Z to reverse, the operator can set the switch for the siding and allow the signals 1A or 2A to clear. These signals are interlocked in one direction only, that is relay 2AF can hold relay 1AF down but relay 1AF cannot hold relay 2AF down, by reason of the energizing circuit for the relay 1AF being taken through a back contact of the relay 2AF (see Fig. 7); and only one signal can be cleared at a time. For example, referring to Figs. 2 and 7, if the single track block L has been set up for west bound traffic, the relay 2H is de-energized, holding signal 2A at stop and permitting signal 1A to clear. If the single track block L is being set up for east bound traffic by operating the control lever for the east end of siding K to the reverse position before the control lever of the west end of siding M is operated (see Fig. 2), the switch at the east end of siding K is set for the siding, and for this reason the signals 1 and 2 remain at stop and the signal 1A is held at stop because the relay 2AF is energized to clear the signal 2A.

Consequently, although the operator apparently has only the power to operate the switch normal or reverse by energizing the relay Z, he is actually able to permit train movements under adequate signal protection in either direction on a passing siding or a passing main track, according to the sequence in which he operates the levers for the adjacent ends of the sidings. This is an important characteristic of the invention because it makes it possible to provide for a number of train movements by a number of controls easily obtainable over one line wire.

While the switches are power-operated without mechanical locking between levers, or electric lever locks, commonly employed in interlocking practice, the system is organized so that the operation of these distant switches is surrounded with all of the necessary safeguards. It should be noted that the indications of the signals governing traffic over each switch are dependent upon the position of the switch, checked by the position of the Z relay. Polarized circuits, which have inherent protection against crosses, are used for this purpose, so that there is positive assurance that a signal can not be given for a main track move, unless the switch is actually in that position, not only on account of the contacts of the switch machine, but also because the control relay Z is in that position. If the switch has been disconnected from the switch machine for hand operation, all signals governing traffic over the switch are held at stop, and the trains must move under hand signals.

In addition to checking the signal indications by the position of the switch, the approach locking arrangement, together with the detector track circuit control, prevents the switch from being operated under conditions where the presence of trains might make switch operation dangerous. From the previous explanation, it will be evident that no power can be applied to the switch machine if the detector track circuit is occupied, so that it is impossible to operate the switch machine under a train. While the contacts 118—119 (see Fig. 3B) permit the switch machine to complete a cycle of operation once started before the detector track relay 2T drops, this does not detract from the safety, and constitutes an expedient adopted on the theory that it is better to allow the switch machine to complete its stroke and lock up in one position or the other, rather than stop in mid-stroke, if it should happen through an extreme rare combination of circumstances, including overrunning of signals that a train should enter the detector track circuit while the switch machine is operating.

The approach locking relay CR and its control circuits and devices (see Fig. 9) prevent operation of the switch machine when a train is approaching in either direction under signal indications that might make operation of the switch dangerous. The arrangement of approach locking has been explained in detail, but some general observations may be helpful. Referring to each end of siding K, shown in Fig. 9, the relay CR is de-energized, regardless of any other conditions, if any one of the signals 1, 1A, 2 or 2A is clear. Hence, regardless of anything else, the switch machine can not be operated unless the signals governing traffic in both directions over the switch are at stop. The relay CR is a stick relay, and once energized will remain energized as long as the relays governing the signals 1, 1A, 2 and 2A are down. Consequently, if the operator has not attempted to set up traffic in either direction over the switch since a train has approached within a limited distance on either side of the switch, the relay CR remains energized irrespective of the approach of trains, and the operator may operate the switch to either position, and in fact as many times as he wishes, without interference. This is safe, because with the signals, particularly 1 and 2 at stop, and the respective signals in the rear thereof at caution, trains approaching the switch from either direction will be under the control of signal indications adequate to bring the train to a stop and prevent it encountering the switch in operation or in a different position than expected.

If the operator has selected a direction of traffic over the switch, clearing one of the signals 1, 1A, 2 or 2A, then a train approaching the switch from either direction, within certain limits, prevents operation of the switch machine, even if the operator puts the signals to stop; and the locked condition continues until after the lapse of the time interval provided by the relay CR¹, or until after a release is obtained in some one of the ways already explained in detail. Referring to Fig. 9, the approach locking limits for west bound traffic extend one track circuit to the east of the second signal 3 governing traffic toward the switch TSE; and the approach locking limits for east bound traffic extend normally to one track circuit in the rear of the second signal 8 governing east bound traffic toward the switch in question. The principle determining these control limits is that no change should be made in the switch machine, even after putting the signals to stop, unless the trains approaching the switch from either direction are far enough away so that they are sure to receive a caution indication and come to a stop in the regular way before reaching the switch. These approach locking limits are applicable only for trains moving toward the switch, because of the stick relays 1S, 2S, and 4S, as previously explained.

The approach locking is further dependent upon the position of the switches. Referring to the switch TSE at the east end of the siding K (see Figs. 2 and 9), if the other switch TSW at the other end of the siding is reversed and set for the siding, an east bound train on the track sections for the track relays 1T8 and 1T (see Fig. 2) will not de-energize the line relay 1H, as an east bound train would ordinarily do, on account of the contact 53¹ of the switch repeater relay WPW; and hence the switch TSE may be operated, in spite of the presence of this east bound train within the approach locking limits, because this train would necessarily move onto the siding and could not approach the switch TSE at high speed. Similarly, if the switch TSE is reversed and set for the siding, holding the east bound signal 2 at stop, an east bound train on the track section 1T will not prevent operation of the switch machine, although it maintains the relay 1H de-energized, because the contact 139 of the switch repeater relay WPE shunts the front contact of the relay 1H controlling the energization of the relay A. In this case it is safe to operate the switch, notwithstanding the presence of an east bound train within the approach locking limits, because this train is necessarily prevented from moving over the switch by the stop indication of the signal 2, said signal being necessarily in the stop position if the switch is reversed.

In spite of the seeming complication of interlocks between signals and the different results obtained by various sequence of operation of control levers, the operator's manipulation of the levers to handle the traffic is really very simple. An explanation in detail, bringing out all operations and including the code indications received, has already been given for two typical train movements. Numerous other train movements can also be handled; and generally speaking, the system enables the operator to advance and pass trains at will and with far greater facility than would be possible under any system of train orders.

The way in which the levers can be manipulated by the operator to set up traffic in either direction desired and for any extent of track desired may perhaps be more readily understood by considering that the main track, including that at the sidings as well as between the sidings, is in effect divided into units or sub-divisions, with signals at each end governing traffic in both directions and with a lever governing the signals at the adjoining ends of adjacent units or subdivisions. For example, referring to Fig. 1, the single track block J can be said to be one subdivision, with signals 1 and 2 at one end under the control of the lever CIE, and with signals 7 and 8 at the other end under the control of the lever CKW. Similarly, the portion of main track at the siding K may be said to be the adjoining sub-division, with the same signals 7 and 8 at one end under the control of the same lever CKW, and with signals 1 and 2 at the other end under the control of the lever CKE. The single track block L is another sub-division, having its end adjoining the main track siding K under the control of the common lever CKE. Bearing this in mind, it should next be noted that the opposing signals at opposite ends of each unit or subdivision are interlocked, so that the sequence in which the levers for opposite ends are operated from their neutral position determine the clearing of the signals and the direction of traffic set up. For example, the signals 2 and 7 are the opposing signals for the single track block J; and if the lever CIE is operated before the lever CKW, the signal 2 clears for east bound traffic and the signal 7 is held at stop, or if the lever CKW is operated first, the signal 7 clears for west bound traffic and the signal 2 is held at stop. The same applies to the signals 1 and 8 governing traffic on the main track opposite the siding. Keeping in mind this idea of sub-divisions and sequence of operation of the levers, it is believed that it will be readily appreciated that the operator may at will set up traffic for either direction as desired over one or more units.

An example may be helpful in understanding how the operator is able to set up traffic by a sequence of operation of his levers. Referring to Fig. 1, assume a west bound train at the siding M, which the operator in the tower 10 desires to advance to the siding I. After putting the levers for both ends of the siding K and the east end of the siding I in the vertical position, if they are not already there, the operator then starts with the lever for the west end of the siding M, which is nearest the train. (As shown, the west end of siding M is supposed to be under the control of another operator, but this is not material to the present discussion.) The operator throws this lever for the west end of siding M to the normal or reverse position, depending upon whether the train is on the main track or on the siding. This clears the starting signal 7 or 7A at the siding M, as the case may be, and sets the switch machine accordingly. The clearing of this signal drops the relay 2H for the signal 2 at the east end of siding K. Then, when the operator throws the lever CLKE for the east end of the siding K to the normal or main track position, the switch machine will take the main track position, if not already there, and the signal 1 will clear. The operator then moves the lever CLKW for the west end of the siding K to normal, and the switch responds if necessary, and the signal 7 clears. This holds at stop signal 2 and 2A at east end of siding I. The operator may then put the lever CLIE in the normal or reverse position depending upon whether he wants the train to take the siding or main track of passing siding I, in response to which the switch machine at the east end of siding I will operate if necessary, and the corresponding signal 1 or 1A, as the case may be, will clear.

The operator, in handling his levers to set up traffic in the desired direction on the main track, will ordinarily find it most expedient to keep in the middle or neutral position all of the levers for the portion of track which is not at that time given over to trains. Starting with the levers in the neutral position, in order to set up traffic for a train at any one of the sidings, the operator merely has to follow the simple rule of beginning with the lever corresponding to the signal nearest the train, and then moving one after another in sequence adjacent levers, to the right or to the left of that particular lever, according to which direction of traffic is desired. This direction of traffic will be established as far as the operator moves his levers; and when the traffic has been set up for either direction over one or more sub-divisions of the trackway, all the opposing signals are held at stop between the points where this direction of traffic is effective. It may be explained here that it is not essential that the operator start with adjacent levers in their neutral position, it being a question of which lever assumes an operated position before the other; and when two adjacent levers have been both shifted to an operated position in one sequence for one direction of traffic, the other direction of traffic may be set up by returning the lever first operated to the neutral position and by shifting it to an operated position, there being produced the same effect by movement of one lever as by moving two levers from their neutral position in sequence. Under some circumstances, the operator may find it expedient to operate his levers in this way, rather than from the neutral positions.

Train movement into and out of the sidings for head on or passing meets presents a number of varying conditions. Except for the detector track circuit at the ends of the siding track, up to the fouling point, the siding itself is not provided with track circuits, and it is contemplated that train movements on the siding will be low speed movements according to the regular practice. For each end of the siding there is an entering signal as 1A, and a leaving signal as 2A. These signals can not clear unless the switch is set for the siding. Also, these signals are interlocked one way, that is, the entering signal 1A can not clear unless the leaving signal 2A is at stop. The leaving signal 2A will clear, with the switch reversed, if the relay 2H is energized (see Fig. 7), which would be the case if east bound traffic from the siding K under consideration has been set up. Due to the interlock between signals 1A and 2A (see Fig. 7), when the signal 2A is clear under the conditions just stated, the signal 1A is held at stop, even though the switch is in the reverse position. On the other hand, if traffic over the single track block L has been set up west bound toward siding K, the relay 2H is de-energized, and when the switch is reversed, the signal 2A can not clear, and being held at stop, allows the signal 1A to clear. In this way, the signals 1A and 2A, while primarily dependent merely upon the position of the switch points, are actually independently controlled due to their interlock and due to the sequence of operation of levers to set up traffic toward or away from the siding.

In connection with the operation of setting up a direction of traffic for the main track opposite a siding, it appears expedient to point out here that the interlock between the entering signals 1 and 8, referring to the siding K, requiring operation of the levers for the end of the siding in a definite sequence to set up traffic for different directions, does not apply when either of the switches is reversed and set for the siding. This is because the signal 1, for example, governing traffic on the main track is held at stop if the switch TSE is reversed, by reason of the switch repeater relay WPE (see Figs. 3C and 7); and the circuit for the line relay 8H of the opposing signal 8 includes the back contact 51 of the signal control relay 1F for the signal 1, but not the signal control relay 1AF for the signal 1A (see Fig. 2), so that the opposing signal 8 may be cleared at the same time as the signal 1A. In other words, the sequence of operation of the levers for the opposite ends of the siding is utilized to determine the direction of traffic on the main track, but is not a determining factor when the switch at either end of the siding is reversed.

The manipulation of the levers for a typical head-on meet has been described in detail for the case where a west bound train to take the siding passes an east bound train on the main track at the siding K. From this explanation, the operation of the system for meets of the same kind will be obvious. Generally speaking, in preparing for a head-on meet, the operator merely has to place the levers for the opposite ends of the siding in different operated positions, that is, one normal and the other reverse.

The operator can put either train on the siding by moving the lever at the end of the siding toward the selected approaching train in the reverse position, while putting the lever for the other end of the siding in the normal position.

When a set up has been made for a meet, as soon as either train arrives and gets in the clear, the switch may be thrown and traffic set up for the other train. For example, if the train holding the main track arrives first, the switch in its rear may be thrown from normal to reverse, and the signals in the rear cleared for the opposite direction to allow the other train to run around without stopping. Similarly, if the train to take the siding arrives first, the switch behind it may be thrown and the signals cleared for the opposite direction, so that the other train may run straight through without stopping. Since the operator is immediately advised of the arrival of trains at the siding, and is able to operate the switch machines quickly and clear the signals for the other direction of traffic, it will be evident that trains can be advanced with the system with the minimum delay.

In some instances the operator may make a set-up for switch operation which will automatically take place subsequently after trains have advanced. For example, if there is a west bound train on the siding K and an east bound train approaching said siding, the operator may throw his lever CKW for the west end of the siding K to the reverse position as soon as the east bound train enters the detector track circuit, and as soon as said east bound train leaves the detector track circuit, the switch will automatically operate, and if the lever CIE was in the neutral position at the time the lever CKW was reversed, then the signal 1A clears and traffic is automatically set up for the west bound train to leave the siding.

The example just given is typical of various special and short-cut manipulations of the levers that the operator may employ in some instances; but no attempt will be made to explain all of these cases, nor point out in detail the manipulation of the levers for all of the various train movements that can be adequately handled by this system.

Having thus shown and described one rather complete but simplified embodiment of the present invention, it is desired to be understood that the particular exemplification of the invention has not been illustrated and described for the purpose of showing the scope of the invention or the particular arrangement and construction preferably employed in practicing the invention; and that various changes, modifications and additions may be made to adapt the invention to the particular problem encountered in practicing the invention. For instance, although the invention has been shown applied to a single track railway equipped with modified absolute-permissive-block signaling, it is to be understood that obvious changes may be made to adapt the invention either to double track railroads equipped with double track signaling of the usual construction, or may be applied to a junction point of a single track spur or branch road and a double track railroad, and the like; and that although the train control and cab signaling arrangement forming part of the invention illustrates the use of physical contact mechanism between the trackway and the car-carried apparatus, such influences may be communicated inductively either intermittently at control points or continuously through the entire progress of the train; and that such changes, additions and modifications may be made without departing from the scope of the invention or the idea of means underlying the same.

What I claim as new is:—

1. A single track railway system having a siding and a main track parallel thereto; a plurality of signals at the entrance to said siding governing the entrance and departure of trains to and from said siding, main track and single track sections; a relay for said siding; a line wire connecting said relay to suitable control and recording means at a distant point; means for controlling said signals jointly by said relay and means corresponding to prevailing traffic conditions; and means for causing said recording means to respond to the movement of trains into and out of said siding and main track through the medium of said line wire.

2. A single track railway system having a siding, a plurality of color light signals at the entrance to said siding governing the entrance and departure of trains to and from said siding and the main track adjacent said siding, a power-operated switch machine for operating a switch leading to said siding, a relay at said siding for controlling said switch machine, control means for manually operating said relay from a distant point, said switch machine responding to a change in the position of said relay only if there are no trains within certain limits of said switch at the time said relay is changed, supplemental means for controlling said switch in accordance with the position of said relay effective only after an interval of delay, and means controlled by said switch machine for controlling said light signals.

3. A single track railway system having a siding, a plurality of color light signals at the entrance to said siding governing the entrance and departure of trains to and from said siding and the main track adjacent said siding, a power-operated switch machine for operating a switch leading to said siding, a relay at said siding for controlling said switch machine, control means for manually operating said relay from a distant point, said switch machine responding to a change in the position of said relay only if there are no trains within a certain zone near the middle of which said switch is located at the time said relay is changed, and manually controllable supplemental means for controlling said switch in accordance with the condition of said relay effective only if operated and if there are no trains within a more restricted zone adjacent said switch.

4. A single track railway system having a siding, a plurality of light signals at the entrance to said siding governing the entrance and departure of trains to and from said siding and the main track adjacent said siding, a power-operated switch machine for operating a switch leading to said siding, a relay at said siding for controlling said switch machine but effective only if all said light signals are at stop, control means for operating said relay from a distant point, said switch machine responding to a change in the condition of said relay only if there are no trains within a certain zone near the middle of which said switch is located at the time said relay is changed, a fouling track circuit at said switch, supplemental means manually operable for operating said switch machine in response to the position said relay assumes effective only if operated and then only if said fouling track circuit is unoccupied.

5. A single track railway system having a siding, a plurality of signals at the entrance to said siding governing the entrance and departure of trains to and from said siding and the main track adjacent said siding, a power-operated switch machine for operating a switch leading to said siding, a relay at said siding for controlling said switch machine, control means for manually controlling said relay from a distant point, a fouling track circuit at said switch, said switch machine responding to a change in the position of said relay only if said fouling track circuit is unoccupied and there are no trains within certain distances in both directions from said switch moving toward said switch, and manually operable supplemental means located near such switch machine for controlling said switch in accordance with the position of said relay even if there is a train moving toward said switch effective only if manually operated.

6. A single track railway system having a siding, a plurality of signals at the entrance to said siding governing the entrance and departure of trains to and from said siding and the main track adjacent said siding, a power-operated switch machine for operating a switch leading to said siding, a relay at said siding for controlling said switch machine, control means for manually controlling said relay from a distant point, a fouling track circuit at said switch, said switch machine responding to a change in the position of said relay only if said fouling track circuit is unoccupied and there are no trains within certain distances in both directions from said switch moving toward said switch, and manually operable supplemental means located near such switch machine for controlling said switch in accordance with the position of said relay even if there is a train moving toward said switch effective only if manually operated, said manually operable means having means associated therewith for preventing it being left in its active condition permanently.

7. A single track signaling system comprising; a single track section divided into sub-sections by insulated joints each including a normally closed track circuit including a track relay; wayside signals for governing the movement of trains in one direction over said section; wayside signals for governing the movement of trains in the other direction over said section; control means which places a signal governing a particular direction of traffic at stop when the next signal in advance is at stop; another control means including said track relays which renders said first mentioned control means inactive and places such signal at caution if the next signal in advance is at stop providing a train has just moved by such signal in advance in the direction in which such signal governs traffic; manually operable means for holding the first signal of the signals governing the movement of traffic in a particular direction in the single track section at stop; and means effective if the first signal for governing movement of traffic in one direction is released manually from its stop condition for placing signals governing the movement of traffic in the opposite direction at stop, whereby the direction in which trains may travel in such single track section is governed by said manually operable means, and means for recording the movement of trains into and out of said single track section.

8. In combination, a stretch of railway track, signals located at intervals through the stretch of track governing traffic in one direction, other signals located at intervals for governing traffic in the other direction, manually operable means for maintaining the first signal of signals governing each direction of traffic at danger, another means for causing all signals in the rear of a signal for a certain direction of traffic to indicate danger if such signal indicates danger, means controlled when a signal changes from proceed to danger as a train passes it for rendering said another means ineffective to hold at danger a signal in the rear of the signal which just changed to danger, means effective if the first signal of the signals governing traffic in one direction is permitted to assume its clear condition as a result of the manipulation of the manually controllable means to cause the last signal, and in turn the rest of the signals, governing traffic in the other direction to assume their danger position, and means for indicating in which sequence said manually operable means have been operated.

9. A single track railway system as specified in claim 8 terminating in a main track and a siding, a switch for said siding, a power-operated switch machine for operating said switch, and means for preventing the first signal of the signals governing traffic moving into the single track section from the main track assuming its clear condition unless said switch is set for the main track.

10. A single track railway system as specified in claim 8 terminating in a main track and a siding, a switch for said siding, a power-operated switch machine for operating said switch, a relay controlled over a line wire from a remote point for controlling said switch machine, and means for preventing the switch machine responding to a change in the position of said relay unless all of the signals at said siding governing traffic into and out of the single track section are at stop.

11. A single track railway system as specified in claim 8 terminating in a main track and a siding, a switch for said siding, a power-operated switch machine for operating said switch, a relay controlled over a line wire from a remote point for controlling said switch machine, and means for preventing the switch machine responding to a change in the position of said relay unless all of the signals at said siding governing traffic into and out of the single track section indicate stop, and means including said line wire for informing an operator at said remote point when said switch machine starts operating and again informing him when it has completed its operating stroke.

12. In combination, a stretch of railway track, signals located at intervals through the stretch of track governing traffic in one direction, other signals located at intervals for governing traffic in the other direction, manually operable means for maintaining the first signal of signals governing each direction of traffic at danger, another means for causing all signals in the rear of a signal for a certain direction of traffic to indicate danger if such signal indicates danger, means controlled when a signal changes from proceed to danger as it is passed by a train for rendering said another means ineffective to hold at danger a signal in the rear of a signal at danger, means effective if the first signal of the signals governing traffic in one direction is permitted to assume its clear condition as a result of the manipulation of the manually controllable means to cause the last signal, and in turn the rest of the signals, governing traffic in the other direction to assume their danger position, and means for recording the movements of trains into and out of such stretch of railway track.

13. In an interlocking system including a single track section equipped with absolute permissive block signaling including track relays, a main track and a siding at one end of the single track section, signals at the junction of said single track section main track and siding, control and recording means located at a distant point, a control relay located near said signals, a line circuit connecting said control and recording means and said control relay, and means for controlling said signals by said control means and for making a record by said recording means upon the movement of a train by said signals in each direction through the medium of said line circuit.

14. A non-train-order train dispatching system for single track railways equipped with absolute permissive block signaling and having passing sidings joining successive single track sections, a starting signal governing the movement of trains from a main track into a single track section, another starting signal governing the movement of trains from the siding adjacent said main track into the single track section, automatic means responsive to traffic conditions in the single track sections, an entering signal for governing the movement of trains from the single track into said siding, another entering signal for governing the movement of trains from the single track section into said main track, and manually controlled means controlled from a distant point for permitting any one and only such one of said starting or entering signals to respond to said automatic means and assume a proceed condition.

15. A non-train-order train dispatching system for single track railways equipped with absolute permissive block signaling and having main tracks and passing sidings joining successive single track sections, a starting signal governing the movement of trains from a main track into a single track section, another starting signal governing the movement of trains from the siding adjacent to said main track into said single track section, automatic means responsive to traffic conditions in the single track section, a manually controlled relay which if in one position causes one of the starting signals to respond to the condition of said automatic means, when in another position causes another of the starting signals to respond to said automatic means and when in a third position permits neither of said starting signals to respond to said automatic means, and means for recording the movement of a train by such starting signal.

16. A non-train-order train dispatching system for single track railways equipped with absolute permissive block signaling and having main tracks and passing sidings joining successive single track sections, a starting signal governing the movement of trains from a main track into a single track section, another starting signal governing the movement of trains from the siding adjacent to said main track into said single track section, automatic means responsive to traffic conditions in the single track section, a manually controlled relay which if in one position causes one of the starting signals to respond to the condition of said automatic means, when in another position causes another of the starting signals to respond to said automatic means and when in a third position permits neither of said signals to respond to said automatic means, and means for making a record upon passage of a train by such starting signal as to which of the two starting signals the train has passed by.

17. A non-train-order train dispatching system for single track railways comprising, a manually operable circuit controller, a relay located at a siding distant from said controller, a circuit connecting said controller and relay, a recorder in said circuit at the controller end of said circuit, and means for energizing both said recorder and said relay by either of two sources of energy one source of which is located near said controller and the other source of which is located near said relay.

18. A non-train-order train dispatching system for single track railways comprising, a manually operable circuit controller, a relay located at a siding distant from said controller, a circuit connecting said controller and relay, a recording device in said circuit at the controller end of said circuit, a source of energy at the circuit controller end of said circuit which through said circuit controller may be applied to said relay and said recording device, and means at the relay end of said circuit for maintaining said relay energized without energizing said recording device.

19. A non-train-order train dispatching system for single track railways comprising, a manually operable circuit controller, a relay located at a siding distant from said controller, a circuit connecting said controller and relay, a recording device in said circuit at the controller end of said circuit, a source of energy at the circuit controller end of said circuit which through said circuit controller may be applied to said relay and said recording device, and means at the relay end of said circuit including a front contact of said relay for maintaining said relay energized without energizing said recording device provided said relay has already assumed its energized position.

20. In a non-train-order train dispatching system, the combination with a control relay located at a distant siding, signals located at such siding controlled jointly by a track relay at such siding and said control relay, a circuit for said control relay including control means and a recorder, and means for transmitting distinctive code signals over said circuit to said recorder.

21. In a non-train-order train dispatching system, the combination with a control relay located at a distant siding, signals located at such siding controlled jointly by a track relay at such siding and said control relay, a circuit for said control relay including control means and a recorder, and means located at such siding for cutting off the flow of current from said controller to said control relay without affecting the condition of energization of said control relay and thereby actuating said recorder.

22. In a non-train-order train dispatching system, the combination with a control relay located at a distant siding, signals located at such siding controlled jointly by a track relay at such siding and said control relay, a circuit for said control relay including control means and a recorder, and means for transmitting distinctive code information over said circuit to said recorder without interfering with the control of said control relay by said control means.

23. In a non-train-order train dispatching system, the combination with a single track railroad having a plurality of passing sidings, two entering and two starting signals located at each end of each passing siding for governing the movement of trains into and out of the main track and siding of such passing siding respectively, and manually controllable means including not more than one line circuit for each end of each passing siding whereby any one of the four signals at one end of any of said passing sidings may be cleared for train dispatching purposes.

24. In a non-train-order train dispatching system, the combination with a single track railroad having a plurality of passing sidings, two entering and two starting signals located at each end of each passing siding for governing the movement of trains into and out of the main track and siding of such passing siding respectively, and manually operable means including not more than one line circuit for each end of each passing siding for preventing any three of the four signals at one end of any one of said sidings from assuming the proceed condition for train dispatching purposes.

25. A non-train-order train dispatching system comprising, a railway track having a passing siding including a siding and a main track, a signal for governing the movement of traffic into the main track, a signal for governing the movement of traffic into said siding, a signal for governing the movement of traffic out of said main track, a signal for governing the movement of traffic out of said siding, and manually controllable means for controlling said signals from a distant point including not more than one line circuit for each end of each passing siding permitting only one of said signals to indicate proceed at one time.

26. A non-train-order train dispatching system comprising, a railway track having a passing siding including a siding and a main track, a signal for governing the movement of traffic into the main track, a signal for governing the movement of traffic into said siding, a signal for governing the movement of traffic out of said main track, a signal for governing the movement of traffic out of said siding, automatic means for controlling each of said signals in accordance with traffic conditions in advance of such signals, and manually controllable means for permitting only one of said signals to indicate proceed.

27. A non-train-order track dispatching system comprising, a railway track having passing sidings each including a siding and a main track a signal for governing the movement of traffic into each main track, a signal for governing the movement of traffic into each siding, a signal for governing the movement of traffic out of each main track, a signal for governing the movement of traffic out of each siding, a common return wire leading along the entire railroad, means controlled from a distant point including one and only one line wire for each end of each passing siding in addition to said common return wire for holding any three of the four signals at each end of each passing siding at stop.

28. A non-train-order train dispatching system, comprising, a railway track having a passing siding including a siding and a main track, a signal for governing the movement of traffic into one end of the main track, a signal for governing the movement of traffic into one end of said siding, a signal for governing the movement of traffic out of the same end of said main track, a signal for governing the movement of traffic out of the same end of said siding, a common return wire leading along the entire railroad, means controlled from a distant point including one and only one line wire for such end of such passing siding in addition to said common return wire for holding any three of the four signals at such end of the passing siding at stop, and means for signaling to the operator at such distant point the entrance and departure of trains to and from that end of said passing siding over the corresponding line wire and common return wire.

29. A non-train-order train dispatching system, comprising, a railway track having passing sidings each including a siding and a main track, a signal for each end of each passing siding for governing the movement of traffic into the main track, a signal for each end of each passing siding for governing the movement of traffic into said siding, a signal for each end of each passing siding for governing the movement of traffic out of said main track, a signal for each end of each passing siding for governing the movement of traffic out of said siding, a common return wire leading along the entire railroad, means controlled from a distant point including one and only one line wire for each end of each passing siding in addition to said common return wire for holding any three of the four signals for each end of each passing siding at stop, and means for signaling to the operator at such distant point the entrance and departure of trains to and from each end of each passing siding over said line wires and said common return wire.

30. A non-train-order dispatching system comprising, a railway track having a passing siding including a siding and a main track, a signal for governing the movement of traffic into one end of the main track, a signal for governing the movement of traffic into one end of said siding, a signal for governing the movement of traffic out of the same end of said main track, a signal for governing the movement of traffic out of the same end of said siding, a common return wire leading along the entire railroad, means controlled from a distant point including one and only one wire for said one end of the passing siding in addition to said common return wire for holding any three of the four signals at said one end of the passing siding at stop, and means for automatically recording at such distant point through the medium of said line circuit the time of entrance of a train into and the departure of a train from that end of the passing siding.

31. A non-train-order train dispatching system comprising, a railway track having a passing siding including a siding and a main track, a signal for governing the movement of traffic into one end of the main track, a signal for governing the movement of traffic into one end of said siding, a signal for governing the movement of traffic out of the same end of said main track, a signal for governing the movement of traffic out of the same end of said siding, a common return wire leading along the entire railroad, means controlled from a distant point including one and only one line wire for said one end of said passing siding in addition to said common return wire for holding any three of the four signals at said one end of said passing siding at stop, and means for automatically recording electrically at such distant point the time of entrance and departure of trains to and from the said one end of said passing siding through the medium of said line wire and common return wire.

32. In combination with a railway track having a side track diverging therefrom, thus forming a single track section, a siding and a main track; a track switch for said siding; a power operated switch machine for operating said track switch; a tower located remotely to said track switch; a signal for governing the movement of traffic out of said siding governed by traffic conditions ahead; a signal for governing the movement of traffic into said siding governed by traffic conditions ahead; a signal for governing the movement of traffic out of said main track governed by traffic conditions ahead; a signal for governing the movement of traffic into said main track governed by traffic condition ahead: and means controlled from said tower for holding all of said signals at stop in spite of traffic conditions ahead, or for holding any three of the four signals at stop and permitting the fourth signal to assume an indicating condition in accordance with traffic conditions ahead, and for controlling the operation of said switch machine.

33. In a non-train-order train dispatching and route selecting system, the combination with a track switch, of a power-operated switch machine for operating said track switch, means controlled semi-automatically by a manually operable lever and track relays for controlling said switch machine, a switch stand for manually operating said track switch, and a switch selector for coupling said track switch to either said switch machine or said switch stand, whereby said track switch may be operated wholly manually or may be operated manually subject to automatic intervention depending on the operated position of said switch selector.

34. A railway system including a main track and a diverging track, a track switch for connecting said diverging track to said main track, a switch machine, a switch stand, signals controlled in accordance with traffic conditions and the position of said track switch, a switch selector for operatively connecting said track switch to be operable by said switch machine or by said switch stand, and means for causing said signals to indicate stop when said track switch is operatively connected to said switch stand.

35. A railway system including a main track and a diverging track, a track switch for connecting said diverging track to said main track, a switch machine, a switch stand, signals at said track switch controlled in accordance with traffic conditions and the position of said track switch, a switch selector for operatively connecting said track switch to be operable by said switch machine or by said switch stand, and means permitting clearing of said signals only when said track switch is operatively connected to said switch machine.

36. A railway system including a main track and a diverging track, a track switch for connecting said diverging track to said main track, a switch machine, a switch stand, signals located at the entrance to said diverging track controlled in accordance with traffic conditions and the position of said track switch, a switch selector for operatively connecting said track switch to be operable by said switch machine or by said switch stand, and means permitting said switch machine to be operated by power only when it is operatively connected to said track switch.

37. A railway track having a track switch, a manually controllable power operated switch machine for operating said track switch, and means governed by said switch machine for recording the time of operation of said track switch.

38. A railway track having a track switch, a power operated switch machine for operating said track switch, and means for recording the time at which the switch machine starts to operate and also the time at which the switch machine completes its operating stroke.

39. A railway track having a track switch, a manually controllable power operated switch machine for operating said track switch, and means for recording the time of operation of said track switch and the position to which it has been operated by said switch machine.

40. In a non-train-order train dispatching system, the combination with a railway track having a side track diverging therefrom, a railway vehicle, cab signals in the cab of said railway vehicle including a proceed, a restrictive and a diverging route signal, and means for governing the indicating conditions of said cab signals in accordance with traffic conditions and route conditions in advance of the vehicle, whereby the engineer is distinctively informed by indications in the cab as to whether he is to take the side track or the main track upon his approach to said side track.

41. In a non-train-order train dispatching system, the combination with a railway track having a side track diverging therefrom, a railway vehicle, cab signals in the cab of said railway vehicle including a proceed, a restrictive and a diverging route signal, a track switch at the entrance to said side track, and means for governing the indications of said cab signals in accordance with traffic conditions ahead and in accordance with the position of said track switch upon the approach of said vehicle toward the points of said switch.

42. In a non-train-order train dispatching system; the combination with a railway main track having a side track diverging therefrom; a railway vehicle; cab signals in the cab of said railway vehicle including a diverging route signal, and a stop-and-stay signal; and means for governing the indicating conditions of said signals in accordance with traffic conditions and route conditions in advance; whereby a stop-and-stay signal is displayed in the cab if the vehicle is not to pass the switch on the main track nor enter the side track, and the diverging route signal is displayed when the route is set up over said side track.

43. In a non-train-order train dispatching system, the combination with a railway track having a side track diverging therefrom; a railway vehicle; cab signals in the cab of said railway vehicle including a diverging route signal, a permissive stop signal and a stop-and-stay signal; and means for governing the indicating conditions of said permissive stop and said stop-and-stay signal in accordance with traffic conditions in advance and display said route signal when a route is set up over said side track whereby the engineer upon the display of a permissive stop signal is informed that he may proceed prepared to stop within vision, upon the display of a diverging route signal is informed that he is to take a side track and upon the display of a stop-and-stay signal is informed that he is to stop absolutely.

44. In a non-train-order train dispatching system, the combination with a railway track having a side track diverging therefrom; a railway vehicle; cab signals in the cab of said railway vehicle including a diverging route signal, a permissive stop signal and a stop-and-stay signal; and means for distinctively controlling said diverging route signal, said permissive stop signal and said stop-and-stay signal in accordance with traffic conditions ahead, and for automatically applying the brakes irrespective of the speed of the vehicle upon the display of a stop-and-stay signal.

45. In a non-train-order train dispatching system; the combination with a railway track having a side track diverging therefrom; a railway vehicle; cab signals in the cab of said railway vehicle including a diverging route signal, a stop-and-stay signal, a clear signal, a caution signal and a permissive stop signal; and means for governing said signals in accordance with traffic conditions and route conditions ahead.

46. In a non-train-order train dispatching system; the combination with a railway track having a side track diverging therefrom; a railway vehicle; cab signals in the cab of said railway vehicle including a diverging route signal, a stop-and-stay signal, a clear signal, a caution signal and a permissive stop signal; means for restricting the speed of the vehicle if a diverging route signal, a caution signal or a permissive stop signal is displayed; and for applying the brakes of the vehicle regardless of speed if a stop-and-stay signal is displayed.

47. A non-train-order cab signal train dispatching system for railways having passing sidings comprising; a railway vehicle having a diverging route signal, a proceed signal and a stop-and-stay signal in the cab thereof; means partly on the vehicle and partly along the trackway for governing said signals in accordance with traffic conditions ahead of the vehicle in accordance with the route set up and in accordance with manually operable means located at a distant tower.

48. A non-train-order cab signal train dispatching system for railways having passing sidings comprising; a railway vehicle having a diverging route signal, a proceed signal and a stop-and-stay signal in the cab thereof; means partly on the vehicle and partly along the trackway for governing said signals in accordance with traffic conditions ahead of the vehicle and in accordance with manually operable means located at a distant tower; and means for restricting the speed of the train upon the display of a diverging route signal and for applying the brakes of the train regardless of the speed thereof when the stop-and-stay signal is displayed.

49. In a non-train-order train dispatching and route selecting system, the combination with a track switch, power operated means for operating said track switch, means controlled semi-automatically by a manually operable lever and track relays controlling said power operated means, manually operable means for manually operating a track switch, and a selector for coupling said track switch to either said power operated means or said manually operable means.

50. A device for recording the time at which a train passes a given point comprising, normally inactive tape feeding mechanism which if rendered active will remain active through a cycle of operation, graphic means for engaging the tape when rendered active, means located at said point for actuating said graphic means and said mechanism, and means for stamping the time of day on said tape actuated only just prior to the time said tape feeding mechanism has completed its operating cycle.

51. In a non-train-order train dispatching system, the combination with a railway track having a passing siding, an entering signal at each end of the main track of said passing siding, means for interlocking said entering signals so that only one of said entering signals can clear at the same time, automatic means for controlling said signals, and manually operable means for preventing clearing of said signals.

52. In a non-train-order train dispatching system, the combination with a railway track having a passing siding, an entering signal at one end of said passing siding, a starting signal at the same end of said passing siding, means for interlocking said signals so that clearing of said starting signal prevents clearing of said entering signal, automatic means for permitting clearing of both of said signals, and manually operable means for preventing clearing of said starting signal and in turn preventing clearing of said entering signal.

53. In a non-train-order train dispatching system, the combination with a railway track having a passing siding, a diverging route signal at one end of said siding, a starting signal at the same end of said passing siding, a circuit for said starting signal which if closed causes said starting signal to indicate proceed, means for controlling the integrity of the said circuit in accordance with traffic conditions, a circuit for said diverging route signal which if closed causes said diverging route signal to indicate proceed, said last mentioned circuit including a contact closed when said starting signal is at stop and open when said starting signal is at proceed, and manually operable means for controlling the integrity of said circuits.

54. In a system for controlling a distant track switch, the combination with a railway track having a diverging route diverging therefrom through the medium of a track switch, a switch machine for operating said track switch, a control relay located near said switch machine for controlling the operation of said switch machine, means for controlling said control relay from a distant point, a fouling track circuit associated with said track switch, a signal at said track switch for governing the passage of trains over said track switch, an approach zone, approach locking means for preventing operation of said switch machine in response to the control of said control relay effective if an approaching train entered said control zone while said signal is indicating proceed, and means whereby momentary occupancy of said fouling track circuit renders said approach locking means inactive.

55. In a system for controlling a distant track switch, the combination with a railway track having a diverging route diverging therefrom through the medium of a track switch, a switch machine for operating said track switch, a control relay located near said switch machine for controlling the operation of said switch machine, means for controlling said control relay from a distant point, a fouling track circuit associated with said track switch, a signal at said track switch for governing the passage of trains over said track switch, an approach zone, approach locking means for preventing operation of said switch machine in response to the control of said control relay effective if an approaching train entered said control zone while said signal is indicating proceed, and approach locking canceling means for rendering said approach locking means inactive rendered active upon temporary occupancy of said fouling track circuit and so long as said signal is not cleared.

56. A non-train-order cab signal train dispatching system, a railway track having a route diverging therefrom through the medium of a track switch, a switch machine for operating said track switch, a vehicle having a main cab signal and a diverging route cab signal, a control relay near said switch machine for controlling said switch machine and the indicating conditions of said cab signals providing said vehicle is within a limited distance of said track switch, means for controlling said control relay from a distant point including a line circuit, and means for indicating at said distant point and over said line circuit the passage of the vehicle over said track switch.

57. A non-train-order cab signal train dispatching system, a railway track having a route diverging therefrom through the medium of a track switch, a switch machine for operating said track switch, a vehicle having a main cab signal and a diverging route cab signal, a control relay near said switch machine for controlling said switch machine and the indicating conditions of said cab signals depending on traffic conditions ahead of the vehicle providing said vehicle is within a limited distance of said track switch, an approach zone to said track switch, means for preventing operating of said switch machine if said main cab signal indicated favorable traffic conditions when said vehicle entered said approach zone, and means for controlling said control relay from a distant point.

58. In a system for controlling a distant track switch, the combination with a railway track having a diverging route diverging therefrom through the medium of a track switch, a switch machine for operating said track switch, a control relay located near said switch machine for controlling the operation of said switch machine, means for controlling said control relay from a distant point, a fouling track circuit associated with said track switch, a signal at said track switch for governing the passage of trains over said track switch, an approach zone, approach locking means for preventing operation of said switch machine in response to the control of said control relay effective if an approaching train entered said control zone while said signal was indicating proceed, and means for rendering said approach locking means ineffective rendered active upon occupancy followed by unoccupancy of said fouling track circuit.

59. In a system for controlling a distant track switch, the combination with a railway track having a diverging route diverging therefrom through the medium of a track switch, a switch machine for operating said track switch, a control relay located near said switch machine for controlling the operation of said switch machine, means for controlling said control relay from a distant point, a fouling track circuit associated with said track switch, an approach zone, approach locking means for preventing operation of said switch machine in response to the control of said control relay effective if a train entered said control zone while said signal was indicating proceed, but ineffective in response to a departing train, and means for rendering said approach locking means ineffective rendered active upon occupancy followed by unoccupancy of said fouling track circuit providing said signal has not indicated proceed since such fouling track circuit occupancy.

60. In a system for controlling a distant track switch, the combination with a railway track having a diverging route diverging therefrom through the medium of a track switch, a switch machine for operating said track switch, a control relay located near said switch machine for controlling the operation of said switch machine, means for controlling said control relay from a distant point, a signal at said track switch for governing the passage of trains over said track switch, an approach zone, approach locking means for preventing operation of said switch machine in response to the control of said control relay effective if an approaching train entered said control zone while said signal was indicating proceed, and means whereby the engineer from his cab may render said approach locking means ineffective.

61. A system for safely controlling the operation of a track switch, a railway track having a diverging route diverging therefrom through the medium of a track switch, a switch machine for operating said track switch, means for controlling said switch machine from a distant point, approach locking means for preventing operation of said switch machine when there is a train approaching, and means whereby the engineer of such approaching train may render said approach locking means inactive from his cab.

62. A system for safely controlling the operation of a track switch, a railway track having a diverging route diverging therefrom through the medium of a track switch, a switch machine for operating said track switch, means for controlling said switch machine from a distant point, approach locking means for preventing operation of said switch machine where there is a train approaching, and means whereby the engineer through the movement of his train can render said approach locking means ineffective.

63. A system for safely controlling the operation of a track switch, a railway track having a diverging route diverging therefrom through the medium of a track switch, a switch machine for operating said track switch, means for controlling said switch machine from a distant point, signals governing the movement of trains over said track switch, a fouling track circuit associated with said track switch, and a stick relay active when de-energized to prevent operation of said switch machine in spite of operation of said control means, said stick relay having a pickup circuit closed when said fouling track circuit is occupied and said signals are at stop and having a stick circuit closed when said stick relay once assumes its energized condition and said signals are at stop.

64. A system for safely controlling the operation of a track switch, a railway track having a diverging route diverging therefrom through the medium of a track switch, a switch machine for operating said track switch, means for controlling said switch machine from a distant point, signals governing the movement of trains over said track switch, a fouling track circuit associated with said track switch, and approach locking means including a stick relay and active if either said stick relay is de-energized or said fouling track circuit is occupied, said stick relay having a pickup circuit closed if said signals are at stop and said fouling track circuit is occupied and having a stick circuit closed if said stick relay once assumes its energized condition and said signals are at stop, whereby said approach locking means may be rendered inactive if said signals are at stop by temporary occupancy by the train of said fouling track circuit.

65. A system for safely controlling the operation of a track switch, a railway track having a diverging route diverging therefrom through the medium of a track switch, a switch machine for operating said track switch, means for controlling signals governing the movement of trains over said track switch, a fouling track circuit associated with said track switch, and a stick relay active when de-energized to prevent operation of said switch machine, said stick relay having a pickup circuit closed when an approach zone leading to said track switch is not occupied by an approaching train or said fouling track circuit is occupied and said signals assume the stop indicating condition and having a stick circuit closed when said stick relay once assumes its energized condition and said signals are at stop.

66. A system for safely controlling the operation of a track switch, a railway track having a diverging route diverging therefrom through the medium of a track switch, a switch machine for operating said track switch, means for controlling said switch machine from a distant point, signals governing the movement of trains over said track switch, a fouling track circuit associated with said track switch, and a stick relay active when de-energized to prevent operation of said switch machine, said stick relay having a pickup circuit closed when an approach zone leading to said track switch is not occupied by an approaching train or when said fouling track circuit is occupied or when suitable manually operable means is operated and said signals assume the stop indicating condition and having a stick circuit closed when said stick relay once assumes its energized condition and said signals are at stop.

67. In a train dispatching system, the combination with a railway track divided into passing sidings and single track sections, starting signals at each end of each main track of said passing siding for governing the passage of trains into the adjoining single track sections, an entering signal for governing the entrance of trains into each end of the main track of each passing siding, a lever for each end of each passing siding for controlling said signals, and means including said levers whereby only one of two adjacent starting signals and only one of two adjacent entering signals may be cleared functioning in accordance with the sequence of operation of said levers.

68. In a train dispatching system, the combination with a railway track divided into passing sidings and single track sections, starting signals at each end of each main track of said passing sidings for governing the passage of trains into the adjoining single track sections, an entering signal for governing the entrance of trains into each end of the main track of each passing siding, a lever for each end of each passing siding for controlling said signals, and means including said levers whereby only one of two adjacent starting signals or only one of two adjacent entering signals may be cleared functioning in accordance with the sequence of operation of said levers, and means associated with said levers for indicating the sequence in which said levers have been operated.

69. In a train dispatching system, the combination with a railway track divided into passing sidings and single track sections, starting signals at each end of each main track of a passing siding for governing the passage of trains into the adjoining single track sections, a diverging route signal at each end of each passing siding for governing the movement of trains into such siding, a lever for each end of each passing siding, and means including said levers for clearing one of two starting signals at opposite ends of a single track section in accordance with the sequence of operation of the levers for the ends of said section and clearing one of two diverging route signals at the opposite ends of a single track section in accordance with the sequence of operation of the levers at the ends of such single track section.

70. In a train dispatching system, the combination with a railway track divided into passing sidings and single track sections, starting signals at each end of each main track of said passing siding for governing the passage of trains into the adjoining single track sections, an entering signal at each end of each passing siding for governing the movement of trains out of the adjoining single track section, a lever for each end of each passing siding for governing said signals, and means including said levers for clearing a starting signal at one end of a single track section and an entering signal at the other end of said single track section in accordance with the sequence in which the levers for the ends of such single track section are operated.

71. In a train dispatching system, the combination with a railway track divided by passing sidings into single track sections, a track switch at each end of each passing siding, a fouling track circuit associated with each track switch each including the usual track relay, means for operating said track switches and governing movement of traffic thereover, and graphic recording means for recording on a chart in adjacent columns arranged in the same order as said track switches the time at which these track switches are operated and the time of entrance and departure of trains onto and off of said fouling track circuits.

72. In a train dispatching system, the combination with a single track section of railway track, a starting signal at each end of said single track section for governing the entrance of trains into said single track section, a lever for each of said signals for controlling the same, interlocking means for permitting only one of said signals to clear depending on the sequence in which said levers are operated, and graphic recording means for recording the sequence in which said levers have been moved.

73. In a train dispatching system, the combination with a railway track divided into single track sections by passing sidings, a starting signal at each end of a single track section for governing the entrance of trains into said single track section, an entering signal at each end of said single track section for governing the departure of trains from that end of said single track section, a lever for each end of said single track section, means including said levers for clearing a starting signal at one end and an entering signal at the other end of said single track section in accordance with the sequence in which said levers have been operated, and graphic recording means for indicating the sequence in which said levers have been operated.

74. In a system for controlling a distant track switch from a local office, the combination with a railway track having a passing siding including a track switch at each end thereof, a switch machine for operating the track switch at one end of said siding, a control relay for controlling said switch machine from a distant point, means for preventing said switch machine responding to the control of said control relay if the main track of said passing siding is occupied by an approaching train or an approach zone located beyond the said main track is occupied by an approaching train and means for canceling the approach locking effect of the zone beyond said main track if the track switch at the end opposite said switch machine assumes the take-siding position.

75. A system for safely controlling the operation of a track switch, a railway track having a diverging route diverging therefrom through the medium of a track switch, a switch machine for operating said track switch, means for controlling said switch machine from a distant point, approach locking means for preventing operation of said switch machine when there is a train approaching, and means partly on said approaching train and partly along the trackway for permitting the engineer on said train to render said approach locking means inactive.

76. A system for safely controlling the operation of a track switch, a railway track having a diverging route diverging therefrom through the medium of a track switch, a switch machine for operating said track switch, means for controlling said switch machine from a distant point, approach locking means for preventing operation of said switch machine when there is a train approaching, means partly on said approaching train and partly along the trackway for permitting the engineer on said train to render said approach locking means inactive, and means preventing misuse of said last mentioned means.

77. A train dispatching system comprising, a main track and a siding diverging therefrom, a track switch for controlling movement of traffic over the main track and into said siding, signals for governing movement of traffic over said main track and into said siding, a switch machine for governing operation of said track switch, a detector track circuit associated with said track switch, a distant dispatcher's office, a visual indicator in said dispatcher's office, a lever in said dispatcher's office, and means for controlling said indicator in accordance with the occupancy of said detector track circuit and controlling said switch machine and signals in accordance with the operated position of said lever over the same line circuit.

78. In combination, a railway track switch, signals governing traffic over said track switch, a signal control means for each signal, a stick relay, a pick-up circuit for said stick relay controlled by said signal control means and traffic conditions adjacent said signals, a stick circuit for said relay controlled by said signal control means, a time element device actuated by said signal control means and said stick relay, a second pick-up circuit for said stick relay closed when said time element device is actuated in accordance with said signal control means, and means permitting said track switch to be operated only when said stick relay is actuated and said time element device is not actuated.

79. In a traffic controlling system for railroads, a power operated track switch, signals governing traffic over said track switch, a time element device temporarily actuated when said signals are put to stop, means registering the temporary actuation of said time element device, and means preventing the operation of said track switch except when said time element device has returned to normal after registering a temporary actuation.

80. In a traffic controlling system for railroads, a power operated track switch, signals governing traffic over said track switch, a time element device temporarily actuated when said signals are put to stop, means registering the temporary actuation of said time element device, means preventing the operation of said track switch only when said time element device has returned to normal after registering a temporary actuation, and means cancelling said registering means when said signals are clear.

81. In combination, a switch machine for operating a track switch, a signal governing movement of traffic over said track switch, a stick relay having a stick circuit including a contact closed only when said signal is at stop, a slow acting relay, a pick-up circuit for said stick relay closed when said slow acting relay is energized, and a control circuit for said switch machine closed only if said stick relay is energized and said slow acting relay assumes its deenergized position.

82. In combination, a switch machine for operating a track switch, a signal governing movement of traffic over said track switch, a stick relay having a stick circuit including a contact closed only when said signal is at stop, a slow acting relay, a pickup circuit for said stick relay closed when said slow acting relay is energized, means for deenergizing said slow acting relay when said stick relay assumes its energized position and a control circuit for said switch machine closed only if said stick relay is energized and said slow acting relay assumes its deenergized position.

83. An electro-responsive means; and means for closing a control circuit for said electro-responsive means comprising; a stick relay, a slow acting relay, an energizing circuit for said slow acting relay including a back contact of said stick relay, a pick-up circuit for said stick relay including a front contact of said slow acting relay, and a front contact of said stick relay and a back contact of said slow acting relay included in such control circuit, whereby forward and back movement of said slow acting relay is required to effect closure of said control circuit.

84. In combination, a railway track switch, a signal for directing traffic movements over said switch and including a contact operated in accordance with the indicating condition of said signal, an approach track circuit for said signal including a track relay, a time element device including a track relay, a stick relay controlled by said contact, a stick relay controlled by said contact and by said track relay as well as by said time element device, and means controlled by said stick relay for controlling said switch.

85. In combination, a railway track switch, a signal for directing traffic movements over said switch, a signal relay for controlling said signal, an approach track circuit for said signal including a track relay, a time element device controlled by said signal relay, a stick relay controlled by said signal relay and by said track relay as well as by said time element device, and means controlled by said stick relay for controlling said switch.

86. In a railway train control system, in combination: a trackway; means dividing the trackway into electrically isolated sections; siding switches at intervals along the trackway; motors for operating said switches; a signal for each switch indicative of the closed position thereof; a signal for each switch indicative of the open position thereof; a central station; means at the central station for simultaneously operating the switch and one of the signals and for selecting the signal which corresponds to the position of the switch as effected by the operation of said means; and means at the central station controlled by said central station means and also controlled by the presence of a car in a section in which a siding switch is included for recording the presence of the car in such section with reference to the open or closed condition of the switch during such movement.

87. In combination, a section of railway track containing a railway track switch, a signal for governing traffic movements over said switch, a control circuit for said signal, a track relay for said section, a locking relay controlled by said track relay and by said signal control circuit, a stick relay, a pick-up circuit for said stick relay controlled by said track relay, a stick circuit for said stick relay controlled by said locking relay, and means controlled by said stick relay for controlling said switch.

88. In combination, a railway track switch, a signal for governing traffic movements over said switch, a control circuit for said signal, a first relay controlled by said signal control circuit, a stick relay, a pick-up circuit for said stick relay controlled by traffic conditions, a stick circuit for said stick relay controlled by said first relay, and means effective only when said stick relay is energized for controlling said switch.

89. In combination with a railway track switch, an indication relay responsive to the condition of said switch, a signal for governing traffic over said switch, a control circuit for said signal, a stick relay controlled by said signal control circuit and by said indication relay, and means controlled by said stick relay for operating said switch.

90. In combination, a main and an approach section of railway track, a switch in said main section, a signal for governing traffic over said switch, a control circuit for said signal, a stick relay, a pick-up circuit for said stick relay controlled by traffic conditions in said main section, a manually controlled pick-up circuit for said stick relay, a stick circuit for said stick relay controlled by said signal control circuit and by traffic conditions in said approach section, and means controlled by said stick relay for operating said switch.

91. In combination, a main and an approach section of railway track, a switch in said main section, a signal for governing traffic over said switch, a control circuit for said signal, two track relays one for each said section, a manually operable circuit controller, a stick relay controlled by said signal control circuit and said circuit controller and by both said track relays, and means controlled by said stick relay for operating said switch.

92. In a system of the type described, the combination with a power operated track switch and a signal governing traffic over the switch, of a stick relay controlling the application of power to the switch, a stick circuit for said relay broken when said signal indicates clear, a pick-up circuit for said relay, and a time responsive device set into operation upon deenergization of said relay and when said signal indicates stop for closing said pick-up circuit after the lapse of a predetermined interval of time.

93. In combination, an electro-responsive signal controlling device, a stick relay, a pick-up circuit for said relay controlled by said device and by traffic conditions adjacent said device, a stick circuit for said relay controlled by said device, a time element device controlled by said relay, a second pick-up circuit for said relay controlled by said time element device, and means controlled by said relay for controlling a second electro-responsive signal controlling device.

94. In combination, a railway traffic governing device, a signal relay for controlling said signal, a signal governing traffic over said device, a signal relay for controlling said signal, a time element device controlled by said signal relay, a stick relay, a pick-up circuit for said stick relay controlled by said time element device, a stick circuit for said stick relay controlled by said signal relay, and means controlled by said stick relay for controlling said railway traffic governing device.

95. In an automatic train control, in combination, a trackway, means dividing the trackway into electrically isolated sections, sidings at intervals, a polarized relay positioned at each siding, a central station, a vehicle, more than two vehicle control means on the vehicle, means located at the central station manually operable for characteristically energizing the polarized relay at a siding and means governed by the said relay for controlling the vehicle control means, and means associated with each section and controlled by the manually operable means and the polarized relay for recording at the central station the progress of a vehicle over the section.

96. In an automatic train control, in combination, a trackway, means dividing the trackway into electrically isolated sections, sidings at intervals, a polarized relay positioned at each siding, a central station, a vehicle, vehicle control means on the vehicle, means located at the central station manually operable for characteristically energizing the polarized relay at a siding and means governed by the said relay for controlling the vehicle control means, and means associated with each section and controlled by the manually operable means and the polarized relay for indicating at the central station the progress of a vehicle over the section.

97. In combination, a track switch, a switch stand, a switch machine, a dual selector for mechanically selectively conditioning said track switch for operation manually by said switch stand or by said switch machine, a stick relay, a control circuit for said switch machine including a front contact of said stick relay, and a pick-up circuit for said stick relay including a contact controlled by said dual selector.

98. In combination, a track switch, a switch machine, a dual selector for selectively conditioning said track switch for operation manually or by said switch machine, contacts controlled by said dual selector closed only when said dual selector is in position to permit control of said track switch by said switch machine, a signal controlled from a remote point and for controlling traffic over said track switch, and means for preventing clearing of said signal when said contacts are open.

99. In combination, a track switch, a switch machine, a dual selector for selectively conditioning said track switch for operation manually or by said switch machine, contacts controlled by said dual selector closed only when said dual selector is in position to permit control of said track switch by said switch machine, a signal controlled from a remote point and subject to traffic conditions in advance and for controlling traffic over said track switch, and means for preventing clearing of said signal when said contacts are open.

100. In combination, a track switch, a switch machine, a dual selector for selectively conditioning said track switch for operation manually or by said switch machine, a stick relay, a control circuit for said switch machine including a front contact of said stick relay, a signal for governing traffic over said track switch, a controlling circuit for said signal, and contacts controlled by said dual control selector included in a pick-up circuit for said stick relay and in a controlling circuit for said signal.

101. In combination with a section of railway track, a track switch in said section, a switch machine for operating said track switch, a signal for governing traffic over said track switch, means for controlling said switch machine and said signal from a distant point, a stick relay which if deenergized prevents operation of said switch machine, manually operable means local to said track switch and having a normally open contact, a pick-up circuit for said stick relay including said contact, and a holding circuit for said stick relay including a contact closed only when said signal is at stop.

102. In combination with a section of railway track, a track switch in said section, a switch machine for operating said track switch, four signals for governing traffic over said track switch, a contact for each signal closed only if such signal is at stop, means for controlling said switch machine and said signals from a distant point, a stick relay which if deenergized prevents operation of said switch machine, manually operable means local to said track switch and having a normally open contact, a pick-up circuit for said stick relay including said contact, and a holding circuit for said stick relay including in series the four contacts of said four signals.

103. In combination with a section of railway track, a track switch in said section, a switch machine for operating said track switch, a detector track circuit associated with said track switch and including a track relay, a stick relay which if deenergized prevents operation of said switch machine, manually operable means local to said track switch and having a normally open contact, and two pick-up circuits for said stick relay one including said normally open contact and the other including a back contact of said track relay.

104. In combination with a section of railway track, a track switch in said section, a switch machine for operating said track switch, a stick relay which if deenergized prevents operation of said switch machine, and manually operable means local to said switch machine which has a normally closed contact which must be closed to permit power operation of said switch machine and which has a normally open contact included in a pick-up circuit for said stick relay, whereby if said stick relay assumes its deenergized position said manually operable means must be operated and returned to normal to pick up said stick relay to permit power operation of said track switch.

105. In combination, a railway track switch, a signal for governing traffic movements over said switch, a control circuit for said signal, a manually operable device, a control circuit for said switch, a stick relay controlled by said manually operable device and by said signal control circuit, and means controlled by said relay for controlling said switch.

106. In combination, a railway track switch, a control circuit for said switch, a manually operable device, a stick relay controlled by said manually operable device and by said switch control circuit, and means controlled by said relay for controlling said switch.

107. In combination, a railway track switch, a signal for governing traffic movements over said switch, a switch control relay for said switch, a signal control relay for said signal, a stick relay controlled by said switch control relay and by said signal control relay, and means controlled by said stick relay for controlling said switch.

108. In combination, a railway track switch, a signal for governing traffic over said switch, a stick relay for controlling said switch, a manually controlled time measuring device, a pick-up circuit for said stick relay controlled by said time measuring device and energizable only when said signal indicates stop, and a stick circuit for said stick relay energizable only when said signal indicates stop.

109. In a train dispatching system the combination of a single track railroad having a plurality of passing sidings, track circuits on said track, entering and starting signals located at each end of said passing sidings for governing the movement of trains through the stretch of track adjacent said main track and siding, a common return wire leading along the entire railroad, and manually controllable means located at a distant point, including not more than one line circuit for each end of each passing siding whereby any one of the signals at either end of said passing sidings may be cleared for train dispatching purposes, and means including said track circuits for automatically recording electrically at said distant point the time of entrance and departure of trains to and from either end of said passing siding through the medium of said line circuit and said common return wire.

110. In combination, a railway traffic governing device having two positions, a manually controlled device capable of assuming different conditions, means for operating said railway traffic governing device to one position or the other in accordance with the condition of said manually controlled device, other means for at times manually operating said railway traffic governing device, and means effective after said railway traffic governing device has been manually operated for automatically restoring said railway traffic governing device to the position corresponding to the condition of said manually controlled device.

111. In combination, a railway switch having normal and reverse positions, a manually controlled polarized relay, means for operating said switch to its normal or reverse position according as said polarized relay is energized in one direction or the other, means for at times manually operating said switch, and means effective after said switch has been manually operated for automatically restoring said switch to the position corresponding to the condition of said polarized relay.

112. In combination, a railway switch having normal and reverse positions, a manually controlled polarized relay, means for operating said switch to its normal or its reverse position according as said polarized relay is energized in one direction or the other, means for at times manually operating said switch, a contact which is operated when said switch is manually operated, and means controlled in part by said contact for automatically restoring said switch to the position corresponding to the condition of said polarized relay after said switch has been manually operated.

113. In combination, a railway switch, a manually controlled relay capable of assuming different conditions, a normally closed contact, a normally open contact, means including said normally closed contact for operating said switch to its normal or its reverse position in accordance with the condition of said relay, means for at times manually operating said switch, means for opening said normally closed contact and for closing said normally open contact when said switch is manually operated, and means controlled by said normally open contact for automatically restoring said switch to the position corresponding to the condition of said relay after said switch has been manually operated.

114. In combination, a railway traffic governing device having two positions, a manually controlled device capable of assuming different conditions, operating means for moving said railway traffic governing device to one position or the other in accordance with the condition of said manually controlled device, other means for at times manually operating said railway traffic governing device, means for rendering said operating means ineffective during manual operation, and other means effective after said railway traffic governing device has been manually operated for automatically restoring said railway traffic governing device to the position corresponding to the condition of said manually controlled device.

115. In combination, a railway traffic governing device having two positions, a manually controlled device capable of assuming different conditions, means for operating said railway traffic governing device to one position or the other in accordance with the condition of said manually controlled device, other means for at times manually operating said railway traffic governing device, a contact which is operated when said traffic governing device is manually operated, and means controlled in part by said contact effective after said railway traffic governing device has been manually operated for automatically restoring said railway traffic governing device to the position corresponding to the condition of said manually controlled device.

116. In combination, a section of railway track, a code transmitter, means controlled by traffic conditions for operating said transmitter to transmit distinctive codes upon the entrance and exit of a train into a section, and recording means located at a remote point and controlled by codes originating at said transmitter for producing marks on a record sheet reproducing said distinctive codes.

117. In combination with a stretch of railway track including a track switch and having two pairs of opposing signals each pair including a signal at each end of said stretch, one pair for governing traffic through said stretch when the switch is normal and another pair for governing traffic through said stretch when the switch is reversed, switch control means for operating said switch and signal control means for selectively clearing said signals governed manually from a distant point, and interlocked circuits controlled through the medium of said switch control means for preventing the clearing of a signal except when the route indicated by said signal control means is in agreement with the route indicated by said switch control means.

118. In combination with a stretch of railway track including a track switch and having two pairs of opposing signals each pair including a signal at each end of said stretch, one pair for governing traffic through said stretch when the switch is normal and another pair for governing traffic through said stretch when the switch is reversed, switch control means for operating said switch and signal control means for selectively clearing said signals governed manually from a distant point, and interlocked circuits controlled by said switch control means through the medium of said switch for preventing the clearing of a signal except when the route indicated by said signal control means agrees with the route determined by the position of the switch.

119. In combination with a railway switch, a manually operable lever located at a point remote from the switch, means including a single pair of line wires extending between the switch and said point for moving the switch to one position or the other depending upon the position of said lever, an indication relay located at said remote point, means effective upon an operation of said switch to energize said indication relay repeatedly over said line wires, and means responsive to traffic conditions adjacent said switch for at times causing less frequent energization of said indication relay over said line wires.

120. In combination, a stretch of railway track, a traffic governing device associated with said stretch, an indication instrument, means controlled by said governing device and by track circuit conditions in said stretch for causing an operation of said instrument, and means controlled only by track circuit conditions in said stretch for causing a second operation of said instrument.

121. In combination with a section of railway track including a track switch, a signal governing the movement of traffic through said section, selecting means controlled from a distant point for operating the switch, a stick relay, means for preventing operation of said switch by said selecting means except when said stick relay is energized, a pick-up circuit for said stick relay including a contact of a slow acting device adapted to be closed only when said signal indicates stop, and a stick circuit for said stick relay closed only when said signal indicates stop and including a front contact of said stick relay.

122. In an interlocking system for railways, a main line track and a turn out track, a governing home signal and track switch, a power-operated switch machine, a control circuit for the switch machine, means for closing the control circuit including a short time element and a manual lever for the home signal in normal position.

123. In combination, a railway system including a track switch, a switch machine for operating said track switch, a stick relay, normally disconnected manually operable means for operating said track switch, a pick-up circuit for said stick relay closed only when said manually operable means is connected for manual operation of said track switch, a stick circuit for said stick relay, and an operating circuit for said switch machine including a front contact of said stick relay and a contact closed only if said manually operable means is disconnected.

124. In combination, an electroresponsive device, control means for energizing said electroresponsive device, an electroresponsive time delay device controlled in part by said control means and having a front and a back contact, a stick relay having a front contact, a pick-up circuit for energizing said stick relay including said front contact of said time delay device, a stick circuit for said stick relay, and a circuit for energizing said electroresponsive device including said front contact of said stick relay and said back contact of said time delay device in series.

125. In combination, an electroresponsive device, control means for energizing said electroresponsive device, an electroresponsive time delay device controlled in part by said control means and having a front and a back contact, a stick relay having a front contact, a pick-up circuit for energizing said stick relay including said front contact of said time delay device, a stick circuit for said stick relay, and a circuit for energizing said electroresponsive device including said front contact of said stick relay and said back contact of said time delay device and a contact of said control means in series.

126. In combination, a railway track switch, signals governing traffic over said track switch, a stick relay, a pick-up circuit for said stick relay controlled by said signals and traffic conditions adjacent said signals, a stick circuit for said relay closed only if said signals are at stop, a time element device controlled by said stick relay, a second pick-up circuit for said stick relay closed when said time element device is in its actuated condition, and means permitting said track switch to be operated only when said stick relay is in its actuated condition and said time element device is in its non-actuated condition.

127. In a traffic controlling system for railroads, a power-operated track switch, signals governing traffic over said track switch, a time element device temporarily actuated when said signals are put to stop, means registering the temporary actuation of said time element device, and a circuit for operating said track switch and including contacts closed only if said registering means has been operated and also said time element device has returned to its normal initial condition ready for another temporary actuation.

128. In combination, a railway track switch, signals governing traffic over said track switch, a stick relay, a pick-up circuit for said stick relay controlled by said signals and traffic conditions adjacent said signals, a stick circuit for said relay controlled by said signals, a time element device controlled by said signals and said stick relay, a second pick-up circuit for said stick relay closed when said time element device is in its actuated condition, and means permitting said track switch to be operated only when said stick relay is in its actuated condition and said time element device is in its non-actuated condition.

129. In a delay circuit, a circuit to be controlled, an electroresponsive time delay device, means responsive to the operation of said device to its active condition to close said circuit at one point, and means effective only upon the release of said device to normal to close said circuit at another point.

130. In an electrical switching system, a circuit normally open at two points, an electroresponsive delay switch arranged when actuated to close one of said circuit openings and to close the second opening when the switch is returned to normal, and means for automatically maintaining said first opening closed after the restoration of said switch.

131. In combination, an electroresponsive device, control means for energizing said electroresponsive device, an electroresponsive time delay device controlled in part by said control means and having a front and a back contact, a stick relay having a front contact and having a back contact included in the energizing circuit of said time delay device, a pick-up circuit for energizing said stick relay including said front contact of said time delay device, a stick circuit for said stick relay, and a circuit for energizing said electroresponsive device including said front contact of said stick relay and said back contact of said time delay device in series.

132. In combination, a railway track switch, a polarized indication relay controlled by said switch, and means controlled by polar contacts of said relay for at times preventing operation of said switch from the position to which said switch has last previously been operated.

133. In combination, a track layout including a track switch for setting up a plurality of routes, power operated means for operating said track switch, a signal for each route for governing the entrance of traffic into such route, and unitary means for determining the route by controlling the power operated means and for clearing the signal over the route determined by the power operated means, a polar switch indication relay energized by current of one polarity when said power operated means assumes a switch normal position and energized by current of the reverse polarity when said power operated means assumes the switch reverse position, said signal responding only after said polar switch indication relay has been operated into correspondence with said unitary means.

134. In combination, a track layout including a track switch for setting up a plurality of routes, power operated means for operating said track switch, a signal for each route for governing the entrance of traffic into such route, unitary means for determining the route by controlling the power operated means and for clearing the signal over the route determined by the power operated means, and a signal relay for each of said signals and energized only if said unitary means and said power operated means assume corresponding positions.

135. In combination, a track layout including a track switch for setting up a plurality of routes, power operated means for operating said track switch, a signal for each route for governing the entrance of traffic into such route, a lock relay for when deenergized preventing the operation of said switch by said power operated means and deenergized if one of said signals is at proceed, unitary means for determining the route by controlling the power operated means and for clearing the signal over the route determined by the power operated means, and a polar switch indication relay energized by current of one polarity when said power operated means assumes a switch normal position and energized by current of the reverse polarity when said power operated means assumes the switch reverse position, each of said signals responding only if said polar switch indication relay has been operated into correspondence with said unitary means and if said unitary means assumes a position corresponding to the route over which such signal governs traffic.

136. In combination, a track layout including a track switch for setting up a plurality of routes, power operated means for operating said track switch, a signal for each route for governing the entrance of traffic into such route, a lock stick relay for when deenergized preventing the operation of said switch by said power operated means and deenergized if one of said signals is at proceed, unitary means for determining the route by controlling the power operated means and for clearing the signal over the route determined by the power operated means, a polar switch indication relay energized by current of one polarity when said power operated means assumes a switch normal position and energized by current of the reverse polarity when said power operated means assumes the switch reverse position, either said signals responding only if said polar switch indication relay has been operated into correspondence with said unitary means, and means responsive to a train departing from said switch for picking up said lock stick relay.

137. In combination, a railway switch, a signal to govern traffic over the switch, a switch controlling relay to control the operation of the switch, a signal governing relay to govern the operation of the signal, a remote controlled means to simultaneously control said switch controlling relay and said signal governing relay, and means at times to prevent the signal governing relay from becoming effective to clear the signal until the switch controlling relay has effected a movement of the switch.

138. In combination, a railway switch, a signal to govern traffic over the switch, a switch controlling relay to control the operation of the switch, a signal governing relay to govern the operation of the signal, remote controlled means to control by a single operation both the switch controlling relay and the signal governing relay, and means to at times prevent the signal governing relay from becoming effective to clear the signal until the switch controlling relay has effected a movement of the switch.

139. In an interlocking system for railroads, a railroad track switch, means for operating said track switch, a signal governing traffic over said track switch said signal being manually operable to indicate clear or stop, approach locking means preventing operation of said track switch a predetermined time after said signal is manually caused to indicate stop whenever a train is approaching said track switch, means automatically causing said signal to indicate stop upon the passage of a train over said track switch, and means rendering said approach locking means ineffective when said signal is caused to be automatically put to stop, said means being effective only until said signal is again caused to indicate clear.

140. In an interlocking system for railroads, a railroad track switch, means for operating said track switch, a signal governing traffic over said track switch said signal being manually operable to indicate clear or stop, approach locking means preventing operation of said track switch a predetermined time after said signal is manually caused to indicate stop whenever a train is approaching said track switch, means automatically causing said signal to indicate stop upon the passage of a train over said track switch, and means rendering said approach locking means ineffective when said signal is caused to be automatically put to stop, said means being effective until said signal is again caused to indicate clear.

141. In an interlocking system for railroads, a railroad track switch, a switch machine for operating said track switch, a signal governing traffic over said track switch said signal being manually operable to indicate clear or stop, approach locking means preventing operation of said switch machine, releasing means for releasing said approach locking means a predetermined time after said signal is manually caused to indicate stop whenever a train is approaching said track switch, means automatically causing said signal to indicate stop upon the passage of a train over said track switch, and other means for releasing said approach locking means when said signal is caused to be automatically put to stop, said other means being effective continuously until said signal is again caused to indicate clear.

142. In an interlocking system for railroads, a railroad track switch, a switch machine for operating said track switch, a free and unlockable lever for controlling said switch machine, a signal for governing traffic over said track switch said signal being manually operable to indicate clear or stop, approach locking means preventing operation of said switch machine in response to a change in the position of said lever if said signal indicates clear, releasing means for releasing said approach locking means a predetermined time after said signal is manually caused to indicate stop whenever a train is approaching said track switch, means automatically causing said signal to indicate stop upon the passage of a train over said track switch, and other means for immediately releasing said approach locking means when said signal is caused to be automatically put to stop, said other means being effective continuously until said signal is again caused to indicate clear.

143. In combination; a switch machine for operating a railway track switch; a polar-neutral relay having a polar and a neutral contact included in series in a control circuit for said switch machine; a neutral relay; manually controllable control means; a pick-up circuit for said polar-neutral relay including said control means and a front contact of said neutral relay in series; and a stick circuit for said polar-neutral relay including a back contact of said neutral relay, a front neutral stick contact of said polar-neutral relay and a polar contact of said polar-neutral relay in series; said polar contact if in one position applying current of positive polarity and if in the other position applying current of negative polarity to said polar neutral relay, said polarities of current maintaining said polar contact to such respective positions; whereby if, while said polar-neutral relay is energized by its stick circuit, said polar contacts are accidentally reversed said stick contact is opened while the magnetic field of said polar-neutral relay passes through zero and remains open de-energizing said polar-neutral relay and opening the neutral contact in the control circuit for said switch machine.

144. In combination; a polar-neutral relay having a polar and a neutral contact included in series; a second relay; manually controllable control means; a pick-up circuit for said polar-neutral relay including said control means and a front contact of said second relay in series; and a stick circuit for said polar-neutral relay including a back contact of said second relay, said front neutral stick contact and said polar contact of said polar-neutral relay in series; said polar contact if in one position applying current of positive polarity and if in the other position applying current of negative polarity to said polar neutral relay, said polarities of current maintaining said polar contact to such respective positions; whereby if, while said polar-neutral relay is energized by current of a particular polarity through the medium of said control means and the front contact of said second relay and said polar contact fails to respond said polar-neutral relay will be deenergized upon dropping of said second relay.

145. In combination; a switch machine for operating a track switch of a railway system; a polar relay; a control circuit for said switch machine including contacts of said polar relay to produce a continuous electrical bias tending to control said switch machine to a particular position; a second relay; manually controlled means; a pick-up circuit for said polar relay including said manually controlled means and a front contact of said second relay; one stick circuit for said polar relay closed only when said polar relay assumes one polar position and said second relay is deenergized; a second stick circuit for said polar relay closed only when said polar relay assumes the other polar position and said second relay is deenergized; said stick circuits having sources of current therein of polarity to maintain said polar relay energized; whereby said polar relay will be maintained energized to the last position to which it was energized before said second relay assumed its retracted position.

146. In combination; a polar-neutral relay of the stick type; a polar and a neutral contact for said relay and included in series; stick circuits for said relay including said polar and said neutral contact in series in a manner to cause said polar contact to select sources of current of polarity to cause the polar contact to be actuated to a position to maintain such stick circuit closed; a pick-up circuit for said stick relay; and a contact to include the winding of such relay in said pick-up or said stick circuit; whereby if said polar contact has not responded to the polarity of current applied to said pick-up circuit, when said contact shifts from said pick-up to said stick circuit, said neutral contact will drop and leave said relay deenergized.

147. In combination; a polar neutral relay having polar and neutral contacts; an energizing circuit for said relay including a source of energy and a control means; a stick circuit for said relay including another source of energy, its own polar contact and its own front contact; means for at times shifting the energization of said relay from its said energizing circuit to its said stick circuit, and means responsive to said shifting for checking the proper response of said relay to said control means.

148. In combination; a polar neutral relay having both polar contacts and neutral contacts; a source of energy; a control means; energizing circuit means connecting said relay with said source and said control means in a manner that said control means can reverse the polarity of energy applied to said relay; another source of energy; a stick circuit for said relay including said another source, one of the polar contacts of said relay and one of the neutral contacts of said relay in such a manner that said polar contact can determine the polarity of energy applied to said relay when said stick circuit is effective; means for at times rendering said stick circuit effective and said energizing circuit ineffective; and means distinctively controlled by another polar contact of said relay subject to another neutral contact of said relay; whereby said last mentioned means is insured of distinctive control in accordance with said control means.

149. In combination, a switch machine, a control relay for governing the operation of said switch machine, a first control circuit and a second control circuit for said control relay, a manually controlled device, means responsive to the operation of said device for reversing the current in said first control circuit, means responsive to the reversal of current in said first control circuit for distinctively operating said control relay, means responsive to the operation of said control relay for reversing the current in said second control circuit, means responsive to the flow of current in a particular direction in said second control circuit for disconnecting said second control circuit from said control relay if the current applied by said second circuit is of different polarity from that applied by said first circuit, and a contact for at times rendering only one of said control circuits effective to control said control relay.

150. In combination, a detector section of railway track including a track switch, an approach section of railway track adjacent said detector section, a signal for governing the movement of traffic over the switch from said approach section, means for operating said switch, an approach locking stick relay effective when deenergized to prevent operation of said switch, a stick circuit for said relay broken when said signal indicates clear, and a pick-up circuit for said relay closed when said signal indicates stop provided said switch is in a position to permit the movement of traffic over the switch from said approach section and provided said approach section is unoccupied.

151. In combination, a railway track switch, a signal for governing traffic movements from a given direction over said switch, a second signal for governing traffic movements from said given direction toward said first signal, a control instrument for controlling said second signal, and means controlled by said instrument for at times preventing an operation of said switch when said first signal indicates "stop".

152. In combination, a railway track switch, a signal for governing traffic movements from a given direction over said switch, a second signal for governing traffic movements from said given direction toward said first signal, a control instrument for controlling said second signal, and means controlled by said instrument for at times preventing an operation of said switch when said second signal indicates "caution" while said first signal indicates "stop".

153. In combination, a section of railway track, a signal for governing traffic movements from a given direction into said section, a second signal for governing traffic movements from said given direction toward said first signal, a third signal for governing traffic movements from a second direction into said section, a control device for controlling said second signal, and means controlled by said control device for at times preventing an operation of said third signal when said first signal indicates "stop".

154. In combination, a railway track switch, a signal for directing traffic movements over said switch and including a signal contact closed when said signal is controlled to the "stop" position, an approach track circuit for said signal including a track relay, a stick relay, a pick-up circuit for said stick relay including said signal contact and a contact controlled by said track relay, a stick circuit for said stick relay including said signal contact, a time element device having a contact which closes when and only when said time element device has been energized for a measured period of time, a control circuit for said time element device including a back contact of said stick relay, a second pick-up circuit for said stick relay including said time element device contact and said signal contact in series, a detector track section for said switch including a track relay, a third pick-up circuit for said stick relay including said signal contact and a back contact of said detector track section relay, and an operating circuit for said switch controlled by said stick relay.

155. In combination, a railway track layout including a plurality of routes each route including a plurality of track switches, manually operable control means for the ends of a particular one of said routes, signal means for controlling the movement of traffic in one direction over the entire said particular route, signal means for controlling the movement of traffic in the opposite direction over said particular route, and means controlled by the manually operable means for the opposite ends of said particular route for controlling the switches to establish that route and effective to clear said one or said other signal means, depending upon the sequence in which said manually operable means are operated.

156. In combination, a railway track layout including a plurality of routes, each route including a plurality of track switches, manually operable control means for the ends of a particular one of said routes, signal means for controlling the movement of traffic in one direction over said particular route, signal means for controlling the movement of traffic in the opposite direction over said particular route, and means controlled by the manually operable means for the opposite ends of said particular route for controlling the switches to establish that route and effective to clear said one signal means only if said manually operable means are operated in a particular order and for clearing said other signal means only if said manually operable means are operated in the reverse order.

157. In an interlocking system for railroads, a track layout having a plurality of routes, manually controlled contact means for each route end, means responsive to the closure of said manually controlled contact means for the opposite ends of a particular route to establish that route, signal means for governing traffic over each of said routes in each direction, and means responsive only to joint operation of said manually controlled contact means and the sequence in which said manually controlled contact means are closed for the opposite ends of a particular route to determine the direction of traffic in that route and to clear the signal means for that direction for said route.

158. In an interlocking system for railroads, the combination with a track layout having a plurality of routes each route including a plurality of track switches, manually controlled contact means having normal and actuated positions for each route end, a switch machine for each track switch, the switch machines for one particular route being controlled by the contact means for the ends of said particular route, a signal for governing traffic over at least a portion of said particular route, and means effective when said particular route is unoccupied to clear said signal only upon the joint operation to actuated positions of the contact means for the ends of that particular route.

SEDGWICK N. WIGHT.